(12) United States Patent
Ehlert et al.

(10) Patent No.: US 11,026,277 B2
(45) Date of Patent: Jun. 1, 2021

(54) ASSISTIVE LISTENING SYSTEM THAT USES SOUND WAVES FOR DEVICE PAIRING

(71) Applicant: Galaxy Next Generation, Inc., Toccoa, GA (US)

(72) Inventors: Bradley J. Ehlert, Sandy, UT (US); Shawn Wheeler, Sandy, UT (US)

(73) Assignee: Galaxy Next Generation, Inc., Toccoa, GA (US)

( * ) Notice: Subject to any disclaimer, the term of this patent is extended or adjusted under 35 U.S.C. 154(b) by 0 days.

(21) Appl. No.: 16/254,497

(22) Filed: Jan. 22, 2019

(65) Prior Publication Data
US 2020/0236724 A1 Jul. 23, 2020

(51) Int. Cl.
H04W 76/14 (2018.01)
G06F 3/16 (2006.01)
H04W 4/80 (2018.01)

(52) U.S. Cl.
CPC ............. *H04W 76/14* (2018.02); *G06F 3/16* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 8,995,688 B1* | 3/2015 | Chemtob | ............... | H04R 27/02 381/109 |
| 2010/0291880 A1* | 11/2010 | Feldstein | ................. | H04B 1/40 455/73 |
| 2012/0300958 A1* | 11/2012 | Klemmensen | ....... | H04R 29/007 381/81 |
| 2013/0093962 A1* | 4/2013 | Bruhn | .................... | G08C 17/02 348/734 |
| 2014/0085152 A1* | 3/2014 | Klemmensen | ....... | H01Q 9/0407 343/702 |
| 2016/0119962 A1* | 4/2016 | Kim | ........................ | H04W 76/14 455/41.2 |
| 2016/0366715 A1* | 12/2016 | Murayama | ............ | H04W 76/14 |
| 2016/0377615 A1* | 12/2016 | Naito | ............... | C07K 14/70596 435/7.94 |
| 2018/0359580 A1* | 12/2018 | Aran | ....................... | H04R 27/00 |
| 2020/0235824 A1* | 7/2020 | Ehlert | .................... | H04B 11/00 |

* cited by examiner

*Primary Examiner* — Jinsong Hu
*Assistant Examiner* — Rui M Hu
(74) *Attorney, Agent, or Firm* — Daniel S. Santos; Thomas Horstemeyer, LLP

(57) ABSTRACT

Systems, devices, and methods for assistive listening that uses sound waves for devices pairing is described herein. An assistive listening system may use sound waves to pair mobile devices acting as assistive listening devices with stationary devices. To establish a communication link (e.g., pair the two devices), a mobile device may exchange a plurality of signals over a plurality of sound waves with a stationary device. The plurality of sound waves may operate in a set of frequencies above a frequency range detectable by a human ear (e.g., above 20 kHz). After the pairing procedure over the sound waves is complete, the assistive listening system may use electromagnetic waves to pair the mobile devices with the stationary devices over a wireless access technology, such as Digital Enhanced Cordless Telecommunications (DECT).

18 Claims, 21 Drawing Sheets

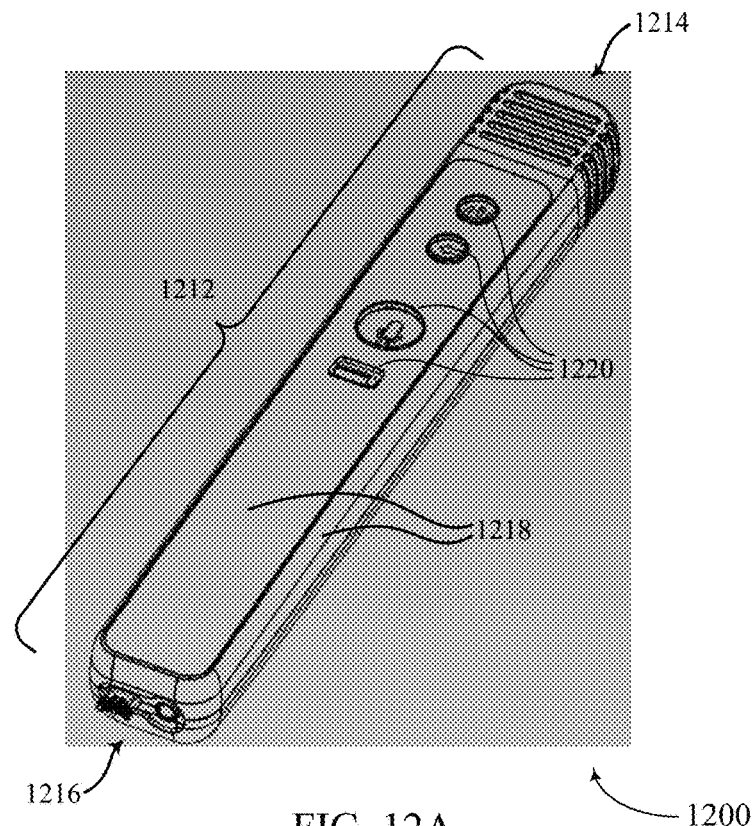
FIG. 12A
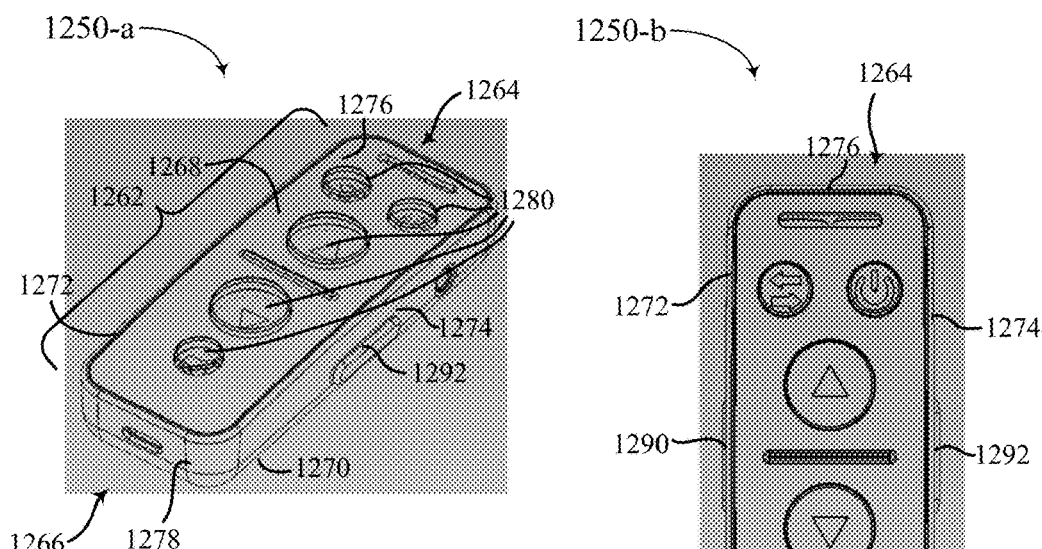
FIG. 12B
FIG. 12C

ASSISTIVE LISTENING SYSTEM THAT USES SOUND WAVES FOR DEVICE PAIRING

TECHNICAL FIELD

The present disclosure generally relates to audio visual systems that utilize high-frequency sound waves to communicate information.

BACKGROUND

Networked systems are increasingly important in various organizations. Not all organizations are able to custom build their networked systems to ensure that different devices communicate efficiently. Frequently, an organization may implement a collection of systems, both old and new, to achieve their objectives.

In some settings, such as offices or classrooms, a plurality of network devices and/or media devices may be positioned in a dense environment. It may be desirable to integrate devices in some areas (e.g., conference rooms or classrooms) to improve control and cooperation between devices. The proliferation of devices and the further integration of devices in dense environments may complicate connectivity between devices.

SUMMARY

A method of wireless communication at a mobile device is described. The method may include exchanging, with a stationary device, a set of signals over a set of sound waves operating in a first set of frequencies above a frequency range detectible by a human ear, where the set of signals are for pairing the mobile device with the stationary device, establishing, with the stationary device, a communication link using a radio access technology operating in a second set of frequencies of a radio frequency spectrum band based on exchanging the set of signals over the set of sound waves, and communicating, with the stationary device, information over a set of electromagnetic waves using the radio access technology operating in the second set of frequencies based on establishing the communication link.

An apparatus for wireless communication at a mobile device is described. The apparatus may include a processor, memory in electronic communication with the processor, and instructions stored in the memory. The instructions may be executable by the processor to cause the apparatus to exchange, with a stationary device, a set of signals over a set of sound waves operating in a first set of frequencies above a frequency range detectible by a human ear, where the set of signals are for pairing the mobile device with the stationary device, establish, with the stationary device, a communication link using a radio access technology operating in a second set of frequencies of a radio frequency spectrum band based on exchanging the set of signals over the set of sound waves, and communicate, with the stationary device, information over a set of electromagnetic waves using the radio access technology operating in the second set of frequencies based on establishing the communication link.

Another apparatus for wireless communication at a mobile device is described. The apparatus may include means for exchanging, with a stationary device, a set of signals over a set of sound waves operating in a first set of frequencies above a frequency range detectible by a human ear, where the set of signals are for pairing the mobile device with the stationary device, establishing, with the stationary device, a communication link using a radio access technology operating in a second set of frequencies of a radio frequency spectrum band based on exchanging the set of signals over the set of sound waves, and communicating, with the stationary device, information over a set of electromagnetic waves using the radio access technology operating in the second set of frequencies based on establishing the communication link.

A non-transitory computer-readable medium storing code for wireless communication at a mobile device is described. The code may include instructions executable by a processor to exchange, with a stationary device, a set of signals over a set of sound waves operating in a first set of frequencies above a frequency range detectible by a human ear, where the set of signals are for pairing the mobile device with the stationary device, establish, with the stationary device, a communication link using a radio access technology operating in a second set of frequencies of a radio frequency spectrum band based on exchanging the set of signals over the set of sound waves, and communicate, with the stationary device, information over a set of electromagnetic waves using the radio access technology operating in the second set of frequencies based on establishing the communication link.

Some examples of the method, apparatuses, and non-transitory computer-readable medium described herein may further include operations, features, means, or instructions for transmitting, over one or more sound waves of the set of sound waves, a first signal to request establishment of the communication link using the radio access technology, where the set of signals includes the first signal, where establishing the communication link may be based on transmitting the first signal.

Some examples of the method, apparatuses, and non-transitory computer-readable medium described herein may further include operations, features, means, or instructions for receiving, over one or more sound waves of the set of sound waves, a reference signal from the stationary device based on transmitting the first signal, where the set of signals includes the reference signal, where establishing the communication link may be based on receiving the reference signal.

Some examples of the method, apparatuses, and non-transitory computer-readable medium described herein may further include operations, features, means, or instructions for transmitting, over one or more sound waves of the set of sound waves, a second signal to the stationary device based on receiving the reference signal, where the set of signals includes the second signal, where establishing the communication link may be based on transmitting the second signal.

In some examples of the method, apparatuses, and non-transitory computer-readable medium described herein, the second signal includes an identifier, for the mobile device, that may be associated with the radio access technology.

In some examples of the method, apparatuses, and non-transitory computer-readable medium described herein, the second signal includes a second reference signal transmitted by the mobile device to the stationary device.

Some examples of the method, apparatuses, and non-transitory computer-readable medium described herein may further include operations, features, means, or instructions for determining whether a signal strength of the reference signal satisfies a threshold based on receiving the reference signal, where transmitting the second signal may be based on determining whether the signal strength of the reference signal satisfies the threshold.

Some examples of the method, apparatuses, and non-transitory computer-readable medium described herein may further include operations, features, means, or instructions for receiving, over one or more sound waves of the set of sound waves, a set of reference signals from a set of stationary devices based on transmitting the first signal, where the set of stationary devices includes the stationary device, where the set of signals includes the set of reference signals, selecting the stationary device from the set of stationary devices based on a signal strength of at least one reference signal associated with the stationary device satisfies a threshold, and transmitting, over one or more sound waves of the set of sound waves, a second signal to the stationary device based on selecting the stationary device, where the set of signals includes the second signal, where establishing the communication link may be based on transmitting the second signal to the stationary device.

Some examples of the method, apparatuses, and non-transitory computer-readable medium described herein may further include operations, features, means, or instructions for transmitting, over one or more sound waves of the set of sound waves, a third signal to maintain the communication link with the stationary device, where communicating the information with the stationary device may be based on transmitting the third signal.

Some examples of the method, apparatuses, and non-transitory computer-readable medium described herein may further include operations, features, means, or instructions for receiving, over one or more sound waves of the set of sound waves, a fourth signal to maintain the communication link with the stationary device based on transmitting the third signal, the fourth signal being received from the stationary device, where communicating the information with the stationary device over the communication link may be based on receiving the fourth signal.

Some examples of the method, apparatuses, and non-transitory computer-readable medium described herein may further include operations, features, means, or instructions for monitoring, for a time period, the first set of frequencies for a fourth signal based on transmitting the third signal, and terminating the communication link with the stationary device based on failing to receive the fourth signal during the time period.

Some examples of the method, apparatuses, and non-transitory computer-readable medium described herein may further include operations, features, means, or instructions for pairing the mobile device with the stationary device using the radio access technology based on exchanging the set of signals over the set of sound waves and establishing the communication link, where communicating the information may be based on pairing the mobile device with the stationary device.

In some examples of the method, apparatuses, and non-transitory computer-readable medium described herein, the radio access technology includes Digital Enhanced Cordless Telecommunications (DECT).

In some examples of the method, apparatuses, and non-transitory computer-readable medium described herein, the stationary device includes a fixed part (FP) in a DECT network, and the mobile device includes a portable part (PP) in the DECT network.

In some examples of the method, apparatuses, and non-transitory computer-readable medium described herein, the mobile device includes a microphone, a speaker, an assistive listening device, a remote control, or a combination thereof.

In some examples of the method, apparatuses, and non-transitory computer-readable medium described herein, the stationary device may be coupled with one or more devices configured to input or output multimedia content in a classroom of a school.

A method of wireless communication at a stationary device is described. The method may include exchanging, with a mobile device, a set of signals over a set of sound waves operating in a first set of frequencies above a frequency range detectible by a human ear, where the set of signals are for pairing the mobile device with the stationary device, establishing, with the mobile device, a communication link using a radio access technology operating in a second set of frequencies of a radio frequency spectrum band based on exchanging the set of signals over the set of sound waves, and communicating, with the mobile device, information over a set of electromagnetic waves using the radio access technology operating in the second set of frequencies based on establishing the communication link.

An apparatus for wireless communication at a stationary device is described. The apparatus may include a processor, memory in electronic communication with the processor, and instructions stored in the memory. The instructions may be executable by the processor to cause the apparatus to exchange, with a mobile device, a set of signals over a set of sound waves operating in a first set of frequencies above a frequency range detectible by a human ear, where the set of signals are for pairing the mobile device with the stationary device, establish, with the mobile device, a communication link using a radio access technology operating in a second set of frequencies of a radio frequency spectrum band based on exchanging the set of signals over the set of sound waves, and communicate, with the mobile device, information over a set of electromagnetic waves using the radio access technology operating in the second set of frequencies based on establishing the communication link.

Another apparatus for wireless communication at a stationary device is described. The apparatus may include means for exchanging, with a mobile device, a set of signals over a set of sound waves operating in a first set of frequencies above a frequency range detectible by a human ear, where the set of signals are for pairing the mobile device with the stationary device, establishing, with the mobile device, a communication link using a radio access technology operating in a second set of frequencies of a radio frequency spectrum band based on exchanging the set of signals over the set of sound waves, and communicating, with the mobile device, information over a set of electromagnetic waves using the radio access technology operating in the second set of frequencies based on establishing the communication link.

A non-transitory computer-readable medium storing code for wireless communication at a stationary device is described. The code may include instructions executable by a processor to exchange, with a mobile device, a set of signals over a set of sound waves operating in a first set of frequencies above a frequency range detectible by a human ear, where the set of signals are for pairing the mobile device with the stationary device, establish, with the mobile device, a communication link using a radio access technology operating in a second set of frequencies of a radio frequency spectrum band based on exchanging the set of signals over the set of sound waves, and communicate, with the mobile device, information over a set of electromagnetic waves using the radio access technology operating in the second set of frequencies based on establishing the communication link.

Some examples of the method, apparatuses, and non-transitory computer-readable medium described herein may further include operations, features, means, or instructions for receiving, over one or more sound waves of the set of sound waves, a first signal to request establishment of the communication link using the radio access technology, where the set of signals includes the first signal, where establishing the communication link may be based on receiving the first signal.

Some examples of the method, apparatuses, and non-transitory computer-readable medium described herein may further include operations, features, means, or instructions for transmitting, over one or more sound waves of the set of sound waves, a reference signal to the mobile device based on receiving the first signal, where the set of signals includes the reference signal, where establishing the communication link may be based on transmitting the reference signal.

Some examples of the method, apparatuses, and non-transitory computer-readable medium described herein may further include operations, features, means, or instructions for receiving, over one or more sound waves of the set of sound waves, a second signal from the mobile device based on transmitting the reference signal, where the set of signals includes the second signal, where establishing the communication link may be based on transmitting the second signal.

In some examples of the method, apparatuses, and non-transitory computer-readable medium described herein, the second signal includes an identifier, for the mobile device, that may be associated with the radio access technology.

In some examples of the method, apparatuses, and non-transitory computer-readable medium described herein, the second signal includes a second reference signal received from the mobile device.

Some examples of the method, apparatuses, and non-transitory computer-readable medium described herein may further include operations, features, means, or instructions for receiving, over one or more sound waves of the set of sound waves, a third signal to maintain the communication link with the mobile device, where communicating the information with the mobile device may be based on receiving the third signal.

Some examples of the method, apparatuses, and non-transitory computer-readable medium described herein may further include operations, features, means, or instructions for transmitting, over one or more sound waves of the set of sound waves, a fourth signal to maintain the communication link with the mobile device based on receiving the third signal, where communicating the information with the mobile device over the communication link may be based on transmitting the fourth signal.

Some examples of the method, apparatuses, and non-transitory computer-readable medium described herein may further include operations, features, means, or instructions for monitoring, for a time period, the first set of frequencies for the third signal, and terminating the communication link with the mobile device based on failing to receive the third signal during the time period.

Some examples of the method, apparatuses, and non-transitory computer-readable medium described herein may further include operations, features, means, or instructions for pairing the stationary device with the mobile device using the radio access technology based on exchanging the set of signals over the set of sound waves and establishing the communication link, where communicating the information may be based on pairing the stationary device with the mobile device.

In some examples of the method, apparatuses, and non-transitory computer-readable medium described herein, the radio access technology includes Digital Enhanced Cordless Telecommunications (DECT).

In some examples of the method, apparatuses, and non-transitory computer-readable medium described herein, the mobile device includes a microphone, a speaker, an assistive listening device, a remote control, or a combination thereof.

In some examples of the method, apparatuses, and non-transitory computer-readable medium described herein, the stationary device may be coupled with one or more devices configured to input or output multimedia content in a classroom of a school.

A system is described that may include a mobile device positioned in a classroom and configured as an input/output device for a user, a stationary device positioned in the classroom and coupled with one or more devices configured to input or output multimedia content into the classroom, the stationary device configured to communicate, with the mobile device, a plurality of signals over a plurality of sound waves operating in a first set of frequencies above a frequency range detectable by a human ear, where the plurality of signals are for pairing the mobile device with the stationary device, and communicate, with the mobile device, information associated with the multimedia content over a plurality of electromagnetic waves using a radio access technology operating in a second set of frequencies based at least in part on communicating the plurality of signals over the plurality of sound waves.

A method of wireless communication at an assistive listening device is described. The method may include exchanging, with a stationary device, a set of signals over a first set of sound waves operating in a first set of frequencies above a frequency range detectable by a human ear, where the set of signals are for pairing the assistive listening device with the stationary device, receiving, from the stationary device, audio information over a set of electromagnetic waves using a radio access technology operating in a second set of frequencies based on exchanging the set of signals over the first set of sound waves, and outputting the audio information over a second set of sound waves operating in a third set of frequencies within the frequency range detectable by the human ear.

An apparatus for wireless communication at an assistive listening device is described. The apparatus may include a processor, memory in electronic communication with the processor, and instructions stored in the memory. The instructions may be executable by the processor to cause the apparatus to exchange, with a stationary device, a set of signals over a first set of sound waves operating in a first set of frequencies above a frequency range detectable by a human ear, where the set of signals are for pairing the assistive listening device with the stationary device, receive, from the stationary device, audio information over a set of electromagnetic waves using a radio access technology operating in a second set of frequencies based on exchanging the set of signals over the first set of sound waves, and output the audio information over a second set of sound waves operating in a third set of frequencies within the frequency range detectable by the human ear.

Another apparatus for wireless communication at an assistive listening device is described. The apparatus may include means for exchanging, with a stationary device, a set of signals over a first set of sound waves operating in a first set of frequencies above a frequency range detectable by a human ear, where the set of signals are for pairing the assistive listening device with the stationary device, receiving, from the stationary device, audio information over a set of electromagnetic waves using a radio access technology operating in a second set of frequencies based on exchanging the set of signals over the first set of sound waves, and outputting the audio information over a second set of sound waves operating in a third set of frequencies within the frequency range detectible by the human ear.

A non-transitory computer-readable medium storing code for wireless communication at an assistive listening device is described. The code may include instructions executable by a processor to exchange, with a stationary device, a set of signals over a first set of sound waves operating in a first set of frequencies above a frequency range detectible by a human ear, where the set of signals are for pairing the assistive listening device with the stationary device, receive, from the stationary device, audio information over a set of electromagnetic waves using a radio access technology operating in a second set of frequencies based on exchanging the set of signals over the first set of sound waves, and output the audio information over a second set of sound waves operating in a third set of frequencies within the frequency range detectible by the human ear.

Some examples of the method, apparatuses, and non-transitory computer-readable medium described herein may further include operations, features, means, or instructions for receiving, from the stationary device, a second set of audio information associated with a public announcement system over a second set of electromagnetic waves using the radio access technology operating in the second set of frequencies, interrupting an output of the audio information based on receiving the second set of audio information associated with the public announcement system, and outputting, by the assistive listening device, the second set of audio information over the second set of sound waves based on interrupting the output of the audio information.

Some examples of the method, apparatuses, and non-transitory computer-readable medium described herein may further include operations, features, means, or instructions for pairing the assistive listening device with the stationary device using the radio access technology based on exchanging the set of signals over the first set of sound waves, where receiving the audio information may be based on pairing the assistive listening device with the stationary device.

In some examples of the method, apparatuses, and non-transitory computer-readable medium described herein, exchanging the set of signals over the first set of sound waves further may include operations, features, means, or instructions for transmitting, over one or more sound waves of the first set of sound waves, a first signal to request establishment of a communication link, with the stationary device, using the radio access technology, receiving, over one or more sound waves of the first set of sound waves, a reference signal from the stationary device based on transmitting the first signal, and transmitting, over one or more sound waves of the first set of sound waves, a second signal to the stationary device based on receiving the reference signal, where receiving the audio information may be based on the first signal, the reference signal, and the second signal.

Some examples of the method, apparatuses, and non-transitory computer-readable medium described herein may further include operations, features, means, or instructions for transmitting, over one or more sound waves of the first set of sound waves, a first signal to maintain a pairing between the assistive listening device and the stationary device, and receiving, over one or more sound waves of the first set of sound waves, a second signal to maintain the pairing between the assistive listening device and the stationary device based on transmitting the first signal, the second signal being received from the stationary device, where receiving the audio information may be based on receiving the second signal.

In some examples of the method, apparatuses, and non-transitory computer-readable medium described herein, the audio information includes audio from a public announcement system, a microphone, a television, a computer, a tablet, a smart phone, a speaker, or other multimedia device, or a combination thereof.

In some examples of the method, apparatuses, and non-transitory computer-readable medium described herein, the assistive listening device may be positioned in a classroom and outputting the audio information using the second set of sound waves occurs concurrently with a speaker outputting the audio information into the classroom.

In some examples of the method, apparatuses, and non-transitory computer-readable medium described herein, the assistive listening device includes headphones configured to be worn by a user.

In some examples of the method, apparatuses, and non-transitory computer-readable medium described herein, the assistive listening device includes a speaker configured to provide localized sound to a portion of a classroom.

In some examples of the method, apparatuses, and non-transitory computer-readable medium described herein, the radio access technology includes Digital Enhanced Cordless Telecommunications (DECT).

A method of wireless communication at a stationary device is described. The method may include exchanging, with an assistive listening device, a set of signals over a first set of sound waves operating in a first set of frequencies above a frequency range detectible by a human ear, where the set of signals are for pairing the stationary device with the assistive listening device and transmitting, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear.

An apparatus for wireless communication at a stationary device is described. The apparatus may include a processor, memory in electronic communication with the processor, and instructions stored in the memory. The instructions may be executable by the processor to cause the apparatus to exchange, with an assistive listening device, a set of signals over a first set of sound waves operating in a first set of frequencies above a frequency range detectible by a human ear, where the set of signals are for pairing the stationary device with the assistive listening device and transmit, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear.

Another apparatus for wireless communication at a stationary device is described. The apparatus may include means for exchanging, with an assistive listening device, a set of signals over a first set of sound waves operating in a first set of frequencies above a frequency range detectible by a human ear, where the set of signals are for pairing the stationary device with the assistive listening device and transmitting, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear.

A non-transitory computer-readable medium storing code for wireless communication at a stationary device is described. The code may include instructions executable by a processor to exchange, with an assistive listening device, a set of signals over a first set of sound waves operating in a first set of frequencies above a frequency range detectible by a human ear, where the set of signals are for pairing the stationary device with the assistive listening device and transmit, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear.

Some examples of the method, apparatuses, and non-transitory computer-readable medium described herein may further include operations, features, means, or instructions for receiving a first portion of the audio information from a multimedia source, receiving a second portion of the audio information from a microphone, and merging the first portion and the second portion to form the audio information using one or more low-latency audio merging techniques, where transmitting the audio information may be based on merging the first portion and the second portion.

Some examples of the method, apparatuses, and non-transitory computer-readable medium described herein may further include operations, features, means, or instructions for receiving, from a public announcement system, a second set of audio information, determining that the second set of audio information may have a higher priority than the audio information, and transmitting, to the assistive listening device, the second set of audio information associated with the public announcement system over a second set of electromagnetic waves using the radio access technology operating in the second set of frequencies based on determining that the second set of audio information may have the higher priority than the audio information.

Some examples of the method, apparatuses, and non-transitory computer-readable medium described herein may further include operations, features, means, or instructions for receiving the audio information from a source positioned within a classroom, where the source includes a public announcement system, a microphone, a television, a computer, a tablet, a smart phone, speakers, or other multimedia device, or a combination thereof, where transmitting the audio information may be based on receiving the audio information from a multimedia source.

Some examples of the method, apparatuses, and non-transitory computer-readable medium described herein may further include operations, features, means, or instructions for identifying the assistive listening device from a set of assistive listening devices paired with the stationary device, where transmitting the audio information further includes transmitting the audio information to the identified assistive listening device without transmitting the audio information to other assistive listening devices of the set of assistive listening devices paired with the stationary device.

Some examples of the method, apparatuses, and non-transitory computer-readable medium described herein may further include operations, features, means, or instructions for pairing the stationary device with the assistive listening device using the radio access technology based on exchanging the set of signals over the first set of sound waves, where transmitting the audio information may be based on pairing the assistive listening device with the stationary device.

In some examples of the method, apparatuses, and non-transitory computer-readable medium described herein, exchanging the set of signals over the first set of sound waves further may include operations, features, means, or instructions for receiving, over one or more sound waves of the first set of sound waves, a first signal to request establishment of a communication link, with the assistive listening device, using the radio access technology, transmitting, over one or more sound waves of the first set of sound waves, a reference signal to the assistive listening device based on receiving the first signal, and receiving, over one or more sound waves of the first set of sound waves, a second signal from the assistive listening device based on transmitting the reference signal, where transmitting the audio information may be based on the first signal, the reference signal, and the second signal.

In some examples of the method, apparatuses, and non-transitory computer-readable medium described herein, the stationary device may be positioned in a classroom and transmits the audio information to the assistive listening device concurrently with a speaker outputting the audio information into the classroom.

In some examples of the method, apparatuses, and non-transitory computer-readable medium described herein, the radio access technology includes Digital Enhanced Cordless Telecommunications (DECT).

A system is described. The system may include a stationary device positioned in a classroom and coupled with one or more devices configured to input or output multimedia content into the classroom, the stationary device configured to receive, from a mobile device over a plurality of sound waves operating in a first set of frequencies above a frequency range detectible by a human ear, a first alert signal for indicating that assistance is needed, and transmit a second alert signal over a communication link based at least in part on receiving the first alert signal, and a coordinating device positioned at a second location of the premises and configured to receive, from the stationary device, the second alert signal over the communication link, identify a third location associated with the mobile device based at least in part on receiving the second alert signal from the stationary device at the first location, and activate one or more devices at the third location based at least in part on receiving the second alert signal from the stationary device.

In some examples of the system, when activating the one or more device, the coordinating device is further configured to record, using one or more cameras at the third location, visual data or audio data or both based at least in part on receiving the second alert signal.

In some examples of the system, when activating the one or more device, the coordinating device is further configured to record, using one or more microphones at the third location, audio data within the frequency range detectible by the human ear based at least in part on receiving the second alert signal.

In some examples of the system, when activating the one or more device, the coordinating device is further configured to broadcast, using one or more speakers at the third location, a message within the frequency range detectible by the human ear based at least in part on receiving the second alert signal.

In some examples, the system may include a second stationary device positioned at a fourth location of the premises and configured to receive, from the mobile device over the plurality of sound waves, the first alert signal for indicating that assistance is needed, and transmit a third alert signal over a second communication link based at least in part on receiving the first alert signal, and the coordinating device is further configured to receive, from the second stationary device, the third alert signal over the second communication link, where identifying the third location of the mobile device is based at least in part on receiving the third alert signal from the second stationary device at the fourth location.

In some examples of the system, the first alert signal includes an identifier associated with the mobile device. In some examples of the system, the second alert signal includes information about the first location of the stationary device and information about the mobile device. In some examples of the system, where the communication link includes a wired communication link.

In some examples of the system, the communication link includes a wireless communication link using a radio access technology operating in a second set of frequencies of a radio frequency spectrum. In some examples of the system, the coordinating device is implemented at least partially by a second stationary device. In some examples of the system, the coordinating device includes a computing device different than the stationary device.

A method of wireless communication at a mobile device is described. The method may include identifying an indication that assistance is needed and broadcasting, over a set of sound waves operating in a first set of frequencies above a frequency range detectible by a human ear, an alert signal for indicating that assistance is needed based on receiving the indication.

An apparatus for wireless communication at a mobile device is described. The apparatus may include a processor, memory in electronic communication with the processor, and instructions stored in the memory. The instructions may be executable by the processor to cause the apparatus to identify an indication that assistance is needed and broadcast, over a set of sound waves operating in a first set of frequencies above a frequency range detectible by a human ear, an alert signal for indicating that assistance is needed based on receiving the indication.

Another apparatus for wireless communication at a mobile device is described. The apparatus may include means for identifying an indication that assistance is needed and broadcasting, over a set of sound waves operating in a first set of frequencies above a frequency range detectible by a human ear, an alert signal for indicating that assistance is needed based on receiving the indication.

A non-transitory computer-readable medium storing code for wireless communication at a mobile device is described. The code may include instructions executable by a processor to identify an indication that assistance is needed and broadcast, over a set of sound waves operating in a first set of frequencies above a frequency range detectible by a human ear, an alert signal for indicating that assistance is needed based on receiving the indication.

In some examples of the method, apparatuses, and non-transitory computer-readable medium described herein, identifying the indication may include operations, features, means, or instructions for identifying that a first button of the mobile device may be actuated, and identifying that a second button of the mobile device actuated while the first button of the mobile device may be actuated, where broadcasting the alert signal may be based on actuating the first button and the second button concurrently.

In some examples of the method, apparatuses, and non-transitory computer-readable medium described herein, identifying the indication may include operations, features, means, or instructions for receiving, over a second set of sound waves operating in a second set of frequencies within the frequency range detectible by the human ear, a trigger word for activating an alert mode of the mobile device, where broadcasting the alert signal may be based on receiving the trigger word.

Some examples of the method, apparatuses, and non-transitory computer-readable medium described herein may further include operations, features, means, or instructions for exchanging, with a stationary device, a set of signals over a second set of sound waves operating in the first set of frequencies, and pairing the mobile device with the stationary device using a radio access technology operating in a second set of frequencies of a radio frequency spectrum band based on exchanging the set of signals over the set of sound waves.

In some examples of the method, apparatuses, and non-transitory computer-readable medium described herein, the radio access technology includes Digital Enhanced Cordless Telecommunications (DECT).

A method of wireless communication at a stationary device is described. The method may include receiving, from a mobile device over a set of sound waves operating in a first set of frequencies above a frequency range detectible by a human ear, a first alert signal for indicating that assistance is needed, activating one or more devices based on receiving the first alert signal from the mobile device, and transmitting, to one or more devices, a second alert signal indicating that assistance is needed at a location associated with the stationary device.

An apparatus for wireless communication at a stationary device is described. The apparatus may include a processor, memory in electronic communication with the processor, and instructions stored in the memory. The instructions may be executable by the processor to cause the apparatus to receive, from a mobile device over a set of sound waves operating in a first set of frequencies above a frequency range detectible by a human ear, a first alert signal for indicating that assistance is needed, activate one or more devices based on receiving the first alert signal from the mobile device, and transmit, to one or more devices, a second alert signal indicating that assistance is needed at a location associated with the stationary device.

Another apparatus for wireless communication at a stationary device is described. The apparatus may include means for receiving, from a mobile device over a set of sound waves operating in a first set of frequencies above a frequency range detectible by a human ear, a first alert signal for indicating that assistance is needed, activating one or more devices based on receiving the first alert signal from the mobile device, and transmitting, to one or more devices, a second alert signal indicating that assistance is needed at a location associated with the stationary device.

A non-transitory computer-readable medium storing code for wireless communication at a stationary device is described. The code may include instructions executable by a processor to receive, from a mobile device over a set of sound waves operating in a first set of frequencies above a frequency range detectible by a human ear, a first alert signal for indicating that assistance is needed, activate one or more devices based on receiving the first alert signal from the mobile device, and transmit, to one or more devices, a second alert signal indicating that assistance is needed at a location associated with the stationary device.

Some examples of the method, apparatuses, and non-transitory computer-readable medium described herein may further include operations, features, means, or instructions for identifying a second location of the mobile device based on receiving the first alert signal, where transmitting the second alert signal may be based on identifying the second location.

Some examples of the method, apparatuses, and non-transitory computer-readable medium described herein may further include operations, features, means, or instructions for receiving, from a second stationary device, a signal indicating that the second stationary device received the first alert signal from the mobile device, where identifying the second location of the mobile device may be based on receiving the signal from the second stationary device.

In some examples of the method, apparatuses, and non-transitory computer-readable medium described herein, the second alert signal includes the second location identified by the stationary device.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIGS. 12A, 12B, and 12C illustrate mobile devices that support communications between devices using sound waves and electromagnetic waves.

Figure 1:
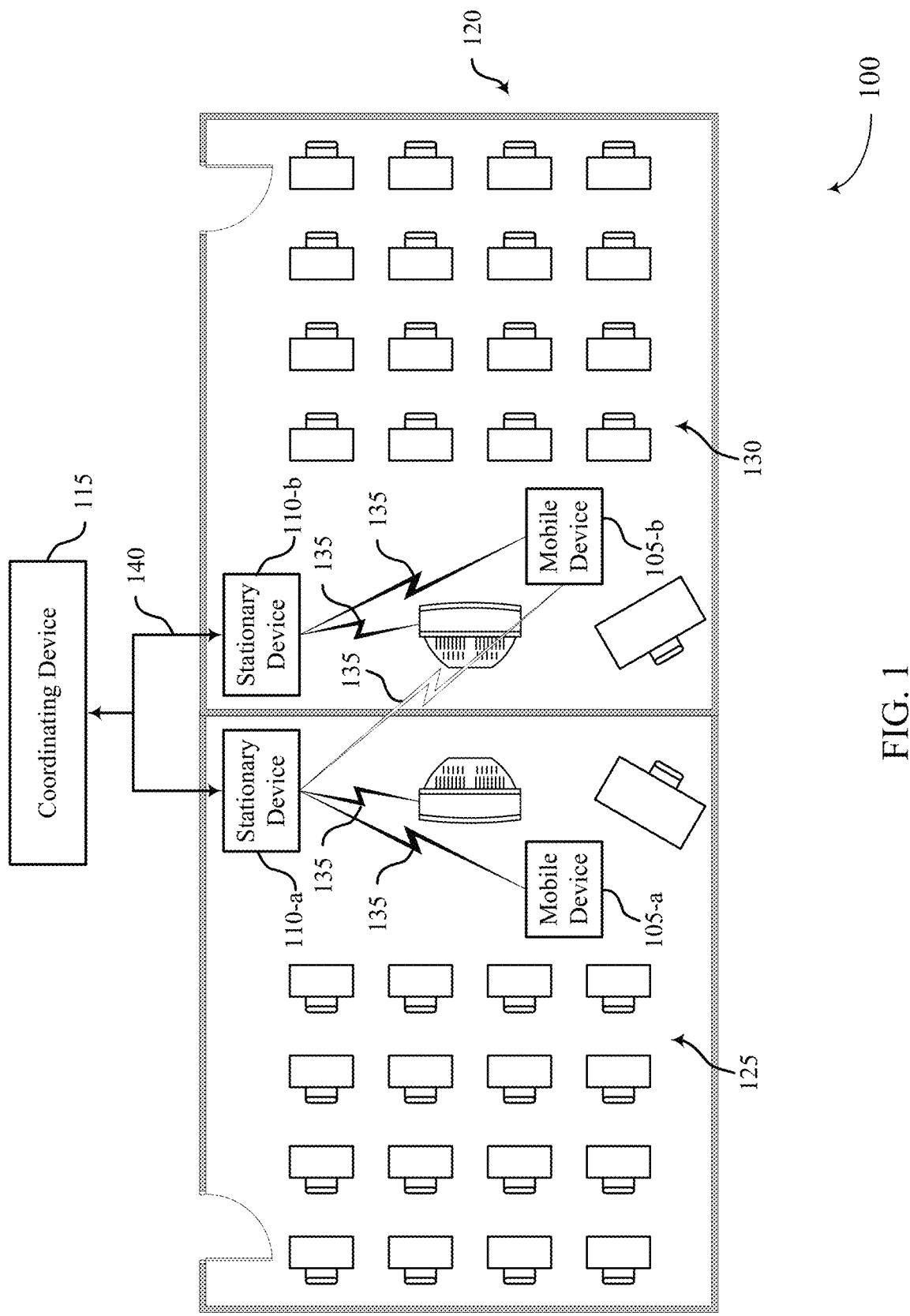
FIG. 1 illustrates a wireless communication system that supports communications between devices using sound waves and electromagnetic waves.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Assistive listening systems are systems that may include one or more assistive listening devices that bring sound directly to an ear of the listener. People show varying degrees of hearing at varying frequencies in both ears. Sometimes to account for the variability in hearing, it may be beneficial to provide customizable sound to individual listeners or individual areas in a room. In this manner, people may be able to hear and understand a presentation without making it too loud or soft for others listening to the same presentation.

An assistive listening system may use sound waves to pair mobile devices acting as assistive listening devices with stationary devices. To establish a communication link (e.g., pair the two devices), a mobile device may exchange a plurality of signals over a plurality of sound waves with a stationary device. The plurality of sound waves may operate in a set of frequencies above a frequency range detectable by a human ear (e.g., above 20 kHz). After the pairing procedure over the sound waves is complete, a communication link using electromagnetic waves is established using a wireless access technology, such as Digital Enhanced Cordless Telecommunications (DECT).

The present disclosure provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

FIG. 1 illustrates a wireless communication system 100 that supports communications between devices using both sound waves and electromagnetic waves. The wireless communication system 100 may include one or more mobile devices 105, one or more stationary device 110, or one or more coordinating devices 115, or a combination thereof.

The wireless communication system 100 may be configured to integrate and coordinate the activities of a plurality of media devices at a location of a premises. For example, one or more wireless communication systems 100 may be deployed in a building that includes a plurality rooms, and each room may include a plurality of media devices such as televisions, intercoms, speakers, microphones, projectors, computers, laptops, tablets, other devices, or a combination thereof. It may be desirable to integrate the control and communications between different devices in a single room such that the outputs (e.g., video streams or audio streams) of some devices may be coordinated. In some environments, however, the devices and/or rooms may be densely packed such that communications between devices in a first room or first location may interfere with communications between devices in a second room or second location.

An example of such an environment may be a school that includes a plurality of classrooms and other rooms. An instructor may wish to present multimedia presentations to one or more classrooms or to a segment of the classroom. The wireless communication system 100 may be configured to integrate different multimedia inputs into output streams that may be selectively sent to certain devices. In this manner, the instructor may have added control of media presented in the classroom and media presented as part of multi-classroom presentations. Other examples of such environments may include office spaces, factories, residences, or any building.

The wireless communication system 100 may include one or more mobile devices 105, one or more stationary device 110, or one or more coordinating devices 115, or a combination thereof. The wireless communication system 100 may be deployed at a premises 120 (e.g., a school) that includes one or more areas 125, 130 (e.g., classrooms). Each area 125, 130 may include one or more input/output devices. Examples of input/output devices may include televisions, monitors, projectors, personal computers, desktop computers, tablets, other electronic devices, speakers, microphones, touchscreens, keyboards, mice, buttons, microphone, assistive-listening devices, or a combination thereof.

The mobile devices 105 may be examples of input/output devices that communicate with other input/output devices via communication links 135 of one or more wireless access technologies. For example, a mobile device 105 may be microphone, a tablet, or other input device. The mobile device 105 may be configured to communicate with the other input/output devices via an intermediary, such as the stationary device 110 and/or the coordinating device 115, or directly with the other devices, as the case may be. Examples of the wireless access technologies that may be used to communicate signals may include DECT, cellular radio access technologies (e.g., 3G, 4G, 5G), Wi-Fi (e.g., RATs associated with IEEE 802.11 standards), BLUETOOTH®, or a combination thereof. The mobile device 105 may be an example of a portable part (PP) in a DECT network, a user equipment (UE) in a cellular network, a station in a Wi-Fi network, a device in a BLUETOOTH® network, or a combination thereof.

The stationary device 110 may coordinate communications between input/output devices in a given area (e.g., a first area 125). The stationary device 110 may be an example of a fixed part (FP) in a DECT network, a base station or a UE in a cellular network, a station or an access point (AP) in a Wi-Fi network, a device in a BLUETOOTH® network, or a combination thereof. The stationary device 110 may also provide a low-latency connection between content sources or input devices and output devices. Some integration devices introduce latency into multimedia presentation through their processing of input data streams. For example, an instructor may use a computer and a television to present a video to a group. An integration device may cause a time delay or mismatch between the output of the computer and the output of television. Such a time delay may cause problems with the presentation. In other examples, time delays in multi-classroom presentations may cause audible echoes or difficulty communicating between classrooms. As such, a stationary device 110 that provides low-latency processing may mitigate some of these issues. In some cases, there is at least one stationary device 110 for each area of control/integration (e.g., a classroom) at a premises.

The coordinating device 115 may be an example of a server, computing device, or stationary device 110 that is configured to coordinate the communications between different areas of the premises and/or communications between different stationary devices 110 at the premises. The coordinating device 115 may be positioned at the premises or may be remote from the premises (e.g., positioned at a location that is not on the premises). The coordinating device 115 may communicate with the stationary devices 110 via communication links 140 using one or more wireless access technologies or one or more wired access technologies. For example, the coordinating device 115 may communicate with the stationary devices 110 using ethernet, DECT, cellular radio access technologies (e.g., 3G, 4G, 5G), Wi-Fi (e.g., RATs associated with IEEE 802.11 standards), BLUETOOTH®, or a combination thereof.

Environments that are densely populated with input devices and output devices may have a problem with pairing between devices in different areas when using certain wireless access technologies (e.g., DECT). For example, an input device (e.g., mobile device 105-b, which may be a microphone) in a second area 130 may be paired with an output device (e.g., a speaker) or a stationary device 110-a in a first area 125. When a person in the second area 130 uses the input device (e.g., mobile device 105-b), the output may be mistakenly sent to the first area 125, and potentially cause a disruption in the first area 125. This may occur because some radio frequency waves can penetrate and/or travel through some physical barriers such as walls that are used to define separations between areas. The wireless communication system 100 may be configured to minimize pairings between areas and/or to increase the locality of the paired devices.

The wireless communication system 100 may be configured to establish and/or maintain communication links 135 between devices using signals communicated over high-frequency sound waves. For example, to establish a communication link 135 (e.g., pair the two devices), the mobile device 105 may exchange a plurality of signals over a plurality of sound waves with a stationary device 110. The plurality of sound waves may operate in a set of frequencies above a frequency range detectable by a human ear (e.g., above 20 kHz) and may be referred to as ultrasonic frequencies or high-frequency audio. The communication link 135 may be established using a radio frequency access technology, such as DECT, after the pairing procedure over the sound waves is complete. Using sound waves to pair devices and maintain device pairings may increase the locality of device pairings because sound waves cannot penetrate walls and many structures. Using a radio access technology for exchanging information between devices may maintain data throughputs that may be difficult to achieve when using high-frequency sound waves to communicate modulated data.

Figure 2:
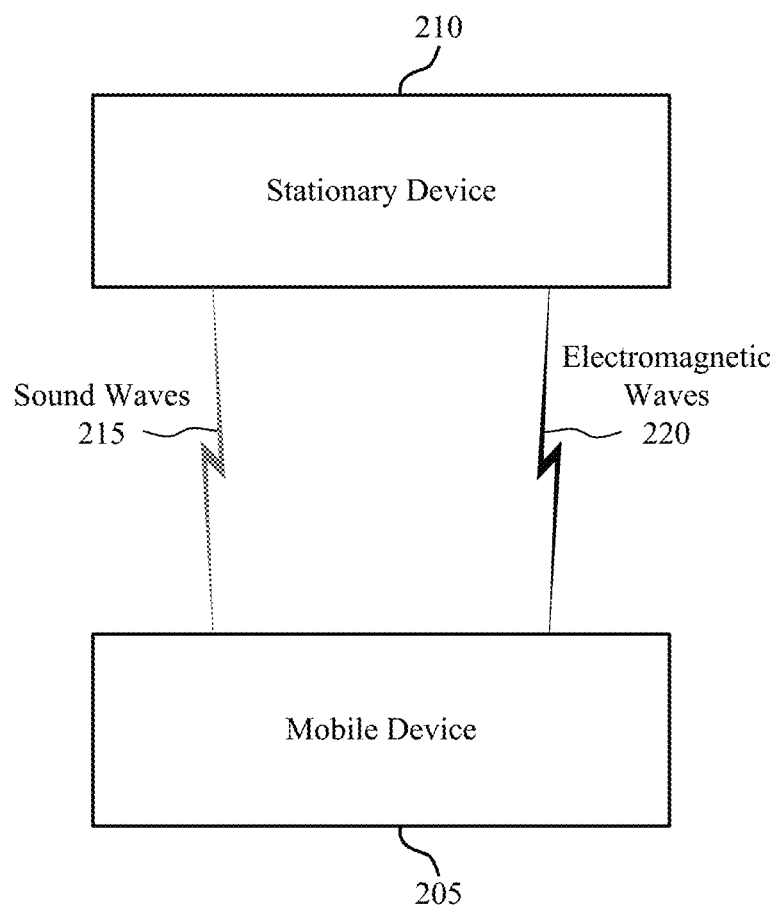
FIG. 2 illustrates a wireless communication system that supports communications between devices using sound waves and electromagnetic waves.

FIG. 2 illustrates a wireless communication system 200 that supports communications between devices using both sound waves and electromagnetic waves. The wireless communication system 200 includes a mobile device 205 and a stationary device 210. The wireless communication system 200 may be an example of the wireless communication system 100 as described with reference to FIG. 1. The mobile device 205 may be an example of the mobile devices 105 described with reference to FIG. 1. The stationary device 210 may be an example of the stationary devices 110 described with reference to FIG. 1.

The mobile device 205 and the stationary device 210 may be configured to exchange information using both sound waves 215 (e.g., high-frequency audio signals) and electromagnetic waves 220 (e.g., radio frequency signals). The sound waves 215 may be configured to carry information that establishes communication links (e.g., communication links 135) of at least one of the wireless access technology (e.g., DECT), maintains the communication links of the at least one wireless access technology, or communicates emergency signals. The electromagnetic waves 220 may be examples of waves that carry information modulated using at least one wireless access technologies (e.g., DECT). The electromagnetic waves 220 may be the carrier waves that are communicated as part of a wireless communication link 135 established between the mobile device 205 and the stationary device 210.

Both the sound waves 215 and the electromagnetic waves 220 may be physical manifestations of vibrations. The sound waves 215 may be examples of energy traveling through a medium, such as a gas, liquid, or solid. The sound waves 215 travel through the medium by causing molecules of the medium to bump against one another. The sound waves 215 may be examples of longitudinal waves that oscillate in the same direction as the travel of the wave. Electromagnetic waves 220 may be examples of transverse waves that oscillate orthogonally to the direction of travel of the wave. Electromagnetic waves 220 can travel through a vacuum and, thus, do not need a medium to travel through space.

The sound waves 215 and electromagnetic waves 220 may operate in the same frequency ranges or in different frequency ranges. Because the waves themselves are different, sound waves 215 and electromagnetic waves 220 may not interfere with each other, even when operating at or near the same frequency.

Many devices use electromagnetic waves 220 to wirelessly communicate with each other. In fact, many, if not most, wireless communication systems rely on electromagnetic waves 220 to act as carriers for modulated data. Depending on the frequencies of the electromagnetic waves 220, many waves can penetrate and travel through solid objects. In many situations, this provides many advantages. For example, a phone in a building is able to maintain a communication link with base stations outside of the building and/or Wi-Fi deployments cover more than one room in a building.

In dense environments where many electronic devices are present and trying to communicate using electromagnetic waves 220, the frequency spectrum band for communicating signals can get crowded. Further, different devices may interfere with one another or may inadvertently be paired with one another. For example, a mobile device 205 in a first room may pair with a stationary device 210 in a second room causing problems for both rooms.

In such dense environments, sound waves 215 may have the advantage of being impeded or attenuated by some physical objects. For example, high-frequency sound waves may be heavily attenuated by walls or other structures. As such, sound waves may be used to pair devices in wireless access technology and/or maintain pairings between devices in the wireless access technology to reduce the amount of interference and/or inadvertent pairings between devices.

Figure 3:
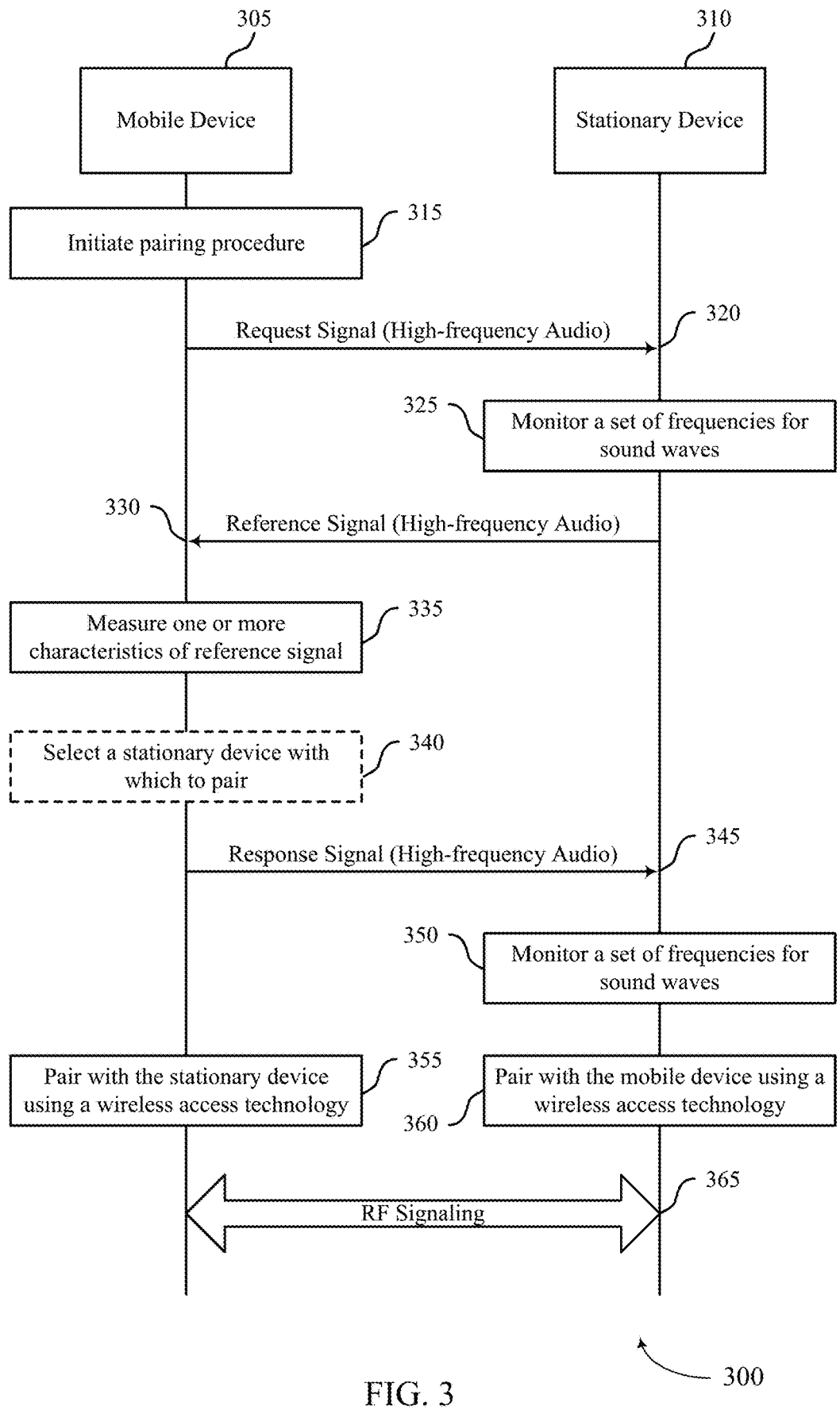
FIG. 3 illustrates a process flow for pairing devices using signals communicated using sound waves and electromagnetic waves.

FIG. 3 illustrates a process flow 300 for pairing devices using signals communicated using sound waves and electromagnetic waves. The process flow 300 illustrates procedures and/or communications for pairing, using one or more sound waves, a mobile device 305 with a stationary device 310 in a wireless access technology (e.g., DECT). The mobile device 305 may be an example of the mobile devices 105 and 205 described with reference to FIGS. 1-2. The stationary device 310 may be an example of stationary devices 110 and 210 described with reference to FIGS. 1-2.

At block 315, the mobile device 305 may initiate a pairing procedure. The pairing procedure may be to pair the mobile device 305 with the stationary device 310 or one or more other mobile devices in a wireless access network, such as DECT. In some cases, the stationary device or the one or more other mobile devices may initiate the pairing procedure.

The mobile device 305 may broadcast one or more request signals 320 over sound waves (e.g., high-frequency audio). The request signal 320 may be an example of a first signal that requests establishment of a communication link using a wireless access technology (e.g., DECT). In some cases, the request signal 320 may be modulated with information. For example, the request signal 320 may include an identifier of the device (e.g., mobile device 305) that is transmitting the request signal 320, an identifier of the wireless access technology for which pairing is being requested, or an indication of the type of device that is transmitting the request signal 320, or a combination thereof. In some cases, the request signal 320 may be an example of a reference signal. In some cases, the request signal 320 may be an example of a tone transmitted at a set frequency and may not include modulated information.

At block 325, the stationary device 310 (or another mobile device 305, as the case may be) may monitor a set of frequencies for the request signal 320. The mobile device 305 and the stationary device 310 may be configured to communicate the request signal 320 over at least one frequency spectrum band of a range of frequency spectrum bands. Because requests to pair devices can come at any time, the receiving device (e.g., the stationary device 310) may monitor the set of frequencies continuously or periodically. The receiving device (e.g., the stationary device 310) may determine that request signal 320 is received based on monitoring the set of frequencies during one or more time periods.

The stationary device 310 may transmit a reference signal 330 based at least in part on receiving the request signal 320. The reference signal 330 may be transmitted over one or more sound waves. The reference signal 330 may be configured to allow the mobile device 305 (e.g., the transmitting device) to determine one or more characteristics about the reference signal 330. For example, the reference signal 330 may be transmitted at a frequency and/or at a transmit power that is known by the mobile device 305. In some cases, the reference signal 330 may be modulated with information. For example, the reference signal 330 may include an identifier of the device (e.g., stationary device 310) that is transmitting the reference signal 330, an identifier of the wireless access technology for which pairing is requested, or a combination thereof. In some cases, the reference signal 330 may be an example of a tone transmitted at a set frequency and may not include modulated information.

At block 335, the mobile device 305 may measure one or more characteristics of the reference signal 330 based on receiving the reference signal 330. For example, the mobile device 305 may determine a signal strength of the reference signal 330. In some cases, the mobile device 305 may know beforehand the transmit power of the reference signal 330 or other transmit characteristics of the reference signal 330. The mobile device 305 may determine a difference between a transmit characteristic (e.g., transmit power) of the reference signal 330 and a receive characteristic (e.g., received power) of the reference signal 330. The mobile device 305 may be configured to determine the one or more characteristics of the reference signal based at least in part on comparing transmit characteristics with received characteristics.

At block 340, the mobile device 305 may optionally select a stationary device with which to pair. In some cases, the mobile device 305 may receive a reference signal 330 from a plurality of devices (e.g., one or more stationary devices 310 and/or one or more other devices). When the mobile device 305 receives more than one reference signal 330 in response to transmitting the request signal 320, the mobile device 305 may have to determine which stationary device to pair with. In some cases, the mobile device 305 may compare the measured characteristics of the received references signals to determine which reference signal is best. The mobile device 305 may then select the stationary device with the best characteristics and begin the pairing operation with that stationary device. For example, the mobile device 305 may compare the received powers of each reference signal 330 and determine which reference signal has the greatest received power. The stationary device 310 with the greatest received power may be selected, wherein the received power may provide an indication of proximity to a given stationary device 310. In some cases, the mobile device 305 may use any combination of characteristics and/or comparisons to select a stationary device with which to pair.

The mobile device 305 may transmit a response signal 345 to the stationary device 310 in response to receiving the reference signal 330. The mobile device 305 may transmit the response signal 345 to the device selected by the mobile device 305. The response signal 345 may be communicated over sound waves. In some cases, the response signal 345 may be modulated with information. For example, the response signal 345 may include an identifier of the device (e.g., mobile device 305) that is transmitting the response signal 345, an identifier of the wireless access technology for which pairing is requested, or a combination thereof. In some cases, the identifier of the mobile device 305 may be an identifier associated with the mobile device for a wireless access technology for which pairing is requested. For example, the identifier may be a DECT identifier that identifies the mobile device 305 in a DECT network. In some cases, the response signal 345 may be an example of a tone transmitted at a set frequency and may not include modulated information.

At block 350, the stationary device 310 may monitor a set of frequencies for the response signal 345. The mobile device 305 and the stationary device 310 may be configured to communicate the response signal 345 over at least one frequency spectrum band of a range of frequency spectrum bands. The receiving device (e.g., the stationary device 310) may monitor the set of frequencies continuously or periodically. In some cases, the stationary device 310 may monitor the set of frequencies for the response signal 345 for a time period that starts when the request signal 320 is received or when the reference signal 330 is transmitted. If the stationary device 310 does not receive the response signal 345 within the time period, the stationary device 310 may terminate the pairing procedure and may again monitor for request signals from the mobile device 305. In some cases, the stationary device 310 may monitor for response signals 345 and request signals simultaneously or on a periodic basis.

In some cases, the response signal 345 is an example of a reference signal. At block 350, the stationary device 310 may measure one or more characteristics of the response signal 345. For example, the stationary device may measure a signal strength of the response signal 345. The stationary device 310 may determine characteristics associated with the response signal 345 using any of the techniques described with reference to the reference signal 330.

At block 355 and block 360, the mobile device 305 and/or the stationary device 310 may pair with the other device using a wireless access technology (e.g., DECT). Once the signaling is exchanged over the sounds waves (e.g., the request signal 320, reference signal 330, and response signal 345), the mobile device 305 and/or the stationary device 310 may initiate the pairing procedure associated with the selected wireless access technology. For example, the mobile device 305 and/or the stationary device 310 may initiate a pairing procedure as defined for DECT network to pair the devices in the DECT network. Signals in such a pairing procedure may be communicated using electromagnetic waves (e.g., radio frequency signals). During the pairing procedure for the wireless access technology, the mobile device 305 and the stationary device 310 may exchange one or more radio frequency signals transmitted over electromagnetic waves. For example, the mobile device 305 and the stationary device 310 may initiate a pairing procedure for a DECT network and exchange signaling, which may be part of a standardized pairing procedure.

Once the pairing procedure for the wireless access technology is complete, the mobile device 305 and the stationary device 310 may begin exchanging information via signaling 365 defined by the wireless access technology. For example, if the mobile device 305 is a microphone, the mobile device 305 may transmit audio information to the stationary device 310 using the DECT network (e.g., using signaling 365).

The signaling 365 may carry any type of information supported by the wireless access network (e.g., DECT). In some cases, the wireless communication system, which includes the mobile device 305 and the stationary device 310, may communicate multimedia information between input/output devices and/or the stationary device 310. For example, if the mobile device 305 is a microphone, the signaling 365 may carry audio information from the mobile device 305 to the stationary device 310. The signaling 365 may carry any information (e.g., data information or control information) that may be used by the stationary device 310.

In some cases, the stationary device 310 may be configured to handle traffic that has varying priorities. For example, the stationary device 310 communicate a first set of information (e.g., a first audio stream) with one or more mobile devices via signaling 365 and/or one or more other input/output devices via wireless signaling or wired signaling. The stationary device 310 may receive a second set of information that is priority traffic (e.g., a second audio stream) while communicating the first set of information.

For example, the stationary device 310 may receive an intercom message over a premises intercom system. The stationary device 310 may determine that the second set of information has a higher priority than the first set of information, interrupt the first set of information, and communicate the second set of information. When interrupting data, such as an audio stream or a visual stream, the interrupted data may be paused or it may be overwritten by the priority data.

In the process flow 300, the mobile device 305 and the stationary device 310 may perform a first pairing procedure using sound waves and a second pairing procedure, subsequent to the first pairing procedure being successful, using electromagnetic waves. The second pairing procedure may be associated with the wireless access technology being used. Using the first pairing procedure may allow a wireless communication system to more accurately define the locations of mobile devices 305 and may mitigate interference between devices and incorrect pairings of devices. For example, because the sound waves may be heavily attenuated by physical objects, this dual pairing procedure technique may prevent mobile devices in a first room from pairing with a stationary device in a second room.

Figure 4:
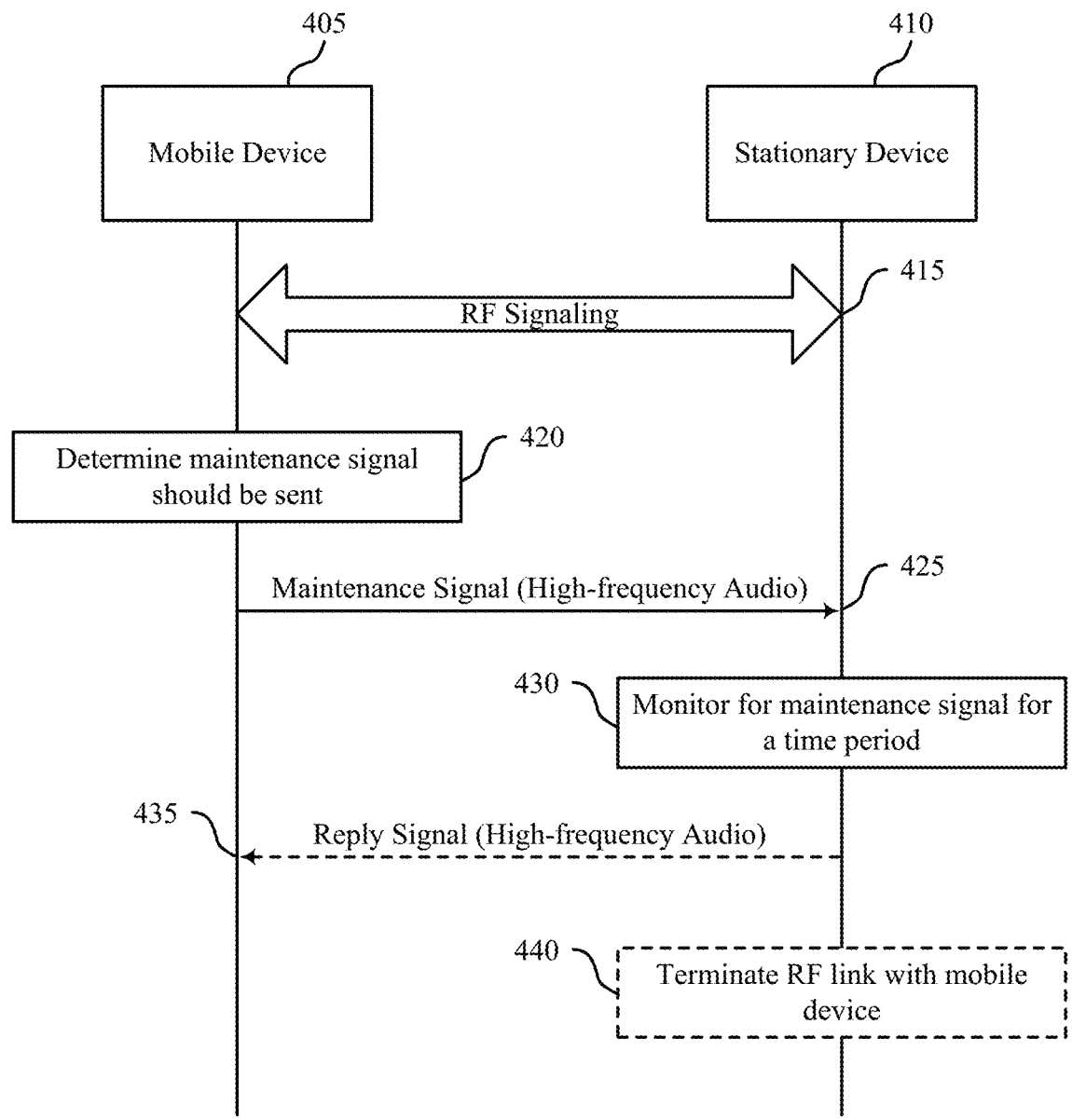
FIG. 4 illustrates a process flow for maintaining a communication link between devices using sound waves and electromagnetic waves.

FIG. 4 illustrates a process flow 400 for maintaining a communication link between devices using sound waves and electromagnetic waves. The process flow 400 illustrates procedures and/or communications for maintaining, using one or more sound waves, a pairing between a mobile device 405 with a stationary device 410 in a wireless access technology (e.g., DECT). The mobile device 405 may be an example of the mobile devices 105, 205, and 305 described with reference to FIGS. 1-3. The stationary device 410 may be an example of stationary devices 110, 210, and 310 described with reference to FIGS. 1-3. The process flow 400 may implement aspects or be combined with the process flow 300 described with reference to FIG. 3.

The mobile device 405 and the stationary device 410 may be devices paired using a wireless access technology (e.g., DECT). As such, the mobile device 405 and the stationary device 410 may exchange information using one or more radio frequency signals 415 defined by the wireless access technology. For example, if the mobile device 405 is a microphone, the mobile device 405 may transmit audio information and/or control information to the stationary device 410 via one or more signals of the wireless access technology. In some cases, the stationary device 410 may then direct that information to one or more output devices (e.g., speakers or a television) coupled with the stationary device 410. The mobile device 405 and the stationary device 410 may use one or more signals communicated over sound waves to determine whether the communication link of the wireless access technology should be maintained. In some cases, the signaling 415 may be an example of the signaling 365 described with reference to FIG. 3.

At block 420, the mobile device 405 may determine whether a maintenance signal 425 should be transmitted to the stationary device 410. The mobile device 405 may include a timer, a counter, some other indicator, or a combination thereof for determining when a maintenance signal 425 should be sent. In some examples, the mobile device 405 may include a timer that starts when the last maintenance signal 425 was transmitted or when the last reply signal 435 was received. When the timer satisfies a threshold, the mobile device 405 may transmit another maintenance signal 425. In some examples, the mobile device 405 may include a counter that counts a number of cycles since the last maintenance signal 425 was transmitted or when the last reply signal 435 was received. When the counter satisfies a threshold, the mobile device 405 may transmit another maintenance signal 425.

In some examples, the mobile device 405 may include components to track an amount of time since the last communication between the mobile device 405 and the stationary device 410. In such examples, it may be desirable not to send maintenance signals 425 when the mobile device 405 and the stationary device 410 are actively transmitting data back and forth. In other cases, however, because the maintenance signals sent via sound waves and the data is sent via electromagnetic waves, the maintenance signals 425 may be sent at a periodicity that is independent of any signaling 415.

The mobile device 405 may transmit the maintenance signal 425 over sound waves, which may be examples of high-frequency audio. In some cases, the maintenance signal 425 may include information about the mobile device 405. For example, the maintenance signal may include an identifier of the device (e.g., mobile device 405) that is transmitting the maintenance signal 425, an identifier of the wireless access technology for which pairing is being maintained, or an indication of the type of device that is transmitting the maintenance signal 425, or a combination thereof.

At block 430, the stationary device 410 may monitor for the maintenance signal 425 for a time period. The time period may start after the last communication over signaling 415 was received from the mobile device 405, the last communication over sound waves was received from the mobile device 405, or the time period may be based on a timer or counter, or a combination thereof. In some cases, the maintenance signal 425 may be an example of a tone transmitted at a set frequency and may not include modulated information. In some cases, the maintenance signal 425 may be an example of a reference signal.

If the stationary device 410 receives the maintenance signal 425 during the time period, the stationary device 410 may transmit a reply signal 435 over sound waves. In some cases, the reply signal 435 may include information about the mobile device 405. For example, the maintenance signal may include an identifier of the device (e.g., mobile device 405) that is transmitting the reply signal 435, an identifier of the wireless access technology for which pairing is being maintained, or an indication of the type of device that is transmitting the reply signal 435, or a combination thereof. In some cases, the reply signal 435 may be an example of a reference signal.

If the stationary device 410 does not receive a maintenance signal 425 within the time period, at block 440, the stationary device 410 may terminate communication link with the mobile device 405 that uses the wireless access technology (e.g., DECT). In this manner, signaling over sound waves may be used to maintain communication links that are independent from the sounds waves (e.g., signaling using electromagnetic waves). An advantage to using sound waves for maintenance signaling is that if the mobile device 405 leaves an area or a room, the stationary device 410 may terminate the communication link to prevent an input device in a first room from outputting information to devices in a second room inadvertently.

Figure 5:
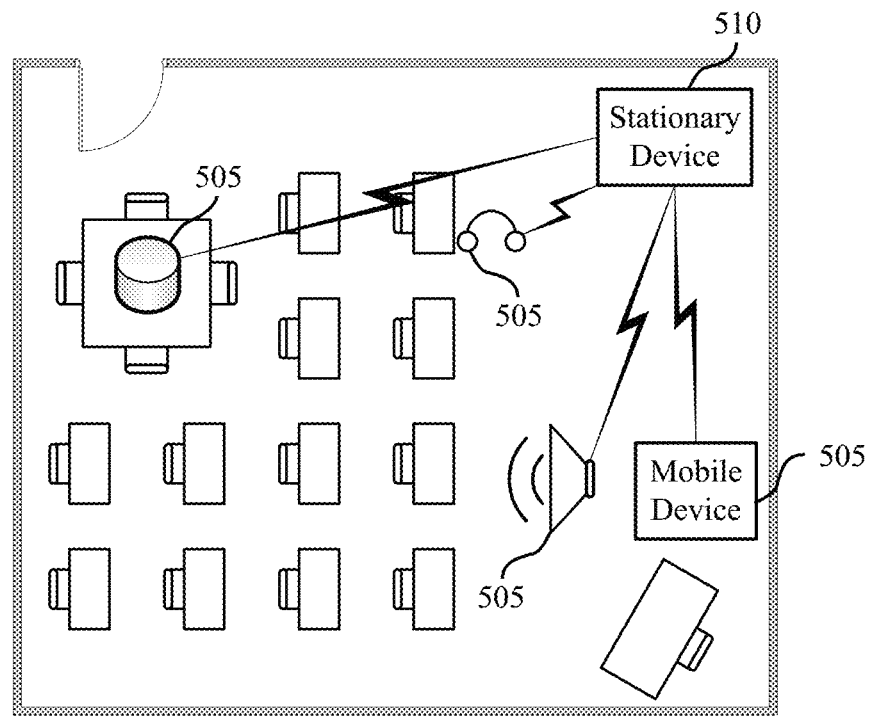
FIG. 5 illustrates an assistive listening system that supports using both sound waves and electromagnetic waves to communicate.

FIG. 5 illustrates an assistive listening system 500 that supports using both sound waves and electromagnetic waves to communicate. The assistive listening system 500 may include one or more mobile devices 505 and/or one or more stationary device 510. The mobile device 505 may be an example of the mobile devices 105, 205, 305, and 405 described with reference to FIGS. 1-4. The stationary device 510 may be an example of stationary devices 110, 210, 310, and 410 described with reference to FIGS. 1-4. The assistive listening system 500 may implement aspects of the wireless communication systems 100 and 200 described with reference to FIGS. 1 and 2 and the process flows 300 and 400 described with reference to FIGS. 3 and 4.

Assistive listening systems are systems that may include one or more assistive listening devices that bring sound directly to an ear of the listener. People show varying degrees of hearing at varying frequencies in both ears. Sometimes to account for the variability in hearing, it may be beneficial to provide customizable sound to individual listeners or individual areas in a room. In this manner, people may be able to hear and understand a presentation without making it too loud or soft for others listening to the same presentation.

The assistive listening system 500 may include a stationary device 510, which may serve as an integration device and/or a central managing device of the assistive listening system 500. The stationary device 510 may receive audio information to be output through the assistive listening system 500 from a variety of sources. Examples of the sources of audio information that may be received by the stationary device 510 may include a public announcement system, a microphone, a television, a computer, a tablet, a smart phone, or other multimedia device, or a combination thereof.

The stationary device 510 may be configured to transmit one or more assistive listening audio streams to one or more mobile devices 505, which may be assistive listening devices. Examples of assistive listening devices may include headphones, speakers, cochlear implants, voice-controlled speakers, smart speakers, or a combination thereof.

The stationary device 510 may serve an area of a premises, such as a room. In some cases, the entire area served by the stationary device 510 may be participating in the same presentation. In such cases, the stationary device 510 may transmit the same audio stream to every mobile device 505 that is acting as an assistive listening device. In other cases, different regions of the area or different individuals in the area may be participating in different presentations. In such cases, the stationary device 510 may be configured to transmit different audio streams to different mobile device 505 that are acting as assistive listening devices. In some cases, the stationary device 510 may be configured to control the output volume of the audio information at the assistive listening devices. In this manner, a person may have centralized control over multiple assistive listening devices in the area and can manage the volume levels to minimize interference. For example, first speaker may be outputting a first audio stream into a first region of a room and a second speaker may be outputting a second audio stream into a second region of the room and the stationary device 610 may be configured to control the volume of each speaker.

The assistive listening system 500 may use sound waves to pair the mobile devices 505 acting as assistive listening devices with the stationary devices 510. When the devices are paired, a communication link using electromagnetic waves is established using a wireless access technology such as DECT. In some cases, the assistive listening system 500 may implement the pairing techniques described with reference to FIG. 3 and the maintenance techniques described with reference to FIG. 4.

Figure 6:
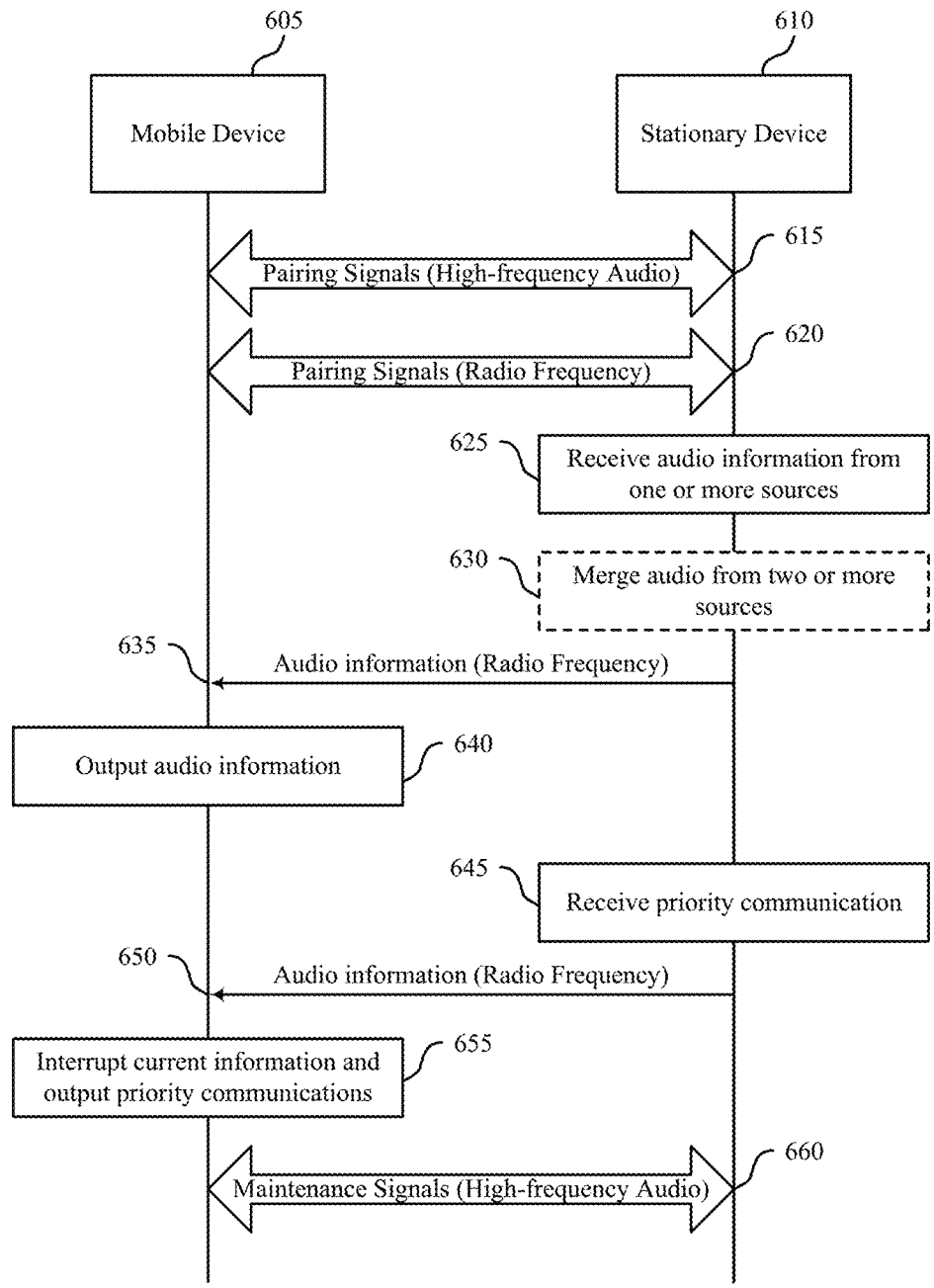
FIG. 6 illustrates a process flow for running an assistive listening system using sound waves and electromagnetic waves to communicate.

FIG. 6 illustrates a process flow 600 for running an assistive listening system (e.g., the assistive listening system described with reference to FIG. 5) using sound waves and electromagnetic waves to communicate. The process flow 600 illustrates procedures and/or communications between a mobile device 605 with a stationary device 610 in a wireless access technology (e.g., DECT). The mobile device 605 may be an example of the mobile devices 105, 205, 305, 405, and 505 described with reference to FIGS. 1-5. The stationary device 610 may be an example of stationary devices 110, 210, 310, 410, and 510 described with reference to FIGS. 1-5. The process flow 600 may implement aspects or be combined with the process flows 300 and 400 described with reference to FIGS. 3 and 4.

The mobile device 605 may be an example of an assistive listening device in an assistive listening system. The stationary device 610 may be an example of central managing device that coordinates the activities of the mobile devices 605 and/or transmit the audio information to the mobile devices 605 to be output by the mobile devices 605.

The assistive listening system may use a wireless access technology, such as DECT) to communicate audio information from the stationary device 610 to one or more mobile devices 605. In some cases, the mobile device 605 and the stationary device 610 may exchange one or more pairing signals communicated over sound waves to, at least partially, pair the mobile device 605 with the stationary device 610. The mobile device 605 and the stationary device 610 may exchange one or more pairing signals 620 communicated over electromagnetic waves to, at least partially, pair the mobile device 605 with the stationary device 610. In some cases, the mobile device 605 and the stationary device 610 may implement the pairing techniques described with reference to FIG. 3 and the pairing signals 615 may be examples of the signals described with reference to FIG. 3.

At block 625, the stationary device 610 may receive audio information from one or more sources of audio information. Examples of the sources of audio information that may be received by the stationary device 510 may include a public announcement system, a microphone, a television, a computer, a tablet, a smart phone, DVD player, video home system (VHS) player, cassette player, compact disc (CD) player, or other multimedia device, or a combination thereof. The stationary device 610 may receive the audio information using wired communication links (e.g., ethernet or RS-232), wireless communication links (e.g., DECT, BLUETOOTH®, etc.), or a combination thereof. The sources of audio information may be positioned in the area served by the stationary device 610. In some cases, some sources of audio information may be positioned outside of the area served by the stationary device 610.

In some cases, at block 630, the stationary device 610 may be configured to integrate audio from multiple sources into a single set of assistive listening audio information. For example, the stationary device 610 may integrate audio information received from a television with audio information received from a microphone. In this manner, the assistive listening system may be configured to capture all of the audio from a presentation that includes multiple sources of audio.

The stationary device 610 may transmit audio information 635 to one or more mobile devices 605 acting as assistive listening devices. The audio information 635 may be communicated over electromagnetic waves using a wireless access technology such as DECT. The audio information 635 may be communicated using wired communication links (e.g., ethernet or RS-232), wireless communication links (e.g., DECT, BLUETOOTH®, etc.), or a combination thereof.

At block 640, the mobile device 605 may be configured to output the audio information to the listeners associated with the audio information. The audio information may be output through a speaker integrated into a variety of different types of mobile devices 605.

In some cases, at block 645, the stationary device 610 may receive a priority communication while transmitting or causing to be output audio information as part of an assistive listening system. An example of a priority communication may be a panic alert or information received over a public announcement system. The stationary device 610 may determine that the second set of audio information has a higher priority than the audio information already being output as part of the assistive listening system.

The stationary device 610 may transmit, to the mobile devices 605 acting as assistive listening devices, the audio information 650 that comprises the priority communication to one or more mobile devices 605 acting as assistive listening devices. The audio information 635 may be communicated over electromagnetic waves using a wireless access technology such as DECT. The audio information 635 may be communicated using wired communication links (e.g., ethernet or RS-232), wireless communication links (e.g., DECT, BLUETOOTH®, etc.), or a combination thereof.

In some cases, at block 655, the mobile device 605 may interrupt the current audio output and output the audio information 650 received as a priority communication. In some cases, the priority communications may cause the first set of audio information to be paused. In some cases, the priority communications may override the first set of audio information. In this manner, priority audio may be configured to reach their destination before lower priority audio.

In some cases, the mobile device 605 and the stationary device 610 may exchange one or more maintenance signals 660 communicated over sound waves to, at least partially, maintain the communication link between the mobile device 605 and the stationary device 610 established using the wireless access technology (e.g., DECT). In some cases, the mobile device 605 and the stationary device 610 may implement the maintenance techniques described with reference to FIG. 4 and the maintenance signals 660 may be examples of the signals described with reference to FIG. 4.

Figure 7:
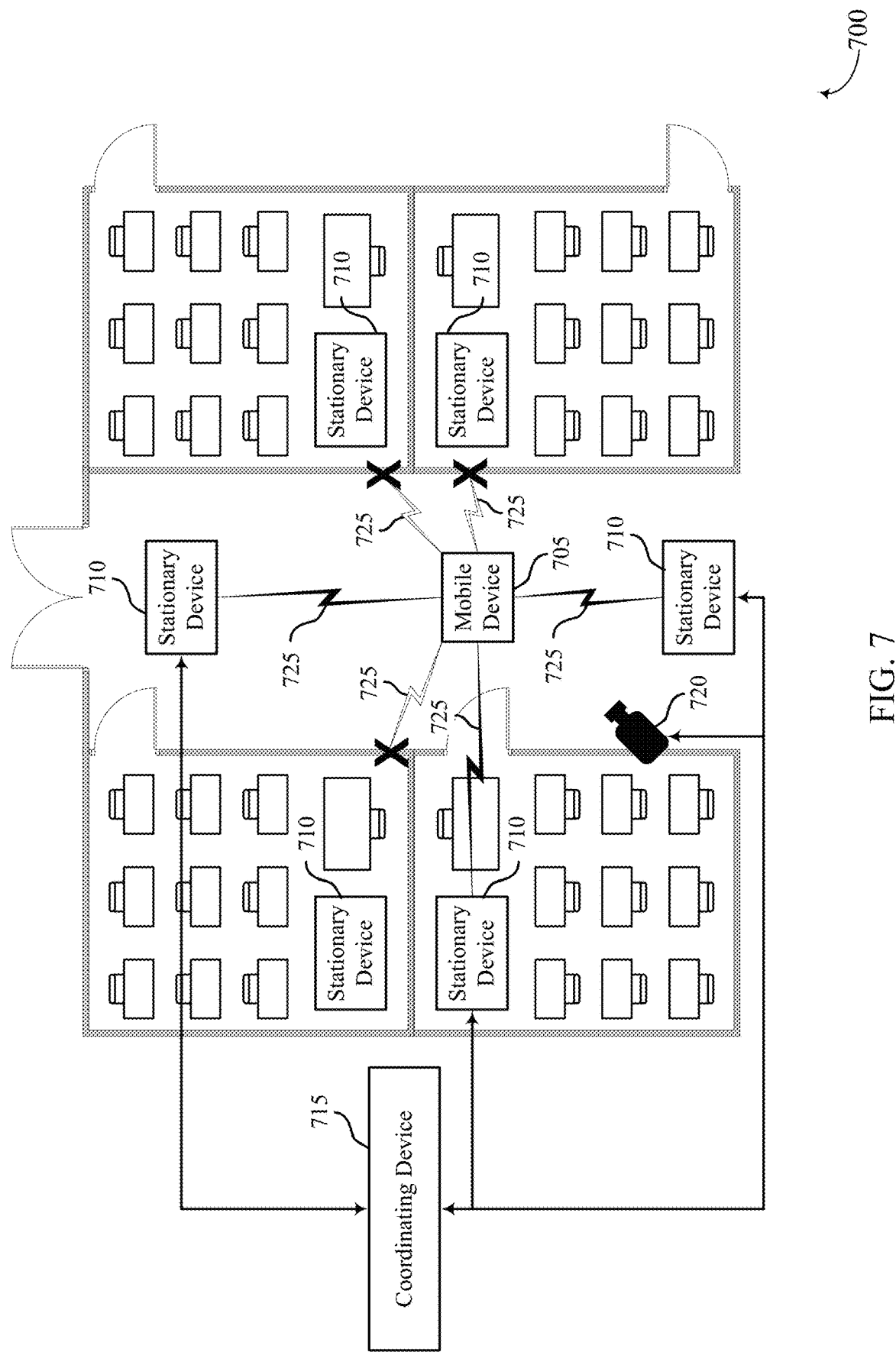
FIG. 7 illustrates a wireless communication system that supports using sound waves to communicate an alert signal.

FIG. 7 illustrates a wireless communication system 700 that supports using sound waves to communicate an alert signal. The wireless communication system 700 may include one or more mobile devices 705, one or more stationary device 710, one or more coordinating devices 715, and one or more other devices 720. The mobile device 705 may be an example of the mobile devices 105, 205, 305, 405, 505, and 605 described with reference to FIGS. 1-6. The stationary device 710 may be an example of stationary devices 110, 210, 310, 410, 510, and 610 described with reference to FIGS. 1-6. The coordinating device 715 may be an example of the coordinating device 115 described with reference to FIG. 1. The wireless communication system 700 may implement aspects of the wireless communication systems 100 and 200 described with reference to FIGS. 1 and 2, the assistive listening system 500 described with reference to FIG. 5, and the process flows 300, 400, and 600 described with reference to FIGS. 3, 4, and 6.

Many electromagnetic waves used as carrier waves for wireless communications are capable of penetrating and passing through objects such as structures. This feature of the waves allows for wireless communication systems to function in structures and in dense environments. This feature may also make it more difficult to determine a location of a mobile device 505 in the wireless network. For example, if a mobile device 505 transmits a message, and the network tries to determine its location it can be difficult because the signal could take a wide variety of paths to get to a large number of receivers.

Many sound waves, however, are not capable of penetrating or passing through many objects such as structures. Because the sound waves are longitudinal waves, the structures disrupt the medium that the wave is passing through. Consequently, the number of signal paths that a sound wave may take to reach a receiver are reduced. Such a feature may allow a wireless communication system to more accurately determine a location of the mobile device 705 transmitting a signal in the wireless communication system 700. Being able to identify a location of a transmitting device may be helpful when the device is transmitting alert message or panic messages seeking assistance.

The mobile device 705 may transmit a signal 725 using one or more sound waves. The signal may be an alert signal or a panic signal that is requesting assistance to the location of the mobile device 705. When using sound waves to transmit the signal 725, some of the signals 725 (e.g., within line of sight or within hearing range) may reach receivers (e.g., stationary devices 710), while some of the signals 725 may not reach receivers. The coordinating device 715 may be configured to determine a location of the mobile device 705, at the time it transmitted the signal 725, based on the locations of the receivers (e.g., stationary devices 710) that received the signal 725. If the signal 725 were transmitted using electromagnetic waves (e.g., transverse waves), more receivers may receive the signal 725 and thereby make the determination of the location more difficult. The coordinating device 715 may communicate with the stationary devices 710 (e.g., the receiving devices) using wired communication links, wireless communication links, or a combination thereof.

The coordinating device 715 upon identifying that an alert signal or panic signal has been received and determining the location of the transmission of the signal, may activate one or more other devices 720 in the area around the location of the mobile device 705 to record the activities at the location or serve other functions. Examples of the other devices 720 may include cameras, microphones, speakers, other devices, or a combination thereof. Examples of the actions that can be initiated by the coordinating device 715 in response to receiving the alert or panic signal may include causing one or more cameras to record visual data, causing one or more microphones to record audio data, causing one or more speakers to alert individuals near the request for assistance, and/or open a two-way communication channel between the mobile device 705 and/or one or more remote locations (e.g., 911 call center, an office or central location at the premises, or other locations).

In some cases, the wireless communication system 700 may be implemented in a school or office environment. In such environments, stationary devices 710 may be configured differently based on their location. Some stationary devices 710 may be configured as integration devices to control input/output devices in a given area (e.g., a classroom, conference room, or other room). Some stationary devices 710 may be configured as listening devices that listen for alert, panic signals, or other signals transmitted using sound waves. These stationary devices 710 may not coordinate activities with input/output devices in an area. These stationary devices 710 may be reception devices integrated with lights, plugs, or switches in a building. These stationary devices 710 may be added to any location that is connected to a power source. In some cases, these stationary devices 710 may be battery powered.

Figure 8:
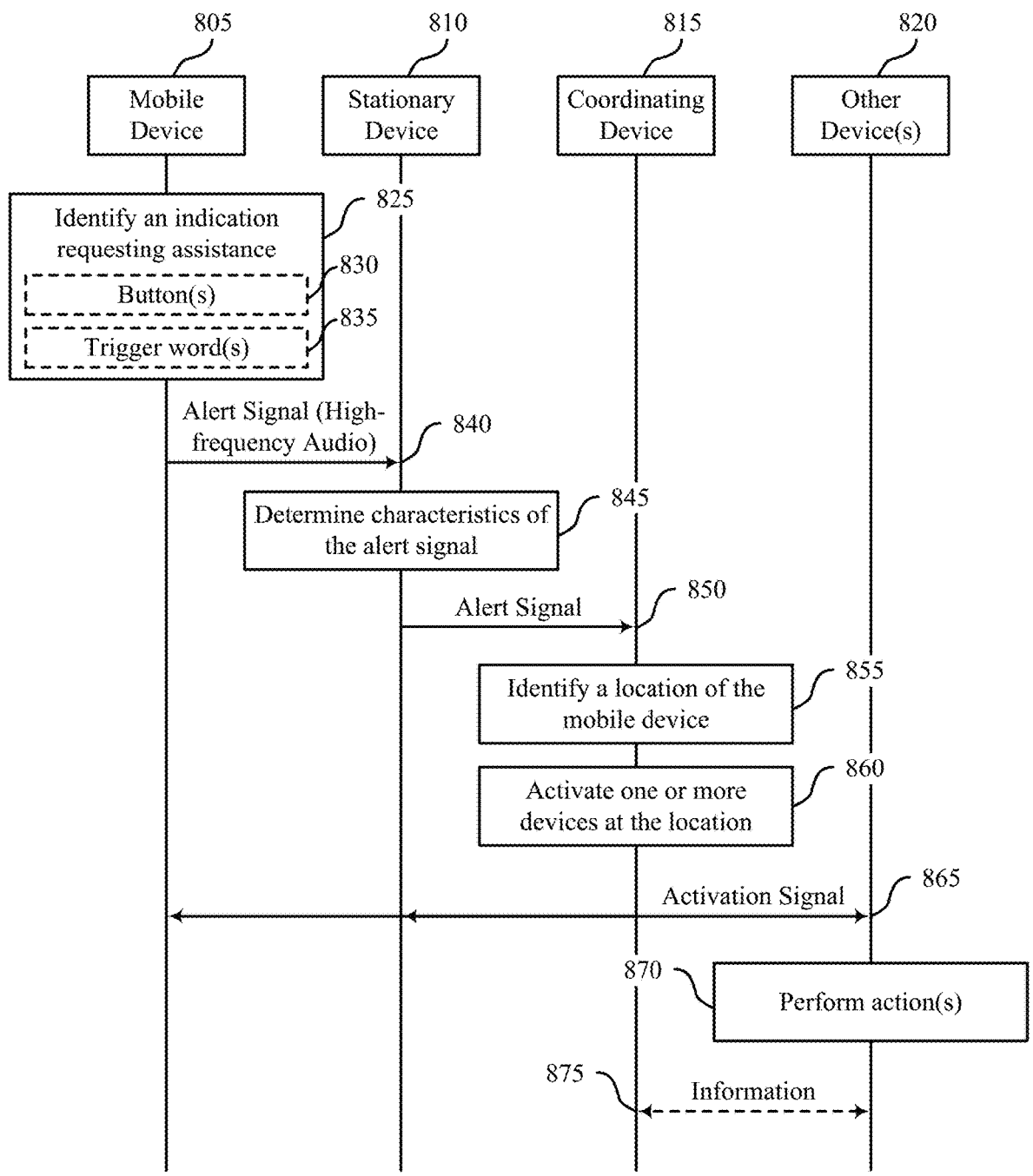
FIG. 8 illustrates a process flow for using sound waves to communicate an alert signal.

FIG. 8 illustrates a process flow 800 for using sound waves to communicate an alert signal. The process flow 800 illustrates procedures and/or communications between a mobile device 805, a stationary device 810, a coordinating device 815, and one or more other devices 820. The mobile device 805 may be an example of the mobile devices 105, 205, 305, 405, 505, 605, and 705 described with reference to FIGS. 1-7. The stationary device 810 may be an example of stationary devices 110, 210, 310, 410, 510, 610, and 710 described with reference to FIGS. 1-7. The coordinating device 815 may be an example of the coordinating devices 115 and 715 described with reference to FIGS. 1 and 7. The other devices 820 may be examples of the other devices 720 described with reference to FIG. 7. The process flow 800 may implement aspects or be combined with the process flows 300, 400, and 600 described with reference to FIGS. 3, 4, and 6.

At block 825, the mobile device 805 may identify an indication requesting assistance. The indication may be initiated using a variety of ways. In some cases, the mobile device 805 may include one or more buttons that when pushed alone or some combination may cause the mobile device to broadcast the alert signal 840. For example, at block 830, the mobile device 805 may determine that one or more buttons are actuated in a predetermined sequence that may include pushing two to more buttons concurrently or pushing one or more buttons in a pattern. When the mobile device 805 detects that the predetermined sequence of button pushes has been received, the mobile device 805 may transmit the alert signal 840. In some cases, at block 835, the mobile device 805 may include a microphone that is periodically listening for one or more triggers words. Examples of trigger words may include any "Help." When the mobile device 805 detects the trigger word, the mobile device 805 may transmit the alert signal 840. Detecting the trigger word may include detecting the trigger word in multiple languages.

The alert signal 840 may be transmitted over sound waves (e.g., high-frequency audio) the operate in a range frequencies above the frequency range detectible by the human ear. In some cases, the alert signal 840 may be modulated with information. For example, the alert signal 840 may include an identifier of the device (e.g., mobile device 805) that is transmitting the alert signal 840, or an indication of the type of device that is transmitting the alert signal 840, or a combination thereof. In some cases, the alert signal 840 may be an example of a tone transmitted at a set frequency and may not include modulated information. In some cases, the alert signal 840 may be an example of a reference signal.

At block 845, the stationary device 810 may determine one or more characteristics of the alert signal 840 based on receiving the alert signal 840. For example, the stationary device 810 may determine that the signal received is actually an alert signal that is requesting assistance at a specific location. The stationary device 810 may do this by identifying information that has been modulated into the signal or by identifying the frequency of the received signal. In some cases, the alert signal 840 may be any signal communicated at predetermined frequency of sound wave. The stationary device 810 may determine a signal strength of the alert signal 840. The stationary device 810 may be configured to determine or estimate a location of the mobile device 805 based on the signal strength of the alert signal 840. In some cases, the stationary device 810 may identify its own location upon receiving the alert signal 840.

The stationary device 810 may transmit a second alert signal 850 to the coordinating device 815 based on receiving the alert signal 840. The second alert signal 850 may be communicated over a wireless communication link using electromagnetic waves modulated using a wireless access technology (e.g., DECT), over a wired communication link, or a combination thereof. The alert signal 850 may be modulated with information. For example, the alert signal 850 may include an indication that the stationary device 810 has received an alert message, an identifier of the stationary device 810, a location of the stationary device 810, one or more characteristics of the alert signal 840 as determined by the stationary device 810, information included in the alert signal 840 (e.g., an identifier of the mobile device 805), or a combination thereof.

At block 855, the coordinating device 815 may identify a location of the mobile device 805 or a location of the transmission of the alert signal 840 based on receiving the alert signal 850. In some cases, the coordinating device 815 may receive one or more alert signals 850 from a plurality of stationary devices 810. The coordinating device 815 may identify the location of the mobile device 805 based on the information in each of these plurality of alert signals 850. For example, the coordinating device 815 may identify one or more zones of a building where the mobile device 805 may be located based on the locations of the stationary devices 810 that received the alert signal 840. In some cases, the coordinating device 815 may be configured to determine a precise location of the mobile device 805 based on characteristics of the alert signal 840 as measured by each receiving stationary device 810. The coordinating device 815 may be configured to determine the location of the mobile device 805 using a variety of methods and using any combination of information as described herein.

At block 860, the coordinating device 815 may cause one or more other devices 820 to be activated based on receiving the alert signal 850 and/or identifying the location of the mobile device 805. The coordinating device 815 may identify the one or more other devices 820 to activate based on the location of the mobile device 805. For example, if the coordinating device 815 determines that the mobile device 805 is located in a particular zone, the coordinating device 815 may activate the devices 820 in that zone and/or in neighboring zones. In some cases, the coordinating device 815 may identify zones and activate devices associated with zones. In some cases, the coordinating device 815 may identify individual devices 820 to activate based on the location of the mobile device 805 when transmitting the alert signal 840.

The coordinating device 815 may transmit an activation signal 865 to the other devices 820, the stationary devices 810, the mobile device 805, or any combination thereof. The activation signal 865 may be configured to cause the receiving devices to perform an action based on the alert signal 840 being transmitted. The activation signal 865 may be communicated over a wireless communication link using electromagnetic waves modulated using a wireless access technology (e.g., DECT), over a wired communication link, or a combination thereof. The activation signal 865 may be modulated with information. For example, the activation signal 865 may include an indication of what actions are to be performed, an identifier of the stationary device 810, an indication of the other devices being activated, information included in the alert signal 840 (e.g., an identifier of the mobile device 805), or a combination thereof.

At block 870, the other devices 820 (and/or the stationary devices 810 and the mobile device 805) may perform one or more actions based on receiving the activation signal 865. In some cases, the other devices 820 may decode the activation signal 865 to determine what actions to perform. In some cases, the other devices 820 may be preconfigured to perform certain actions based on receiving the activation signal 865. Examples of the actions performed by the other devices 820 may include recording, using a camera, visual data, recording, using a microphone, audio data, outputting, by a speaker, an alert to individuals near the request for assistance, opening a two-way communication channel between the mobile device 805 and/or one or more assistance providers. For example, the two-way communication channel may be with 911 call center, an office or central location at the premises, security personnel, people located nearby, or others.

In some cases, the one or more other devices 820 (and/or the stationary devices 810 and the mobile device 805) may be configured to communicate information 875 with the coordinating device 815 based on performing the actions. For example, the one or more other devices 820 may transmit data that has been recorded. In other examples, the information 875 may be two-way communication link information. The information 875 may be communicated over a wireless communication link using electromagnetic waves modulated using a wireless access technology (e.g., DECT), over a wired communication link, or a combination thereof.

In some examples, a stationary device 810 may perform the functions of the coordinating device 815. In such examples, any stationary device 810 at the premises may also be configured to perform the functions of the coordinating device 815. In addition, the stationary device 810 may receive alert signals 850 from other stationary devices 810 that receive the alert signal 840.

In some examples, a stationary device 810 that performs the functions of the coordinating device 815 also receives the alert signal 840 from the mobile device 805. In such cases, the stationary device 810 may not transmit the alert signal 850, but instead may just keep that information because the stationary device 810 is operating as the coordinating device 815. In addition, the stationary device 810 may receive alert signals 850 from other stationary devices 810 that receive the alert signal 840.

Figure 9A:
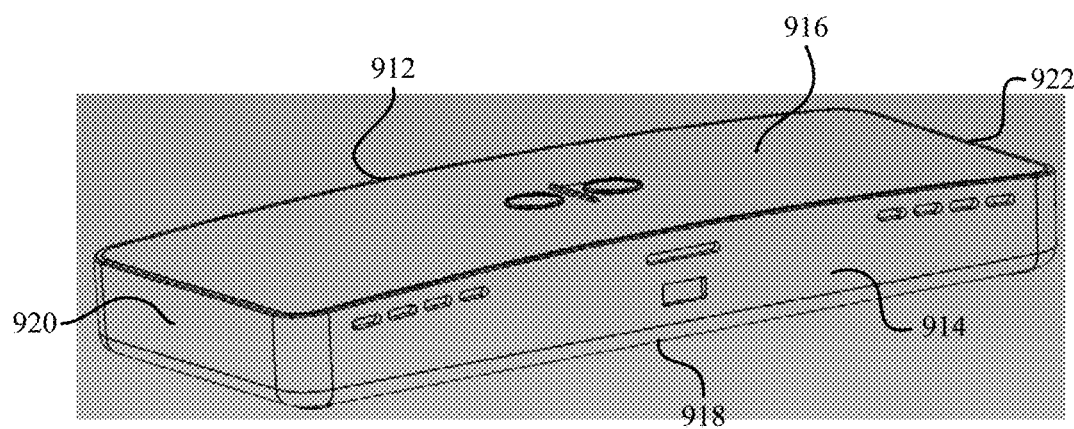
FIGS. 9A and 9B illustrate a stationary device that supports communications between devices using sound waves and electromagnetic waves.

FIG. 9A illustrates a perspective view of a stationary device 900-*a* that supports communications between devices using sound waves and electromagnetic waves. The stationary device 900-*a* may be an example of the stationary devices 110, 210, 310, 410, 510, 610, 710, and 810 described with reference to FIGS. 1-8. The stationary device 900-*a* may be configured to implement any of the functions or communication described with reference to FIGS. 1-8.

The stationary device 900-*a* includes a back wall 912, a front wall 914 positioned opposite the back wall 912, a top wall 916, a bottom wall 918 positioned opposite the top wall 916, and two side walls 920, 922 positioned opposite one another. The walls 912, 914, 916, 918 may define a housing for the stationary device 900-*a*, and the housing may have a hollow interior to retain a plurality of components. The stationary device 900-*a* may include a plurality of ports 924 (shown in FIG. 9B) positioned in the back wall 912 or positioned at other locations on the housing. In some examples, the stationary device 900-*a* may include circuitry to communicate via one of a plurality of wireless radio access technologies (RATs). For example, the stationary device 900-*a* may include antennas and other circuitry to communicate using cellular RATs (e.g., 3G, 4G, 5G), Wi-Fi (e.g., RATs associated with IEEE 802.11 standards), BLUETOOTH®, DECT, or a combination thereof.

The stationary device 900-*a* may also include an infrared (IR) receiver (not shown). The IR transceiver may be configured to detect signals transmitted using the infrared frequency spectrum band. The IR transceiver may be positioned adjacent to the front wall 914 of the stationary device 900-*a*. In some examples, the front wall 914 may include an aperture (not shown) through which the IR transceiver may protrude.

In some examples, the stationary device 900-*a* may include an ultrasonic transceiver (not shown). The ultrasonic transceiver may be configured to transmit or receive signals over sound waves in the frequency range above that which is detectible by the human ear. The ultrasonic frequency spectrum band may refer to frequencies above the hearing range of some or all humans. In some examples, the ultrasonic frequency spectrum may be in the range between about 20 kHz and about 25 kHz. Many modern electronic devices include microphones and speakers that can communicate in the ultrasonic range to ensure that performance in the typical human hearing range is optimal. The stationary device 900-*a* may be configured to communicate with other devices (e.g., computers, smartphones, tablets, etc.) using ultrasonic signals. The ultrasonic transceiver may include a speaker and a microphone.

Figure 9B:
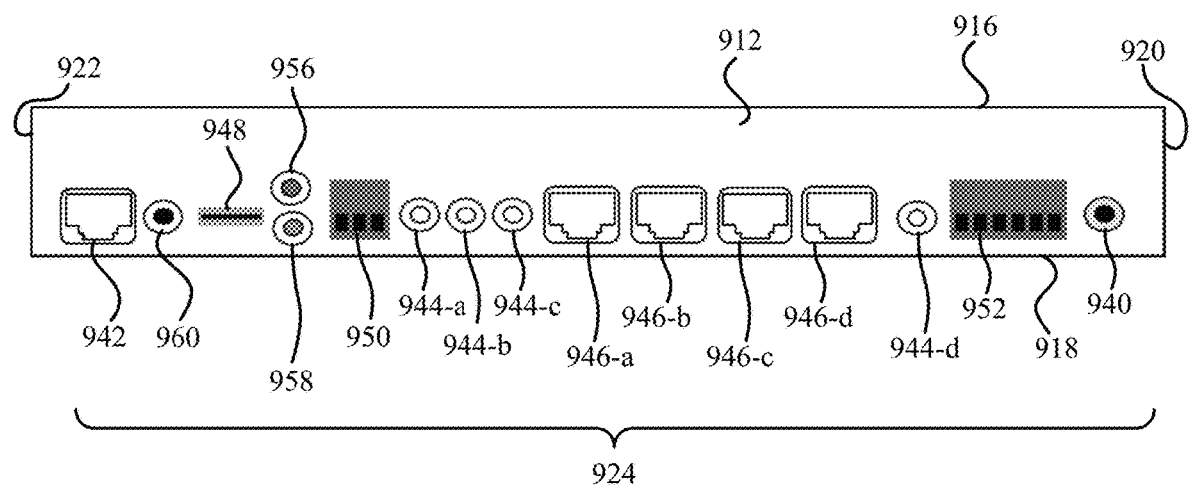

FIG. 9B illustrates an elevation view of the back wall 912 of a stationary device 900-*b* that supports communications between devices using, for example, sound waves and electromagnetic waves. The stationary device 900-*b* is another view of the stationary device 900-*a* described with reference to FIG. 9A.

The stationary device 900-*b* may include a plurality of ports 924 positioned in the back wall 912. The plurality of ports 924 may be configured to receive wired data connections of various types. In some examples, the plurality of ports 924 may be examples of female sockets for their respective port types. The plurality of ports 924 may include a power port, a high-definition multimedia interface (HDMI) port, an audio port, a serial port, a component audio/video port, multi-pin ports, other types of ports, or a combination thereof.

The ports of the stationary device 900-*b* may include a power port 940, an Ethernet port 942, a plurality of component ports 944-*a*, 944-*b*, 944-*c*, 944-*d*, a plurality of input/output (I/O) ethernet ports 946-*a*, 946-*b*, 946-*c*, 946-*d*, a USB port 948, a serial port 950, and a multi-pin port 952. In addition, the stationary device 900-*b* may include a number of input/output devices. For example, the stationary device 900-*b* may include a first indicator 956, a second indicator 958, and button 960. The functions of each of these components of the stationary device 900-*b* are described with more detail in FIG. 10.

The power port 940 may be adjacent to, for example, the one of the sidewalls 920. The Ethernet port 942 may be positioned next to, for example, a sidewall 922 different than the one adjacent to the power port 940. The Ethernet port 942 may be an example of an ethernet port configured to couple the stationary device 900-*b* with an external network. In some cases, the Ethernet port 942 is a POE port. The USB port 948 may be positioned near the ethernet port 942. The USB port 948 may be an example of a USB-c port.

The plurality of component ports 944 may be configured to receive or transmit data streams with an audio system or a visual system (e.g., an intercom system in a school, a telephone system in an emergency response situation). In some cases, at least one component port 944 may be an example of an auxiliary (AUX) port. In some cases, at least one component port 944 may be an example of a component audio video (CAV) port. In some cases, a first component port 944-*a* may be configured as an audio line input. In some cases, a second component port 944-*b* may be configured as an audio line input. In some cases, a third component port 944-*c* may be configured as an audio line input. In some cases, a fourth component port 944-*d* may be configured as an audio line output.

The plurality of I/O ethernet ports 946 may be configured to receive or transmit data streams with an audio system or a visual system (e.g., an intercom system in a school, a telephone system in an emergency response situation). In some cases, a first I/O ethernet port 946-*a* may be configured as an audio/visual line input with control. In some cases, a second I/O ethernet port 946-*b* may be configured as an audio/visual line input with control. In some cases, a third I/O ethernet port 946-*c* may be configured as an audio/visual line output with control. In some cases, a fourth I/O ethernet port 946-*d* may be configured as an input line for a microphone or may serve as a general purpose input output (GPIO).

The serial port 950 may be an example of an RS-232 port. The serial port 950 may be positioned between the USB port 948 and the plurality of component ports 944. The stationary device may be configured to merge a data streams received over any of the ports described herein The indicators 956, 958 may be examples of light emitting diodes (LEDs). The first indicator 956 may be a red LED configured to indicate when powered that the stationary device 900-*b* is not functioning properly. The second indicator 958 may be a green LED configured to indicate when powered that the stationary device 900-*b* is functioning properly. The button 960 may be a reset button configured to reset the stationary device 900-*b* based on the button being actuated.

The multi-pin port 954 may be positioned adjacent to one of the power port 940. The multi-pin port 954 may be configured to provide a speaker output or a page mute.

In some cases, the stationary device 900-*b* may include one or more HDMI ports that may be configured to receive and/or output data streams. Using the one or more HDMI ports, the stationary device 900-*b* may be installed in-line between a content source (e.g., computer) and an output device (e.g., TV or projector).

Figure 10:
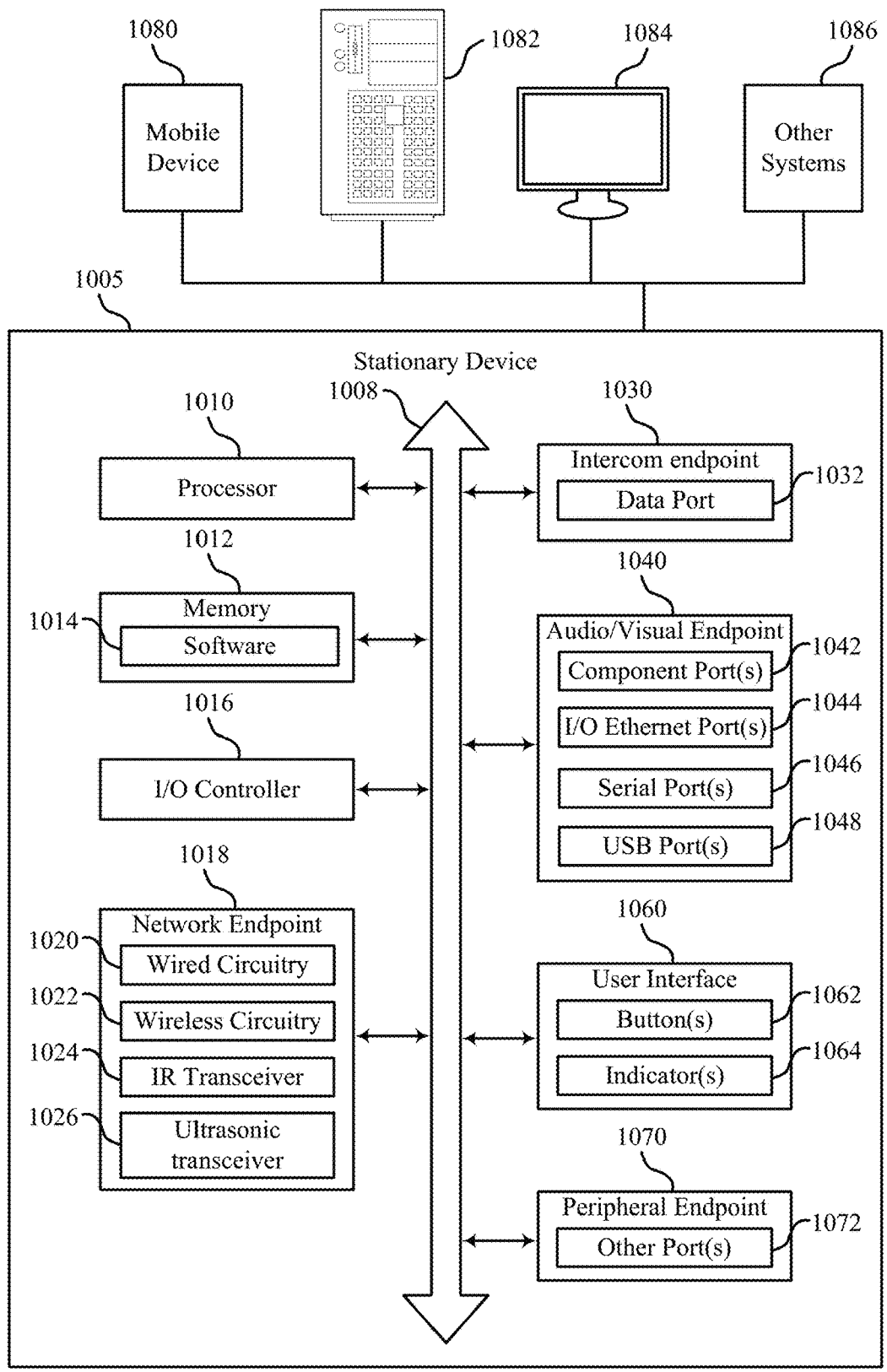
FIG. 10 illustrates a block diagram of a stationary device that supports communications between devices using sound waves and electromagnetic waves.

FIG. 10 illustrates a block diagram 1000 of a stationary device 1005 that supports communications between devices using sound waves and electromagnetic waves. The stationary device 1005 may be an example of the stationary devices 110, 210, 310, 410, 510, 610, 710, 810, and 900 described with reference to FIGS. 1-9. The stationary device 1005 may be configured to implement any of the functions or communication described with reference to FIGS. 1-9.

The stationary device 1005 may include components for bi-directional voice and data communications including components for transmitting and receiving communications, including processor 1010, memory 1012, software 1014, I/O controller 1016, network endpoint 1018, an intercom endpoint 1030, and audio/visual endpoint 1040, a user interface 1060, and a peripheral endpoint 1070. These components may be in electronic communication via one or more busses (e.g., bus 1008).

In some cases, stationary device 1005 may communicate with a content source (e.g., mobile device 1080 or computing device 1082), a remote storage device, a remote computing device 1082, an audio/visual output device 1084 (e.g., television, projector system, or monitor), and/or other system 1086 (e.g., intercom system, audio system, I/O devices, telephone system). For example, one or more elements of the stationary device 1005 may provide a direct connection to a remote computing device 1082 via one or more of the endpoints described herein. In some embodiments, one element of the stationary device 1005 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of the stationary device 1005 (e.g., cameras, wireless remote, wall mounted user interface, battery, lighting system, and so on). In some embodiments, all of the elements shown in FIG. 10 need not be present to practice the present systems and methods. The devices and subsystems may also be interconnected in different ways from that shown in FIG. 10. In some embodiments, an aspect of the operations of the stationary device 1005 may be readily known in the art and are not discussed in detail in this disclosure.

The signals associated with the stationary device 1005 may include wireless communication signals such as radio frequency, electromagnetics, LAN, WAN, VPN, wireless network (using 802.11, for example), 345 MHz, Z-WAVE®, cellular network (using 3G and/or Long Term Evolution (LTE), for example), DECT, and/or other signals. The RAT of the stationary device 1005 may be related to, but are not limited to, wireless wide area network (WWAN) (GSM, CDMA, and WCDMA), wireless local area network (WLAN) (including BLUETOOTH® and Wi-Fi), WiMAX, DECT, antennas for mobile communications, antennas for Wireless Personal Area Network (WPAN) applications (including radio frequency identification devices (RFID) and UWB). In some embodiments, one or more sensors (e.g., IR, ultrasonic, motion, light, sound) may connect to some element of the stationary device 1005 via a network using the one or more wired and/or wireless connections.

Processor 1010 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). Processor 1010 may be configured to execute computer-readable instructions stored in a memory to perform various functions. In some examples, the processor 1010 may be referred to as an integrator.

Memory 1012 may include random access memory (RAM) and read-only memory (ROM). The memory 1012 may store computer-readable, computer-executable software 1014 including instructions that, when executed, cause the processor to perform various functions described herein. In some cases, the memory 1012 may store the software 1014 associated with the stationary device 1005. In some cases, the memory 1012 may contain, among other things, a basic input/output system (BIOS) which may control basic hardware and/or software operation such as the interaction with peripheral components or devices.

Software 1014 may include code to implement aspects of the present disclosure, including code to support the stationary device 1005. Software 1014 may be stored in a non-transitory computer-readable medium such as system memory or other memory. In some cases, the software 1014 may not be directly executable by the processor but may cause a computer (e.g., when compiled and executed) to perform functions described herein.

I/O controller 1016 may manage input and output signals for stationary device 1005. I/O controller 1016 may also manage peripherals not integrated into stationary device 1005. In some cases, I/O controller 1016 may represent a physical connection or port to an external peripheral. In some cases, I/O controller 1016 may utilize an operating system such as iOS®, ANDROID®, MS-DOS®, MS-WINDOWS®, OS/2®, UNIX®, LINUX®, or another known operating system. In other cases, I/O controller 1016 may represent or interact with a modem, a keyboard, a mouse, a touchscreen, or a similar device. In some cases, I/O controller 1016 may be implemented as part of a processor. In some cases, a user may interact with the stationary device 1005 via I/O controller 1016 or via hardware components controlled by I/O controller 1016.

The network endpoint 1018 may be configured to communicate information using one or more different types of networks. For example, the network endpoint 1018 may be configured to communicate data using an Ethernet network. In other examples, the network endpoint 1018 may be configured to communicate data using a wireless network (e.g., Wi-Fi, cellular networks, BLUETOOTH®, WLANs, etc.). The network endpoint 1018 may include a wired circuitry 1020 (e.g., ethernet port), wireless circuitry 1022 (e.g., for electromagnetic waves), an infrared transceiver 1024, an ultrasonic transceiver (e.g., for sound waves), or a combination thereof.

The wired circuitry 1020 may be configured to communicate data over any wired network, which may include an Ethernet network. In some examples, the wired circuitry 1020 may be an example of a Power over Ethernet (POE) port, such that electric power is received from the Ethernet network. As such, portions (or all) of the stationary device 1005 may be powered using POE. The wired circuitry 1020 may be an example of the Ethernet port 942 described with reference to FIGS. 9A and 9B.

The wireless circuitry 1022 may include antennas and other electrical components configured to communicate data over a wireless network. The wireless circuitry 1022 may be integrated into the stationary device 1005. In some examples, the stationary device 1005 may include an internal port (e.g., universal serial bus (USB) port) to couple to self-contained wireless transceivers and components (e.g., Wi-Fi stick). The wireless circuitry 1022 may be configured to communicate electromagnetic signals in the radio frequency spectrum band. The information in those signals may be modulated and defined according to a wireless access technology.

The IR transceiver 1024 may be configured to transmit or receive signals transmitted in the IR frequency spectrum band. An IR transmitter may be incorporated into another device, such as a remote. The IR transceiver 1024 may be configured to receive IR signals and decode information included in the IR signals. The IR transceiver 1024 may be an example of the IR transceiver described with reference to FIG. 9A.

The ultrasonic transceiver 1026 may be configured to communicate using signals transmitted over sound waves in the ultrasonic frequency spectrum band. Ultrasonic signals may be communicated using frequencies outside of the range of normal human hearing. The stationary device 1005 may include an ultrasonic transmitter to communicate data with other computing devices in the vicinity of the stationary device 1005. Many microphones of computing devices (e.g., smartphones, cell phones, computing devices) are capable of detecting ultrasonic signals. In some examples, the stationary device 1005 may transmit a message via ultrasonic signal. The stationary device 1005 may include an ultrasonic transceiver to receive data from other computing devices in the vicinity of the stationary device 1005. The ultrasonic transceiver 1026 may be an example of the ultrasonic transceiver described with reference to FIGS. 9A and 9B. The ultrasonic transceiver 1026 may include a speaker and a microphone.

The network endpoint 1018 may communicate bi-directionally, via one or more antennas, wired, or wireless links as described above. For example, the network endpoint 1018 may represent a wireless transceiver and may communicate bi-directionally with another wireless transceiver. The network endpoint 1018 may also include a modem to modulate the packets and provide the modulated packets to the antennas for transmission, and to demodulate packets received from the antennas. The network endpoint 1018 may communicate bi-directionally with the mobile device, computing device 1082, the output device 1084, the other systems 1086, or a combination thereof. The network endpoint 1018 may include a USB port, wireless network circuitry, other network components or ports, or a combination thereof. The wireless circuitry 1022 may be configured to establish a wireless communication link via a wireless network. The other network components or ports may be any other type of communication circuitry to establish communications (either wired or wireless) between the stationary device 1005. For example, the other network components may include components related to VGA, DVI, HDMI, IDE, SATA, eSATA, FireWire, Ethernet, PS/2, a serial connections, a RS-232 serial connection, a DB-25 serial connection, a DE-9 serial connection, an S-Video connection, a DIN connection, Wi-Fi, LTE, 3G, BLUETOOTH®, Bluetooth Low Energy, WLAN, WiGig, DECT, or a combination thereof.

The network endpoint 1018 may be configured to communicate with a mobile device 1080 using one or more wireless radio access technologies and/or one or more high-frequency audio techniques (e.g., sound waves). In some cases, the stationary device 1005 may be configured to communicate using both radio frequency wireless access technologies and high-frequency audio techniques to establish and maintain device pairing.

The intercom endpoint 1030 may be a terminal node of an intercom system or a public announcement system that is configured to communicate data with other endpoints and control points of the intercom system. The intercom endpoint 1030 may be configured to interface with legacy intercom systems of a building. The intercom endpoint 1030 of the stationary device 1005 may include a data port 1032. The data port 1032 may be configured to establish a wired connection with the intercom system. The data port 1032 may be an example of a component port 944 described with reference to FIG. 9B. The data port 1032 may be an example of an R/L component audio port. The data port 1032 may be an example of a component audio video port. In some examples, the data port 1032 may include a component audio to HDMI converter.

As used herein, the term endpoint may refer to circuitry used to communicate data with an associated system. An endpoint may include ports and associated components to decode and encode information communicated through the port. As used herein, the term port may refer to any electrical connection. A port may sometimes be referred to as a connector. A port may include a male connector (e.g., protrusion) or a female connector (e.g., socket or receptacle). In some examples, the ports of the stationary device

1005 are female connectors sized to receive corresponding male connectors associated with cables or other electronic components.

The audio/visual endpoint 1040 may be a terminal node of an audio/visual system that is configured to communicate data with both content sources (e.g., computers, smartphones) and output devices (e.g., monitors, speakers). The audio/visual endpoint 1040 may include a plurality of ports and associated circuitry to process data streams communicated through those ports. The audio/visual endpoint 1040 may include one or more component ports 1042, one or more I/O ethernet ports 1044, one or more serial ports 1046, one or more USB ports 1048, one or more HDMI ports, other ports (e.g., the multi-pin port, network Ethernet port, or power port), or a combination thereof.

The audio/visual endpoint 1040 may be dynamically changeable to include different combinations of ports and circuitry depending on the functions being performed. For example, the audio/visual endpoint 1040 may be configured such that the stationary device 1005 may serve as an in-line device between a content source (e.g., mobile device 1080, computing device 1082, etc.) and a display device (e.g., monitor). In other examples, the display device may include a projector system and/or a separate speaker system. In such instances, the audio/visual endpoint 1040 may include the serial port 1046 (to control one or more of the third party device) and/or the multi-pin connector to communicate data with the speakers.

The one or more component ports 1042 may be examples of the component ports 944 described with reference to FIGS. 9A and 9B. The I/O ethernet ports 1044 may be examples of the I/O ethernet ports 946 described with reference to FIGS. 9A and 9B. The serial port 1046 may be configured to communicate information between the stationary device 1005 and any number of devices (e.g., projectors). Some devices are configured to receive instructions and other data in addition to receive streams of audio data and/or visual data. The serial port 1046 may be configured to communicate these other types of information, data, and/or commands. The serial port 1046 may be an example of an RS-232 port, in some cases. The serial port 1046 may be an example of the serial port 950 described with reference to FIGS. 9A and 9B. The one or more USB ports 1048 may be an example of the USB port 948 described with reference to FIGS. 9A and 9B.

User interface 1060 may enable a user to interact with the stationary device 1005. The user interface 1060 may include one or more buttons 1062, one or more indicator(s) 1064, other user I/O devices, or a combination thereof. In some examples, the user interface 1060 may include speakers, display devices (e.g., TV, monitor, projector), touchscreens, keyboards, mice, buttons, microphone, etc.

The button 1062 may be configured to perform any number of functions. In some examples, the button 1062 may be an example of reset button configured to reset/restart the stationary device 1005 based on being actuated. The button 1062 may be an example of the button 960 described with reference to FIG. 9B. In other examples, the stationary device 1005 may include a plurality of buttons, such as a keypad, keyboard, or other collection of buttons. The button 1062 may be configured to receive commands from a user.

The indicator(s) 1064 may be configured to output information to the user. In some examples, the indicators 1064 include a first indicator and a second indicator. The indicator 1064 may be an example of a LED light. The indicator 1064 may be an example of the indicators 956, 958 described with reference to FIG. 9B. In some examples, the indicators 1064 may be any output device that is observable by a user. For example, the indicators 1064 may be screens, displays, monitors, touchscreens, speakers, tactile devices, or a combination thereof.

The peripheral endpoint 1070 is configured to communicate data with a variety of other systems. The peripheral endpoint 1070 may include other ports 1072. The peripheral endpoint 1070 may be configured to communicate with telephone systems, emergency systems, power systems, speaker systems, other I/O devices, output devices, or a combination thereof.

The other ports may include power ports, multi-pin ports, serial ports, CAV ports, or a combination thereof. For example, a multi-pin port may be configured to include ten pins. The multi-pin port may be configured to communicate with speakers (two pins), to communicate with amplifiers (two pins), to communicate with microphones or other audio input devices (two pins), to communicate with other digital devices such as input buttons/actuators or indicators, or a combination thereof. The multi-pin port may be an example of the multi-pin port 952 described with reference to FIG. 9B. In some examples, the multi-pin port may be 10 pin phoenix port. The multi-pin port may be coupled to speaker out signals, microphone in signals, and other inputs and outputs.

The stationary device 1005 may be configured to communicate data with a variety of different systems. For example, the stationary device 1005 may be communicate with a mobile device 1080, a computing device 1082 (e.g., a laptop or a server), an output device 1084, or other systems 1086 via one of the endpoints or ports described herein.

In some examples, the mobile device 1080 and/or computing device 1082 may be considered a content source. As used herein, a content source may refer to any device or system that provides multimedia data (e.g., audio or visual) to the stationary device 1005. The mobile device 1080 and/or computing device 1082 (e.g., content source) may be coupled to the stationary device 1005 via one or more wired communication links, one or more wireless communication links (e.g., DECT or sound waves). For example, the mobile device 1080 and/or computing device 1082 may be a personal computer, a server, a cable box, a satellite box, an antenna, a smartphone, a hand-held computing device, tablet, etc.

In some examples, the stationary device 1005 may communicate data with the computing device 1082, which may include a laptop, desktop, server, or any combination thereof. For example, the computing device 1082 may store multimedia data that the stationary device 1005 receives and outputs to other output devices (e.g., displays and/or speakers). In some examples, the computing device 1082 may store data output by the stationary device 1005. In such examples, the stationary device 1005 may intercept data from computers, displays, or other systems, and store that data.

The output device 1084 may be any type of output device. For example, the output device 1084 may be a screen, display, monitor, TV, projector system, other types of visual displays, speakers, other types of audio outputs, tactile outputs, or a combination thereof. For example, the stationary device 1005 may couple with a projector using the component ports 1042, the I/O ethernet ports 1044, serial ports 1046, USB ports, or a combination thereof. The serial port 1046 may communicate other instructions or commands to the projector system.

The stationary device 1005 may couple with other systems 1086 such as, for example, an intercom system, a telephone system, an emergency response system, a security system, a building automation system, a climate control system, a lighting control system, an advertising system, or a combination thereof. The stationary device 1005 may be coupled to these devices using a variety of combinations of endpoints and/or ports.

The stationary device 1005 may also be configured to merge or combine different input streams from different sources into combined output streams. The stationary device 1005 may be generated output data streams using low-latency processing. In such a manner, time delays between different devices may be reduced.

As used herein, the term low-latency may refer to procedures or processes that take an amount of time that is either not perceptible to users or is perceptible to users, but is inconsequential to the task being undertaken. For example, a low-latency processor or other device may be configured to process a video data stream received from a computing device during a time frame such that a user cannot perceive (or the perceived delay is inconsequential) a difference between the video data stream output by a monitor at the computing device and a video data stream output by different output device connected to the stationary device 1005. In other examples, low-latency processing may refer to situations where two input data streams are merged with little to no perceived mismatch in timing of the two data streams.

In some examples, the stationary device 1005 may be configured to minimize a latency between content received from the content source (e.g., mobile device 1080 or computing device 1082) and content presented on an output device 1084. In such examples, the content source (e.g., mobile device 1080 or computing device 1082) may output a multimedia data stream (e.g., a video, an audio track, a power point presentation, etc.). The stationary device 1005 may receive the multimedia data stream (e.g., using the audio/visual endpoint 1040) and output the multimedia data stream to the output device 1084 (e.g., using the audio/visual endpoint 1040). By using low-latency processing, a time delay between content output at the content source (e.g., mobile device 1080 or computing device 1082) and content output at the output device 1084 may be minimized. Other integration device may cause a delay to occur between the content source and the output device. Such a delay may impede multimedia presentations.

In some examples, the stationary device 1005 may be configured to minimize latency between content output by two different systems. In such examples, the content source (e.g., mobile device 1080 or computing device 1082) may output a multimedia data stream (e.g., a video, an audio track, a power point presentation, etc.). The stationary device 1005 may split and output the multimedia data stream to two separate systems (e.g., a display and a separate speaker system). Differences in processing and transmission between these two systems may cause the audio to be offset from the video. Such a mismatch during a multimedia presentation may be undesirable. The stationary device 1005 may be configured to timestamp the multimedia data stream as it arrives and output the corresponding data streams to their respective systems based on the time states. In this manner, the stationary device 1005 may ensure that the audio and video data that is output match in their timing.

In some examples, the stationary device 1005 may be networked with other stationary devices 1005 to provide a multi-location multimedia presentation. In multi-location presentations delays between different locations may be undesirable. For example, if the different locations are close to one another, a time delay in outputting content may cause a user in at a first location to hear an echo. For instance, if two classrooms are receiving the same presentation, the users in the classroom may hear the audio from both presentations, but the audio may be offset due to delays in processing. To address these time offsets, the stationary device 1005 may be configured to execute low-latency processing to minimize the time offsets. In some examples, the stationary device 1005 may time-stamp and buffer output data. The stationary device 1005 may output its own data with a delay in order to sync the presentations with other rooms. The stationary device 1005 may identify transmission delays associated with each of the connected other devices. In this manner, the time stamps on the output data may be used in conjunction with the identified transmission delays to sync multimedia presentations across multiple locations.

In some examples, the stationary device 1005 may be configured to combine data from different systems into a single output data stream. In some instances, the output data stream may be H.264 Advanced Video Coding or H.265 Advanced Video Coding. Sometimes different types of input data streams may be processed differently. Such differences in processing may take differing amounts of time. Such processing differences may cause a mismatch of content in a combined data stream. To avoid a mismatch, the stationary device 1005 may time stamp input data streams as they arrive. The stationary device 1005 may buffer those input data streams. The stationary device 1005 may merge the input data streams based on their time stamps. In this way, differences in processing for each input data stream may not create mismatch in the data in the resultant combined output data stream.

In some examples, the stationary device 1005 may be configured to receive data via Point-to-Point data sharing service, such as AirDrop. Upon receiving data via a Point-to-Point data sharing service, the stationary device 1005 may merge that data with other data and/or output that data to appropriate output devices as needed.

Figure 11:
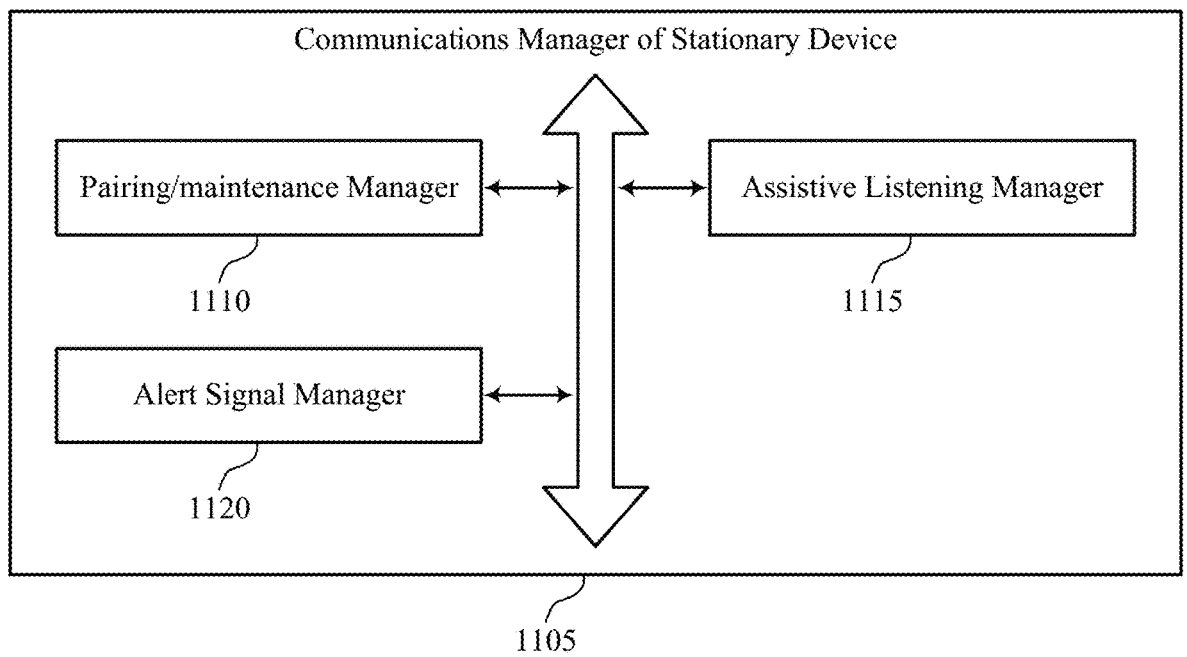
FIG. 11 illustrates a block diagram of a communications manager of a stationary device that supports communications between devices using sound waves and electromagnetic waves.

FIG. 11 illustrates a block diagram 1100 of a communications manager 1105 of a stationary device that supports communications between devices using sound waves and electromagnetic waves. The communications manager 1105 may be an example of aspects of a stationary device 110, 210, 310, 410, 510, 610, 710, 810, 900, and 1005 described with reference to FIGS. 1-10. The communications manager 1105 may include a pairing/maintenance manager 1110, an assistive listening manager 1115, and an alert signal manager 1120. Each of these modules may communicate, directly or indirectly, with one another (e.g., via one or more buses).

The pairing/maintenance manager 1110 may exchange, with a mobile device, a set of signals over a set of sound waves operating in a first set of frequencies above a frequency range detectible by a human ear, where the set of signals are for pairing the mobile device with the stationary device. In some examples, the pairing/maintenance manager 1110 may establish, with the mobile device, a communication link using a radio access technology operating in a second set of frequencies of a radio frequency spectrum band based on exchanging the set of signals over the set of sound waves. In some examples, the pairing/maintenance manager 1110 may communicate, with the mobile device, information over a set of electromagnetic waves using the radio access technology operating in the second set of frequencies based on establishing the communication link.

In some examples, the pairing/maintenance manager 1110 may receive, over one or more sound waves of the set of sound waves, a first signal to request establishment of the communication link using the radio access technology, where the set of signals includes the first signal, where establishing the communication link is based on receiving the first signal.

In some examples, the pairing/maintenance manager 1110 may transmit, over one or more sound waves of the set of sound waves, a reference signal to the mobile device based on receiving the first signal, where the set of signals includes the reference signal, where establishing the communication link is based on transmitting the reference signal.

In some examples, the pairing/maintenance manager 1110 may receive, over one or more sound waves of the set of sound waves, a second signal from the mobile device based on transmitting the reference signal, where the set of signals includes the second signal, where establishing the communication link is based on transmitting the second signal.

In some examples, the pairing/maintenance manager 1110 may receive, over one or more sound waves of the set of sound waves, a third signal to maintain the communication link with the mobile device, where communicating the information with the mobile device is based on receiving the third signal.

In some examples, the pairing/maintenance manager 1110 may transmit, over one or more sound waves of the set of sound waves, a fourth signal to maintain the communication link with the mobile device based on receiving the third signal, where communicating the information with the mobile device over the communication link is based on transmitting the fourth signal.

In some examples, the pairing/maintenance manager 1110 may monitor, for a time period, the first set of frequencies for the third signal. In some examples, the pairing/maintenance manager 1110 may terminate the communication link with the mobile device based on failing to receive the third signal during the time period.

In some examples, the pairing/maintenance manager 1110 may pair the stationary device with the mobile device using the radio access technology based on exchanging the set of signals over the set of sound waves and establishing the communication link, where communicating the information is based on pairing the stationary device with the mobile device.

In some cases, the second signal includes an identifier, for the mobile device, that is associated with the radio access technology. In some cases, the second signal includes a second reference signal received from the mobile device. In some cases, the radio access technology includes DECT. In some cases, the mobile device includes a microphone, a speaker, an assistive listening device, a remote control, or a combination thereof. In some cases, the stationary device is coupled with one or more devices configured to input or output multimedia content in a classroom of a school.

The assistive listening manager 1115 may exchange, with an assistive listening device, a set of signals over a first set of sound waves operating in a first set of frequencies above a frequency range detectible by a human ear, where the set of signals are for pairing the stationary device with the assistive listening device. In some examples, the assistive listening manager 1115 may transmit, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear.

In some examples, the assistive listening manager 1115 may receive a first portion of the audio information from a multimedia source. In some examples, the assistive listening manager 1115 may receive a second portion of the audio information from a microphone.

In some examples, the assistive listening manager 1115 may merge the first portion and the second portion to form the audio information using one or more low-latency audio merging techniques, where transmitting the audio information is based on merging the first portion and the second portion. In some examples, the assistive listening manager 1115 may receive, from a public announcement system, a second set of audio information.

In some examples, the assistive listening manager 1115 may determine that the second set of audio information has a higher priority than the audio information. In some examples, the assistive listening manager 1115 may transmit, to the assistive listening device, the second set of audio information associated with the public announcement system over a second set of electromagnetic waves using the radio access technology operating in the second set of frequencies based on determining that the second set of audio information has the higher priority than the audio information.

In some examples, receiving the audio information from a source positioned within a classroom, where the source includes a public announcement system, a microphone, a television, a computer, a tablet, a smart phone, speakers, or other multimedia device, or a combination thereof, where transmitting the audio information is based on receiving the audio information from the multimedia source. In some examples, identifying the assistive listening device from a set of assistive listening devices paired with the stationary device, where transmitting the audio information further includes transmitting the audio information to the identified assistive listening device without transmitting the audio information to other assistive listening devices of the set of assistive listening devices paired with the stationary device.

In some examples, the assistive listening manager 1115 may pair the stationary device with the assistive listening device using the radio access technology based on exchanging the set of signals over the first set of sound waves, where transmitting the audio information is based on pairing the assistive listening device with the stationary device. In some examples, the assistive listening manager 1115 may receive, over one or more sound waves of the first set of sound waves, a first signal to request establishment of a communication link, with the assistive listening device, using the radio access technology.

In some examples, the assistive listening manager 1115 may transmit, over one or more sound waves of the first set of sound waves, a reference signal to the assistive listening device based on receiving the first signal. In some examples, the assistive listening manager 1115 may receive, over one or more sound waves of the first set of sound waves, a second signal from the assistive listening device based on transmitting the reference signal, where transmitting the audio information is based on the first signal, the reference signal, and the second signal.

In some cases, the stationary device is positioned in a classroom and transmits the audio information to the assistive listening device concurrently with a speaker outputting the audio information into the classroom. In some cases, the radio access technology includes DECT.

The alert signal manager 1120 may receive, from a mobile device over a set of sound waves operating in a first set of frequencies above a frequency range detectible by a human ear, a first alert signal for indicating that assistance is needed. In some examples, the alert signal manager 1120 may activate one or more devices based on receiving the first alert signal from the mobile device. In some examples, the alert signal manager 1120 may transmit, to one or more devices, a second alert signal indicating that assistance is needed at a location associated with the stationary device.

In some examples, the alert signal manager 1120 may identify a second location of the mobile device based on receiving the first alert signal, where transmitting the second alert signal is based on identifying the second location. In some examples, the alert signal manager 1120 may receive, from a second stationary device, a signal indicating that the second stationary device received the first alert signal from the mobile device, where identifying the second location of the mobile device is based on receiving the signal from the second stationary device. In some cases, the second alert signal includes the second location identified by the stationary device.

In some examples, the alert signal manager 1120 may receive, from a mobile device over a plurality of sound waves operating in a first set of frequencies above a frequency range detectible by a human ear, a first alert signal for indicating that assistance is needed, and transmit a second alert signal over a communication link based at least in part on receiving the first alert signal.

In some examples, the alert signal manager 1120 may receive, from the mobile device over the plurality of sound waves, the first alert signal for indicating that assistance is needed, and transmit a third alert signal over a second communication link based at least in part on receiving the first alert signal.

FIG. 12A illustrates a perspective view of a mobile device 1200 that supports communications between devices using sound waves and electromagnetic waves. The mobile device 1200 may be an example of the mobile devices 105, 205, 305, 405, 505, 605, 705, and 805 described with reference to FIGS. 1-8. The mobile device 1200 may be configured to implement any of the functions or communication described with reference to FIGS. 1-8.

The mobile device 1200 may be an example of a microphone and a control device. The mobile device 1200 may include an elongated body 1212 extending from a first end 1214 to a second end 1216. A microphone may be positioned at any location on the device, such as near the first end 1214. The microphone may be configured to detect sound waves within the hearing range of a human ear and above the hearing range of a human ear. In some cases, the mobile device 1200 may include one microphone configured to detect sound waves within and outside of the audible range of the human ear. In some cases, the mobile device 1200 may include two or more microphones detect sound waves. One or more ports may be positioned on the mobile device 1200, such as near the second end 1216. Examples of the ports may include a USB port (e.g., female), a power port (e.g., female), or a combination thereof. The mobile device 1200 may include a speaker.

The mobile device 1200 may include a plurality of walls 1218 extending from the first end 1214 to the second end 1216. User interfaces 1220 may be positioned in at least one of the walls 1218. Examples of user interfaces 1220 may include buttons, toggles, slides, lights, displays, haptic feedback, or a combination thereof.

In some examples, the mobile device 1200 may include circuitry to communicate via one of a plurality of wireless RATs. For example, the mobile device 1200 may include antennas and other circuitry to communicate using cellular RATs (e.g., 3G, 4G, 5G), Wi-Fi (e.g., RATs associated with IEEE 802.11 standards), BLUETOOTH®, DECT, or a combination thereof.

The mobile device 1200 may also include an IR transceiver (not shown). The IR transceiver may be configured to transmit signals using the infrared frequency spectrum band or detect signals using the infrared frequency spectrum band. In some examples, the IR transceiver may be positioned, for example, near the first end 1214.

In some examples, the mobile device 1200 may include an ultrasonic transceiver (not shown). The ultrasonic transceiver may be configured to transmit or receive signals over sound waves in the frequency range above that which is detectible by the human ear. The ultrasonic frequency spectrum band may refer to frequencies above the hearing range of some or all humans. In some examples, the ultrasonic frequency spectrum may be in the range between about 20 kHz and about 25 kHz. Many modern electronic devices include microphones and speakers that can communicate in the ultrasonic range to ensure that performance in the typical human hearing range is optimal. The mobile device 1200 may be configured to communicate with other devices (e.g., computers, smartphones, tablets, etc.) using ultrasonic signals. The ultrasonic transceiver may include a speaker and a microphone.

FIG. 12B illustrates a perspective view of a mobile device 1250-*a* that supports communications between devices using sound waves and electromagnetic waves. The mobile device 1250-*a* may be an example of the mobile devices 105, 205, 305, 405, 505, 605, 705, and 805 described with reference to FIGS. 1-8. The mobile device 1250-*a* may be configured to implement any of the functions or communication described with reference to FIGS. 1-8.

The mobile device 1250-*a* may be an example of a microphone and a control device. The mobile device 1250-*a* may be a different example of a microphone as compared to the mobile device 1250-*a*. The mobile device 1250-*a* may include an elongated body 1262 extending from a first end 1264 to a second end 1266. A microphone may be positioned near the first end 1264. The microphone may be configured to detect sound waves within the hearing range of a human ear and above the hearing range of a human ear. In some cases, the mobile device 1250-*a* may include one microphone configured to detect sound waves within and outside of the audible range of the human ear. In some cases, the mobile device 1250-*a* may include two or more microphones to detect sound waves. One or more ports may be positioned near the second end 1266. Examples of the ports may include a USB port (e.g., female), a power port (e.g., female), or a combination thereof. The mobile device 1250-*a* may include a speaker.

In some examples, the mobile device 1250-*a* may include a top wall 1268, bottom wall 1270, a first side wall 1272, and a second side wall 1274 extending between the first end 1264 and the second end 1266. A first end wall 1276 may be positioned at the first end 1264 and a second end wall 1278 may be positioned at the second end 1266. User interfaces 1280 may be positioned in at least one of the walls. Examples of user interfaces 1280 may include buttons, toggles, slides, lights, displays, haptic feedback, or a combination thereof. A plurality of user interfaces (e.g., buttons) may be positioned in the top wall 1268. In some cases, each of the side walls 1272, 1274 may include at least one user interface 1280 (e.g., buttons).

In some examples, the mobile device 1250-*a* may include circuitry to communicate via one of a plurality of wireless RATs. For example, the mobile device 1250-*a* may include antennas and other circuitry to communicate using cellular RATs (e.g., 3G, 4G, 5G), Wi-Fi (e.g., RATs associated with IEEE 802.11 standards), BLUETOOTH®, DECT, or a combination thereof.

The mobile device 1250-*a* may also include an IR transceiver (not shown). The IR transceiver may be configured to transmit signals using the infrared frequency spectrum band or detect signals using the infrared frequency spectrum band. In some examples, the IR transceiver may be positioned, for example, near the first end 1264.

In some examples, the mobile device 1250-*a* may include an ultrasonic transceiver (not shown). The ultrasonic transceiver may be configured to transmit or receive signals over sound waves in the frequency range above that which is detectible by the human ear. The ultrasonic frequency spectrum band may refer to frequencies above the hearing range of some or all humans. In some examples, the ultrasonic frequency spectrum may be in the range between about 20 kHz and about 25 kHz. Many modern electronic devices include microphones and speakers that can communicate in the ultrasonic range to ensure that performance in the typical human hearing range is optimal. The mobile device 1250-*a* may be configured to communicate with other devices (e.g., computers, smartphones, tablets, etc.) using ultrasonic signals. The ultrasonic transceiver may include a speaker and a microphone.

FIG. 12C illustrates an elevation view of the top wall 1268 of a mobile device 1250-*b* that supports communications between devices using sound waves and electromagnetic waves. The mobile device 1250-*b* is another view of the mobile device 1250-*a* described with reference to FIG. 12B.

The mobile device 1250-*b* shows a first button 1290 in the first side wall 1272 and a second button 1292 in the second side wall 1274. In some cases, when the first button 1290 and the second button 1292 are actuated concurrently, the mobile device 1250-*b* may be configured to transmit panic signals over sounds waves. The buttons 1290 and 1292 may be examples of the buttons or other user interfaces described with reference to FIGS. 7 and 8.

Figure 13:
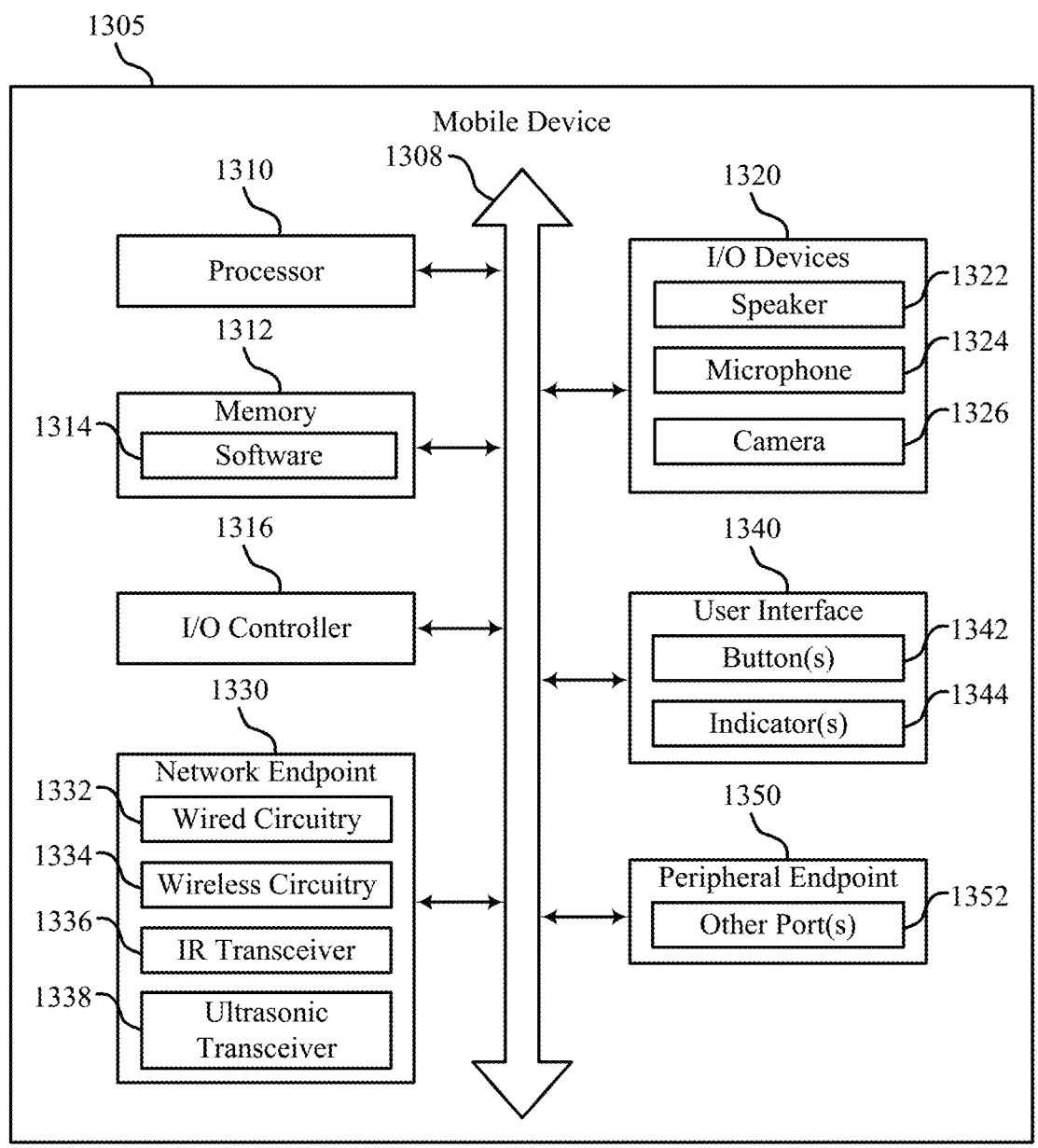
FIG. 13 illustrates a block diagram of a mobile device that supports communications between devices using sound waves and electromagnetic waves.

FIG. 13 illustrates a block diagram 1300 of a mobile device 1305 that supports communications between devices using sound waves and electromagnetic waves. The mobile device 1305 may be an example of the mobile devices 105, 205, 305, 405, 505, 605, 705, 805, 1200, and 1250 described with reference to FIGS. 1-8, 12A, 12B, and 12C. The mobile device 1305 may be configured to implement any of the functions or communication described with reference to FIGS. 1-8, 12A, 12B, and 12C.

The mobile device 1305 may include components for bi-directional voice and data communications including components for transmitting and receiving communications, including processor 1310, memory 1312, software 1314, I/O controller 1316, I/O devices 1320, network endpoint 1330, a user interface 1340, and a peripheral endpoint 1350. These components may be in electronic communication via one or more busses (e.g., bus 1308).

In some cases, mobile device 1305 may communicate with stationary device (e.g., stationary device 110 etc.) and/or one or more other input/output devices (e.g., computing device, server, tablet, smart phone, television, projector system, or monitor).

The signals associated with the mobile device 1305 may include wireless communication signals such as radio frequency, electromagnetics, LAN, WAN, VPN, wireless network (using 802.11, for example), 345 MHz, Z-WAVE®, cellular network (using 3G and/or LTE, for example), DECT, and/or other signals. The RAT of the mobile device 1305 may be related to, but are not limited to, WWAN (GSM, CDMA, and WCDMA), WLAN (including BLUETOOTH® and Wi-Fi), WiMAX, DECT, antennas for mobile communications, antennas for WPAN applications (including RFID and UWB).

Processor 1310 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). Processor 1310 may be configured to execute computer-readable instructions stored in a memory to perform various functions. In some examples, the processor 1310 may be referred to as an integrator.

Memory 1312 may include RAM and ROM. The memory 1312 may store computer-readable, computer-executable software 1314 including instructions that, when executed, cause the processor to perform various functions described herein. In some cases, the memory 1312 may store the software 1314 associated with the mobile device 1305. In some cases, the memory 1312 may contain, among other things, a BIOS which may control basic hardware and/or software operation such as the interaction with peripheral components or devices.

Software 1314 may include code to implement aspects of the present disclosure, including code to support the mobile device 1305. Software 1314 may be stored in a non-transitory computer-readable medium such as system memory or other memory. In some cases, the software 1314 may not be directly executable by the processor but may cause a computer (e.g., when compiled and executed) to perform functions described herein.

I/O controller 1316 may manage input and output signals for mobile device 1305. I/O controller 1316 may also manage peripherals associated with the mobile device 1305. In some cases, I/O controller 1316 may represent a physical connection or port to an external peripheral. In some cases, I/O controller 1316 may utilize an operating system such as iOS®, ANDROID®, MS-DOS®, MS-WINDOWS®, OS/2®, UNIX®, LINUX®, or another known operating system. In other cases, I/O controller 1316 may represent or interact with a modem, a keyboard, a mouse, a touchscreen, or a similar device. In some cases, I/O controller 1316 may be implemented as part of a processor. In some cases, a user may interact with the mobile device 1305 via I/O controller 1316 or via hardware components controlled by I/O controller 1316. The I/O controller 1316 may be configured to control the I/O devices 1320 of the mobile device 1305.

The mobile device 1305 may include one or more I/O devices 1320. Examples of the I/O devices may include one or more speakers 1322, one or more microphones 1324, one or more cameras 1326, or a combination thereof. The speakers 1322 and the microphones 1324 may be configured to communicate sound waves with the stationary device.

The network endpoint 1330 may be configured to communicate information using one or more different types of networks. For example, the network endpoint 1330 may be configured to communicate data using a wireless network (e.g., Wi-Fi, cellular networks, BLUETOOTH®, WLANs, etc.). The network endpoint 1330 may include a wired circuitry 1332 (e.g., ethernet port), wireless circuitry 1334 (e.g., for electromagnetic waves), an infrared transceiver 1336, an ultrasonic transceiver (e.g., for sound waves), or a combination thereof.

The wired circuitry 1332 may be configured to communicate data over any wired network. In some examples, the wired circuitry 1332 may be an example of USB port. The wired circuitry 1332 may be an example of the USB described with reference to FIGS. 12A and 12B.

The wireless circuitry 1334 may include antennas and other electrical components configured to communicate data over a wireless network. The wireless circuitry 1334 may be integrated into the mobile device 1305. The wireless circuitry 1334 may be configured to communicate electromagnetic signals in the radio frequency spectrum band. The information in those signals may be modulated and defined according to a wireless access technology.

The IR transceiver 1336 may be configured to transmit or receive signals transmitted in the IR frequency spectrum band. The IR transceiver 1336 may be configured to transmit IR signals. The IR transceiver 1336 may be an example of the IR transceiver described with reference to FIGS. 12A and 12B.

The ultrasonic transceiver 1338 may be configured to communicate using signals transmitted over sound waves in the ultrasonic frequency spectrum band. Ultrasonic signals may be communicated using frequencies outside of the range of normal human hearing. The mobile device 1305 may include an ultrasonic transmitter to communicate data with other computing devices in the vicinity of the mobile device 1305. Many microphones of computing devices (e.g., smartphones, cell phones, computing devices) are capable of detecting ultrasonic signals. In some examples, the mobile device 1305 may transmit a message via ultrasonic signal. The mobile device 1305 may include an ultrasonic transceiver to receive data from other computing devices in the vicinity of the mobile device 1305. The ultrasonic transceiver 1338 may be an example of the ultrasonic transceiver described with reference to FIGS. 12A and 12B. The ultrasonic transceiver 1338 may include a speaker and a microphone.

The network endpoint 1330 may communicate bi-directionally, via one or more antennas, wired, or wireless links as described above. For example, the network endpoint 1330 may represent a wireless transceiver and may communicate bi-directionally with another wireless transceiver. The network endpoint 1330 may also include a modem to modulate the packets and provide the modulated packets to the antennas for transmission, and to demodulate packets received from the antennas. The network endpoint 1330 may communicate bi-directionally with the stationary device or other input/output device. The wireless circuitry 1334 may be configured to establish a wireless communication link via a wireless network. The other network components or ports may be any other type of communication circuitry to establish communications (either wired or wireless) between the mobile device 1305. For example, the other network components may include components related to Wi-Fi, LTE, 3G, BLUETOOTH®, Bluetooth Low Energy, WLAN, WiGig, DECT, or a combination thereof.

The network endpoint 1330 may be configured to communicate with a stationary device using one or more wireless radio access technologies and/or one or more high-frequency audio techniques (e.g., sound waves). In some cases, the mobile device 1305 may be configured to communicate using both radio frequency wireless access technologies and high-frequency audio techniques to establish and maintain device pairing.

User interface 1340 may enable a user to interact with the mobile device 1305. The user interface 1340 may include one or more buttons 1342, one or more indicator(s) 1344, other user I/O devices, or a combination thereof. In some examples, the user interface 1340 may include speakers, display devices (e.g., TV, monitor, projector), touchscreens, keyboards, mice, buttons, microphone, etc.

The button(s) 1342 may be configured to perform any number of functions. In some examples, the button(s) 1342 may be an example of reset button configured to reset/restart the mobile device 1305 based on being actuated. The button(s) 1342 may be an example of the user interfaces 1220, 1280, 1290, and 1292 described with reference to FIGS. 12A, 12B, and 12C. In other examples, the mobile device 1305 may include a plurality of buttons, such as a keypad, keyboard, or other collection of buttons. The button (s) 1342 may be configured to receive commands from a user.

The indicator(s) 1344 may be configured to output information to the user. In some examples, the indicator(s) 1344 include a first indicator and a second indicator. The indicator (s) 1344 may be an example of a LED light. In some examples, the indicator(s) 1344 may be any output device that is observable by a user. For example, the indicator(s) 1344 may be screens, displays, monitors, touchscreens, speakers, tactile devices, or a combination thereof.

The peripheral endpoint 1350 is configured to communicate data with a variety of other systems. The peripheral endpoint 1350 may include other ports 1352. The peripheral endpoint 1350 may be configured to communicate with telephone systems, emergency systems, power systems, speaker systems, other I/O devices, output devices, or a combination thereof. The other ports may include power ports or USB ports or a combination thereof.

Figure 14:
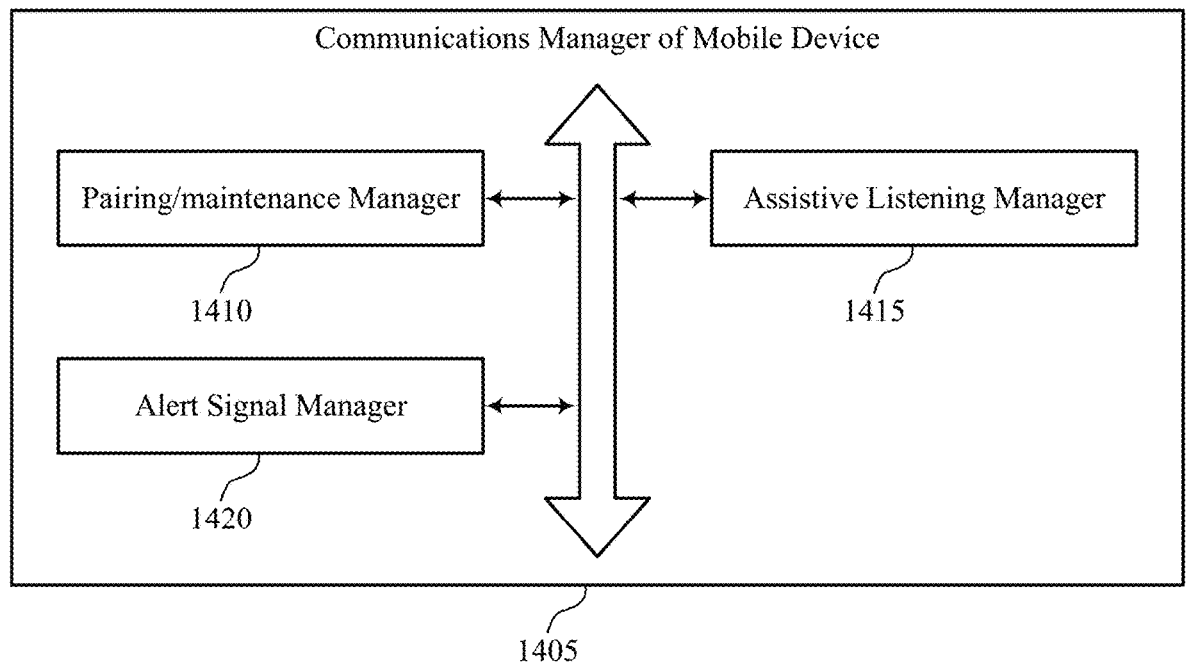
FIG. 14 illustrates a block diagram of a communications manager of a mobile device that supports communications between devices using sound waves and electromagnetic waves.

FIG. 14 illustrates a block diagram 1400 of a communications manager 1405 of a mobile device that supports communications between devices using sound waves and electromagnetic waves. The communications manager 1405 may be an example of aspects of a mobile device 105, 205, 305, 405, 505, 605, 705, 805, 1200, 1250, and 1305 described with reference to FIGS. 1-8, 12A, 12B, 12C, and 13. The communications manager 1405 may include a pairing/maintenance manager 1410, an assistive listening manager 1415, and an alert signal manager 1420. Each of these modules may communicate, directly or indirectly, with one another (e.g., via one or more buses).

The pairing/maintenance manager 1410 may exchange, with a stationary device, a set of signals over a set of sound waves operating in a first set of frequencies above a frequency range detectible by a human ear, where the set of signals are for pairing the mobile device with the stationary device. In some examples, the pairing/maintenance manager 1410 may establish, with the stationary device, a communication link using a radio access technology operating in a second set of frequencies of a radio frequency spectrum band based on exchanging the set of signals over the set of sound waves. In some examples, the pairing/maintenance manager 1410 may communicate, with the stationary device, information over a set of electromagnetic waves using the radio access technology operating in the second set of frequencies based on establishing the communication link.

In some examples, the pairing/maintenance manager 1410 may transmit, over one or more sound waves of the set of sound waves, a first signal to request establishment of the communication link using the radio access technology, where the set of signals includes the first signal, where establishing the communication link is based on transmitting the first signal. In some examples, the pairing/maintenance manager 1410 may receive, over one or more sound waves of the set of sound waves, a reference signal from the stationary device based on transmitting the first signal, where the set of signals includes the reference signal, where establishing the communication link is based on receiving the reference signal.

In some examples, the pairing/maintenance manager 1410 may transmit, over one or more sound waves of the set of sound waves, a second signal to the stationary device based on receiving the reference signal, where the set of signals includes the second signal, where establishing the communication link is based on transmitting the second signal.

In some examples, the pairing/maintenance manager 1410 may determine whether a signal strength of the reference signal satisfies a threshold based on receiving the reference signal, where transmitting the second signal is based on determining whether the signal strength of the reference signal satisfies the threshold.

In some examples, the pairing/maintenance manager 1410 may receive, over one or more sound waves of the set of sound waves, a set of reference signals from a set of stationary devices based on transmitting the first signal, where the set of stationary devices includes the stationary device, where the set of signals includes the set of reference signals.

In some examples, the pairing/maintenance manager 1410 may select the stationary device from the set of stationary devices based on a signal strength of at least one reference signal associated with the stationary device satisfies a threshold. In some examples, the pairing/maintenance manager 1410 may transmit, over one or more sound waves of the set of sound waves, a second signal to the stationary device based on selecting the stationary device, where the set of signals includes the second signal, where establishing the communication link is based on transmitting the second signal to the stationary device.

In some examples, the pairing/maintenance manager 1410 may transmit, over one or more sound waves of the set of sound waves, a third signal to maintain the communication link with the stationary device, where communicating the information with the stationary device is based on transmitting the third signal. In some examples, the pairing/maintenance manager 1410 may receive, over one or more sound waves of the set of sound waves, a fourth signal to maintain the communication link with the stationary device based on transmitting the third signal, the fourth signal being received from the stationary device, where communicating the information with the stationary device over the communication link is based on receiving the fourth signal.

In some examples, the pairing/maintenance manager 1410 may monitor, for a time period, the first set of frequencies for a fourth signal based on transmitting the third signal. In some examples, the pairing/maintenance manager 1410 may terminate the communication link with the stationary device based on failing to receive the fourth signal during the time period. In some examples, the pairing/maintenance manager 1410 may pair the mobile device with the stationary device using the radio access technology based on exchanging the set of signals over the set of sound waves and establishing the communication link, where communicating the information is based on pairing the mobile device with the stationary device.

In some cases, the second signal includes an identifier, for the mobile device, that is associated with the radio access technology. In some cases, the second signal includes a second reference signal transmitted by the mobile device to the stationary device. In some cases, the radio access technology includes DECT. In some cases, the stationary device includes a fixed part (FP) in a DECT network. In some cases, the mobile device includes a portable part (PP) in the DECT network. In some cases, the mobile device includes a microphone, a speaker, an assistive listening device, a remote control, or a combination thereof. In some cases, the stationary device is coupled with one or more devices configured to input or output multimedia content in a classroom of a school.

The assistive listening manager 1415 may exchange, with a stationary device, a set of signals over a first set of sound waves operating in a first set of frequencies above a frequency range detectable by a human ear, where the set of signals are for pairing the assistive listening device with the stationary device. In some examples, the assistive listening manager 1415 may receive, from the stationary device, audio information over a set of electromagnetic waves using a radio access technology operating in a second set of frequencies based on exchanging the set of signals over the first set of sound waves.

In some examples, the assistive listening manager 1415 may output the audio information over a second set of sound waves operating in a third set of frequencies within the frequency range detectable by the human ear. In some examples, the assistive listening manager 1415 may receive, from the stationary device, a second set of audio information associated with a public announcement system over a second set of electromagnetic waves using the radio access technology operating in the second set of frequencies.

In some examples, the assistive listening manager 1415 may interrupt an output of the audio information based on receiving the second set of audio information associated with the public announcement system. In some examples, the assistive listening manager 1415 may output, by the assistive listening device, the second set of audio information over the second set of sound waves based on interrupting the output of the audio information.

In some examples, the assistive listening manager 1415 may pair the assistive listening device with the stationary device using the radio access technology based on exchanging the set of signals over the first set of sound waves, where receiving the audio information is based on pairing the assistive listening device with the stationary device. In some examples, the assistive listening manager 1415 may transmit, over one or more sound waves of the first set of sound waves, a first signal to request establishment of a communication link, with the stationary device, using the radio access technology.

In some examples, the assistive listening manager 1415 may receive, over one or more sound waves of the first set of sound waves, a reference signal from the stationary device based on transmitting the first signal. In some examples, the assistive listening manager 1415 may transmit, over one or more sound waves of the first set of sound waves, a second signal to the stationary device based on receiving the reference signal, where receiving the audio information is based on the first signal, the reference signal, and the second signal.

In some examples, the assistive listening manager 1415 may transmit, over one or more sound waves of the first set of sound waves, a first signal to maintain a pairing between the assistive listening device and the stationary device. In some examples, the assistive listening manager 1415 may receive, over one or more sound waves of the first set of sound waves, a second signal to maintain the pairing between the assistive listening device and the stationary device based on transmitting the first signal, the second signal being received from the stationary device, where receiving the audio information is based on receiving the second signal.

In some cases, the audio information includes audio from a public announcement system, a microphone, a television, a computer, a tablet, a smart phone, a speaker, or other multimedia device, or a combination thereof. In some cases, the assistive listening device is positioned in a classroom and outputting the audio information using the second set of sound waves occurs concurrently with a speaker outputting the audio information into the classroom. In some cases, the assistive listening device includes headphones configured to be worn by a user. In some cases, the assistive listening device includes a speaker configured to provide localized sound to a portion of a classroom. In some cases, the radio access technology includes DECT.

The alert signal manager 1420 may identify an indication that assistance is needed. In some examples, the alert signal manager 1420 may broadcast, over a set of sound waves operating in a first set of frequencies above a frequency range detectible by a human ear, an alert signal for indicating that assistance is needed based on receiving the indication. In some examples, the alert signal manager 1420 may identify that a first button of the mobile device is actuated.

In some examples, the alert signal manager 1420 may identify that a second button of the mobile device actuated while the first button of the mobile device is actuated, where broadcasting the alert signal is based on actuating the first button and the second button concurrently. In some examples, the alert signal manager 1420 may receive, over a second set of sound waves operating in a second set of frequencies within the frequency range detectible by the human ear, a trigger word for activating an alert mode of the mobile device, where broadcasting the alert signal is based on receiving the trigger word.

In some examples, the alert signal manager 1420 may exchange, with a stationary device, a set of signals over a second set of sound waves operating in the first set of frequencies. In some examples, the alert signal manager 1420 may pair the mobile device with the stationary device using a radio access technology operating in a second set of frequencies of a radio frequency spectrum band based on exchanging the set of signals over the set of sound waves. In some cases, the radio access technology includes DECT.

Figure 15:
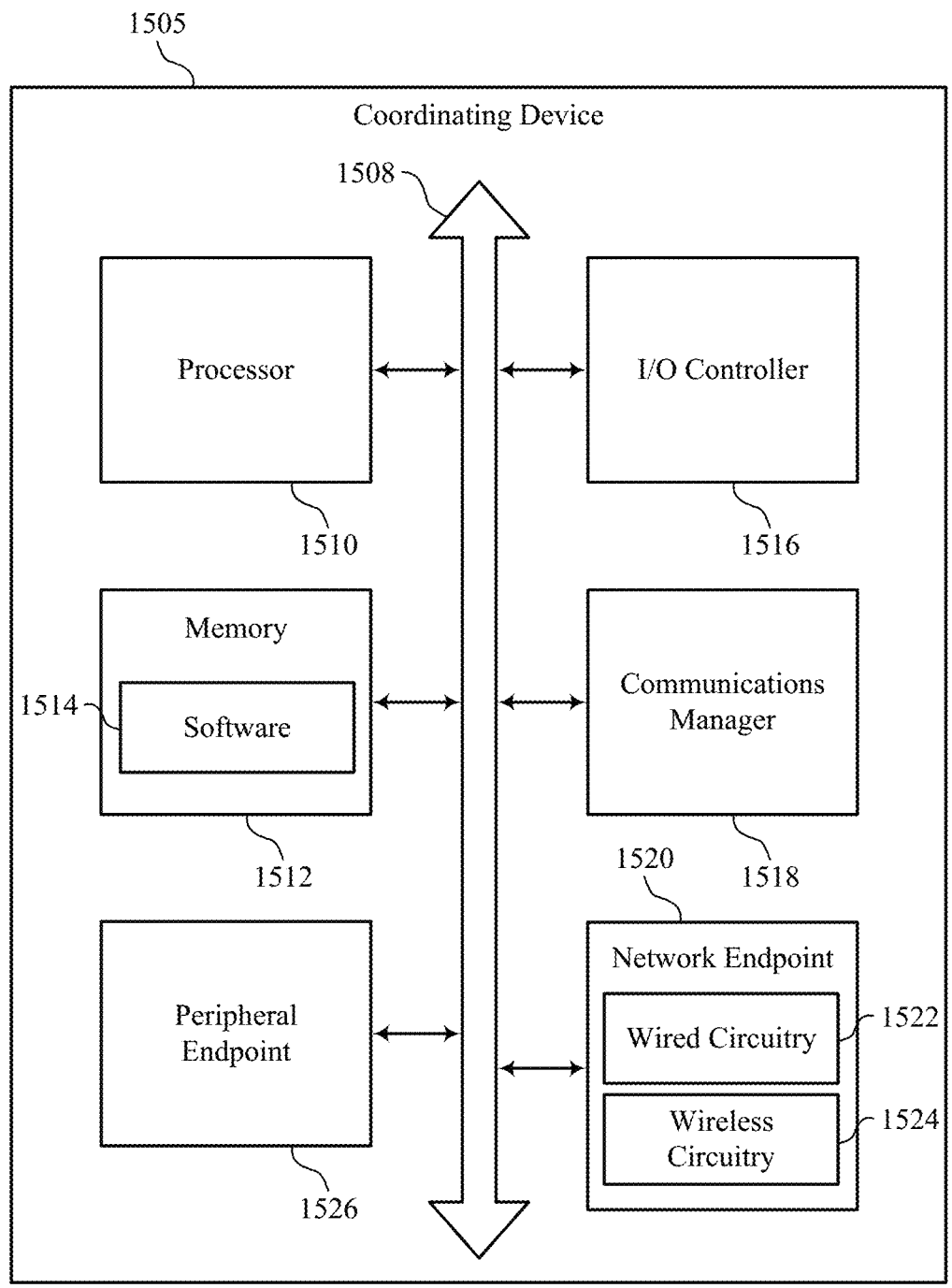
FIG. 15 illustrates a block diagram of a coordinating device that supports communications between devices using sound waves and electromagnetic waves.

FIG. 15 illustrates a block diagram 1500 of a coordinating device 1505 that supports communications between devices using sound waves and electromagnetic waves. The coordinating device 1505 may be an example of the coordinating device 115, 715, and 815 described with reference to FIGS. 1, 7, and 8. The coordinating device 1505 may be configured to implement any of the functions or communication described with reference to FIGS. 1-8.

The coordinating device 1505 may be an example of a computing device or server configured to perform the functions described herein. The coordinating device 1505 may be positioned at a premises (e.g., a school or office) and may be configured to manage communication networks between stationary devices and/or mobile devices. In some cases, the functions of the coordinating device 1505 may be implemented by a stationary device. In such cases, the coordinating device 1505 may include some of the features or characteristics of the stationary device 1005 described with reference to FIG. 10. In other cases, the coordinating device 1505 may be independent from the stationary devices.

The coordinating device 1505 may include components for bi-directional voice and data communications including components for transmitting and receiving communications, including processor 1510, memory 1512, software 1514, I/O controller 1516, communications manager 1518, network endpoint 1520, and peripheral endpoint 1526. These components may be in electronic communication via one or more busses (e.g., bus 1508). In some cases, coordinating device 1505 may communicate with stationary devices (e.g., stationary device 110 etc.) and/or one or more other input/output devices (e.g., computing device, server, tablet, smart phone, television, projector system, or monitor).

The signals associated with the coordinating device 1505 may include wired communication signals such as those communicated over an ethernet network or other type of wired network. In some cases, the coordinating device 1505 may have multiple wired connections with a single stationary device. For example, the coordinating device 1505 may be coupled with the stationary device over an ethernet network and over a public announcement system. In some cases, the coordinating device 1505 may communicate using wireless communication signals such as radio frequency, electromagnetics, LAN, WAN, VPN, wireless network (using 802.11, for example), 345 MHz, Z-WAVE®, cellular network (using 3G and/or LTE, for example), DECT, and/or other signals. The RAT of the coordinating device 1505 may be related to, but are not limited to, WWAN (GSM, CDMA, and WCDMA), WLAN (including BLUETOOTH® and Wi-Fi), WiMAX, DECT, antennas for mobile communications, antennas for WPAN applications (including RFID and UWB).

Processor 1510 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). Processor 1510 may be configured to execute computer-readable instructions stored in a memory to perform various functions. In some examples, the processor 1510 may be referred to as an integrator.

Memory 1512 may include RAM and ROM. The memory 1512 may store computer-readable, computer-executable software 1514 including instructions that, when executed, cause the processor to perform various functions described herein. In some cases, the memory 1512 may store the software 1514 associated with the coordinating device 1505. In some cases, the memory 1512 may contain, among other things, a BIOS which may control basic hardware and/or software operation such as the interaction with peripheral components or devices.

Software 1514 may include code to implement aspects of the present disclosure, including code to support the coordinating device 1505. Software 1514 may be stored in a non-transitory computer-readable medium such as system memory or other memory. In some cases, the software 1514 may not be directly executable by the processor but may cause a computer (e.g., when compiled and executed) to perform functions described herein.

I/O controller 1516 may manage input and output signals for coordinating device 1505. I/O controller 1516 may also manage peripherals associated with the coordinating device 1505. In some cases, I/O controller 1516 may represent a physical connection or port to an external peripheral. In some cases, I/O controller 1516 may utilize an operating system such as iOS®, ANDROID®, MS-DOS®, MS-WINDOWS®, OS/2®, UNIX®, LINUX®, or another known operating system. In other cases, I/O controller 1516 may represent or interact with a modem, a keyboard, a mouse, a touchscreen, or a similar device. In some cases, I/O controller 1516 may be implemented as part of a processor. In some cases, a user may interact with the coordinating device 1505 via I/O controller 1516 or via hardware components controlled by I/O controller 1516.

The communications manager 1518 may manager functions or communications of the coordinating device 1505 with one or more other devices. In some cases, the communications manager 1518 may receive, from the stationary device, the second alert signal over the communication link, identify a third location associated with the mobile device based at least in part on receiving the second alert signal from the stationary device at the first location, and activate one or more devices at the third location based at least in part on receiving the second alert signal from the stationary device.

In some cases, the communications manager 1518 may cause another device to record, using one or more cameras at the third location, visual data or audio data or both based at least in part on receiving the second alert signal. In some cases, the communications manager 1518 may cause another device to record, using one or more microphones at the third location, audio data within the frequency range detectible by the human ear based at least in part on receiving the second alert signal. In some cases, the communications manager 1518 may cause another device to broadcast, using one or more speakers at the third location, a message within the frequency range detectible by the human ear based at least in part on receiving the second alert signal.

In some cases, the communications manager 1518 may receive, from a second stationary device, a third alert signal over the second communication link, where identifying the third location of the mobile device is based at least in part on receiving the third alert signal from the second stationary device at the fourth location.

The network endpoint 1520 may be configured to communicate information using one or more different types of networks. For example, the network endpoint 1520 may be configured to communicate data using a wireless network (e.g., Wi-Fi, cellular networks, BLUETOOTH®, WLANs, etc.). The network endpoint 1520 may include a wired circuitry 1522 (e.g., ethernet port), wireless circuitry 1524 (e.g., for electromagnetic waves), or a combination thereof.

The wired circuitry 1522 may be configured to communicate data over any wired network, which may include an Ethernet network. In some examples, the wired circuitry 1522 may be an example of a Power over Ethernet (POE) port, such that electric power is transmitted or received over the Ethernet network. As such, portions (or all) of the coordinating device 1505 may be powered using POE.

The wireless circuitry 1524 may include antennas and other electrical components configured to communicate data over a wireless network. The wireless circuitry 1524 may be integrated into the coordinating device 1505. The wireless circuitry 1524 may be configured to communicate electromagnetic signals in the radio frequency spectrum band. The information in those signals may be modulated and defined according to a wireless access technology.

The network endpoint 1520 may communicate bi-directionally, via one or more antennas, wired, or wireless links as described above. For example, the network endpoint 1520 may represent a wireless transceiver and may communicate bi-directionally with another wireless transceiver. The network endpoint 1520 may also include a modem to modulate the packets and provide the modulated packets to the antennas for transmission, and to demodulate packets received from the antennas. The network endpoint 1520 may communicate bi-directionally with the stationary device or other input/output device. The wireless circuitry 1524 may be configured to establish a wireless communication link via a wireless network. The other network components or ports may be any other type of communication circuitry to establish communications (either wired or wireless) between the coordinating device 1505. For example, the other network components may include components related to Wi-Fi, LTE, 3G, BLUETOOTH®, Bluetooth Low Energy, WLAN, WiGig, DECT, or a combination thereof.

The peripheral endpoint 1526 is configured to communicate data with a variety of other systems. The peripheral endpoint 1526 may include other ports. The peripheral endpoint 1526 may be configured to communicate with telephone systems, emergency systems, power systems, speaker systems, other I/O devices, output devices, or a combination thereof.

Figure 16:
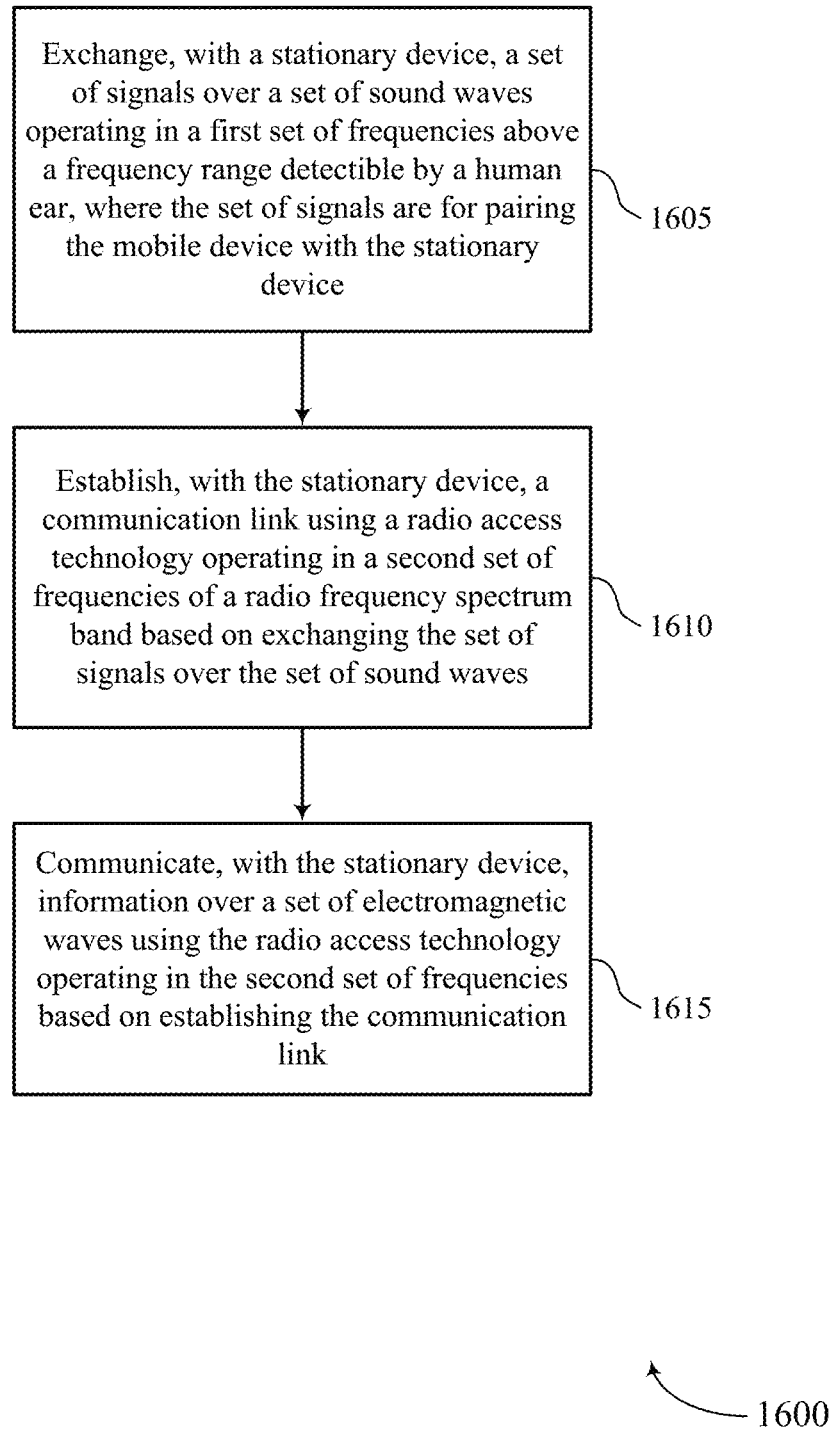
FIGS. 16 through 21 show flowcharts illustrating methods that support communications between devices using sound waves and electromagnetic waves.

FIG. 16 shows a flowchart illustrating a method 1600 that supports communications between devices using sound waves and electromagnetic waves. The operations of method 1600 may be implemented by a mobile device or its components as described herein. For example, the operations of method 1600 may be performed by a communications manager as described with reference to FIG. 14. In some examples, a mobile device may execute a set of instructions to control the functional elements of the mobile device to perform the functions described below. Additionally or alternatively, a mobile device may perform aspects of the functions described below using special-purpose hardware.

At 1605, the mobile device may exchange, with a stationary device, a set of signals over a set of sound waves operating in a first set of frequencies above a frequency range detectible by a human ear, where the set of signals are for pairing the mobile device with the stationary device. The operations of 1605 may be performed according to the methods described herein. In some examples, aspects of the operations of 1605 may be performed by a pairing/maintenance manager as described with reference to FIG. 14.

At 1610, the mobile device may establish, with the stationary device, a communication link using a radio access technology operating in a second set of frequencies of a radio frequency spectrum band based on exchanging the set of signals over the set of sound waves. The operations of 1610 may be performed according to the methods described herein. In some examples, aspects of the operations of 1610 may be performed by a pairing/maintenance manager as described with reference to FIG. 14.

At 1615, the mobile device may communicate, with the stationary device, information over a set of electromagnetic waves using the radio access technology operating in the second set of frequencies based on establishing the communication link. The operations of 1615 may be performed according to the methods described herein. In some examples, aspects of the operations of 1615 may be performed by a pairing/maintenance manager as described with reference to FIG. 14.

Figure 17:
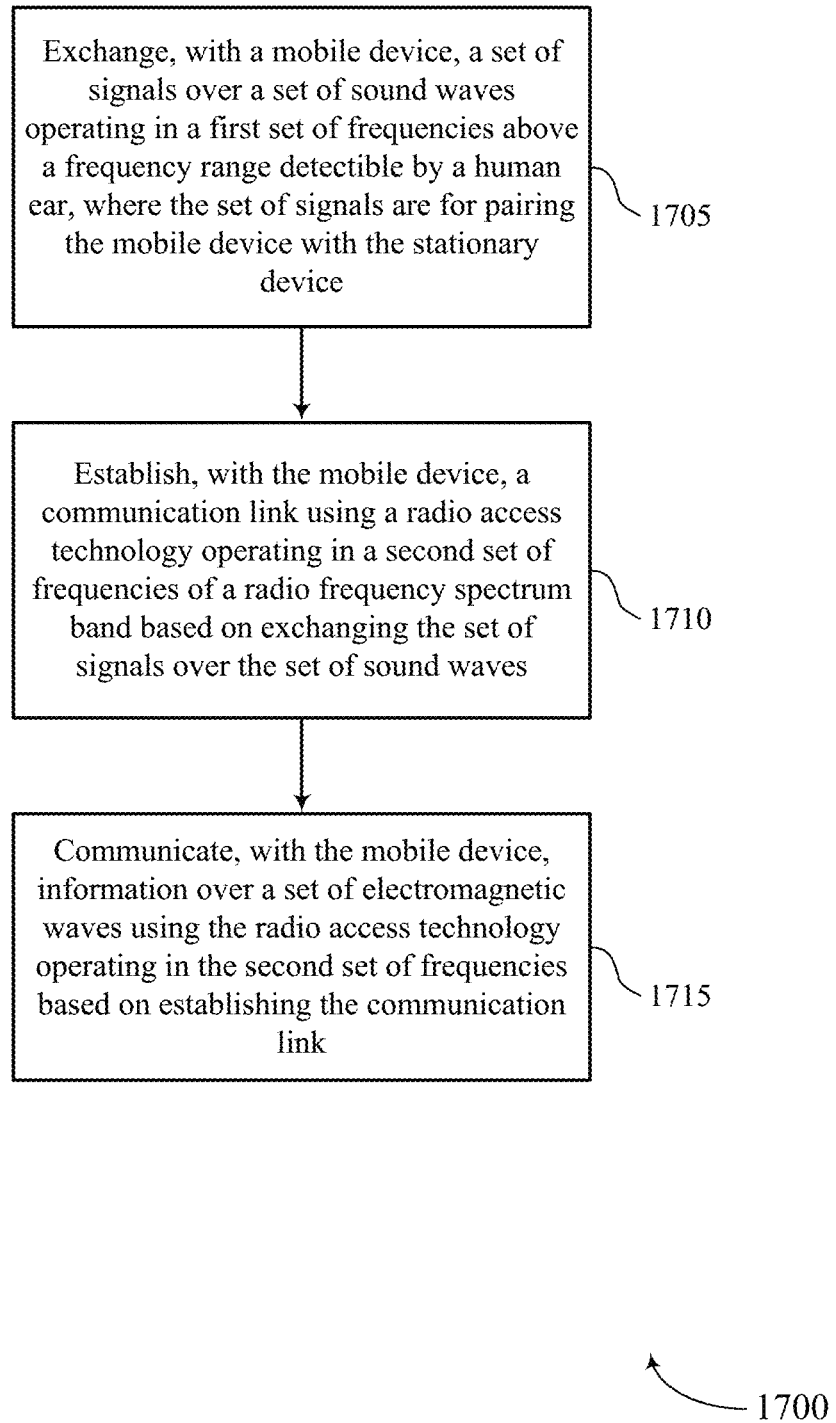

FIG. 17 shows a flowchart illustrating a method 1700 that supports communications between devices using sound waves and electromagnetic waves. The operations of method 1700 may be implemented by a stationary device or its components as described herein. For example, the operations of method 1700 may be performed by a communications manager as described with reference to FIG. 11. In some examples, a stationary device may execute a set of instructions to control the functional elements of the stationary device to perform the functions described below. Additionally or alternatively, a stationary device may perform aspects of the functions described below using special-purpose hardware.

At 1705, the stationary device may exchange, with a mobile device, a set of signals over a set of sound waves operating in a first set of frequencies above a frequency range detectible by a human ear, where the set of signals are for pairing the mobile device with the stationary device. The operations of 1705 may be performed according to the methods described herein. In some examples, aspects of the operations of 1705 may be performed by a pairing/maintenance manager as described with reference to FIG. 11.

At 1710, the stationary device may establish, with the mobile device, a communication link using a radio access technology operating in a second set of frequencies of a radio frequency spectrum band based on exchanging the set of signals over the set of sound waves. The operations of 1710 may be performed according to the methods described herein. In some examples, aspects of the operations of 1710 may be performed by a pairing/maintenance manager as described with reference to FIG. 11.

At 1715, the stationary device may communicate, with the mobile device, information over a set of electromagnetic waves using the radio access technology operating in the second set of frequencies based on establishing the communication link. The operations of 1715 may be performed according to the methods described herein. In some examples, aspects of the operations of 1715 may be performed by a pairing/maintenance manager as described with reference to FIG. 11.

Figure 18:
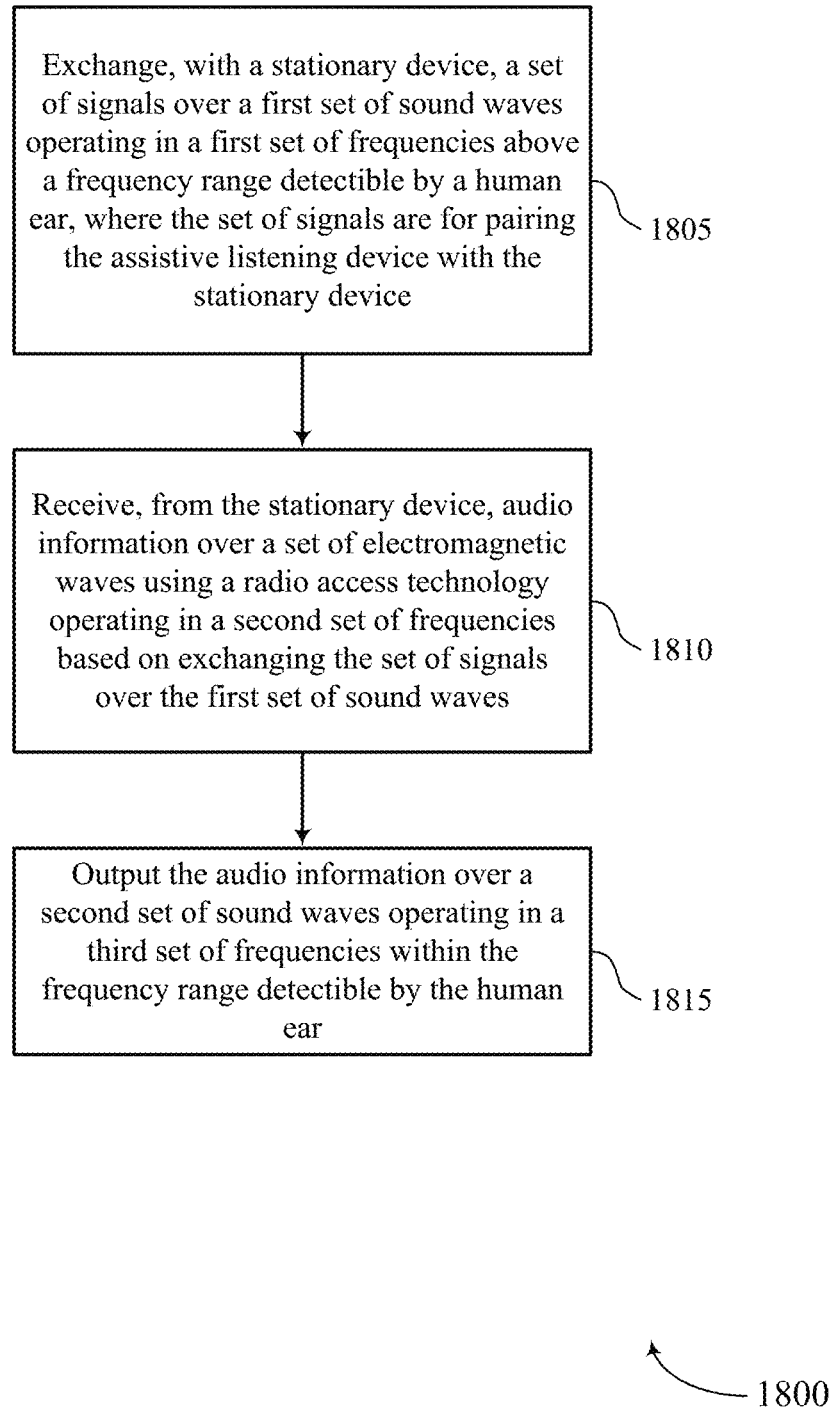

FIG. 18 shows a flowchart illustrating a method 1800 that supports communications between devices using sound waves and electromagnetic waves. The operations of method 1800 may be implemented by a mobile device or its components as described herein. For example, the operations of method 1800 may be performed by a communications manager as described with reference to FIG. 14. In some examples, a mobile device may execute a set of instructions to control the functional elements of the mobile device to perform the functions described below. Additionally or alternatively, a mobile device may perform aspects of the functions described below using special-purpose hardware.

At 1805, the mobile device may exchange, with a stationary device, a set of signals over a first set of sound waves operating in a first set of frequencies above a frequency range detectible by a human ear, where the set of signals are for pairing the assistive listening device with the stationary device. The operations of 1805 may be performed according to the methods described herein. In some examples, aspects of the operations of 1805 may be performed by an assistive listening manager as described with reference to FIG. 14.

At 1810, the mobile device may receive, from the stationary device, audio information over a set of electromagnetic waves using a radio access technology operating in a second set of frequencies based on exchanging the set of signals over the first set of sound waves. The operations of 1810 may be performed according to the methods described herein. In some examples, aspects of the operations of 1810 may be performed by an assistive listening manager as described with reference to FIG. 14.

At 1815, the mobile device may output the audio information over a second set of sound waves operating in a third set of frequencies within the frequency range detectible by the human ear. The operations of 1815 may be performed according to the methods described herein. In some examples, aspects of the operations of 1815 may be performed by an assistive listening manager as described with reference to FIG. 14.

Figure 19:
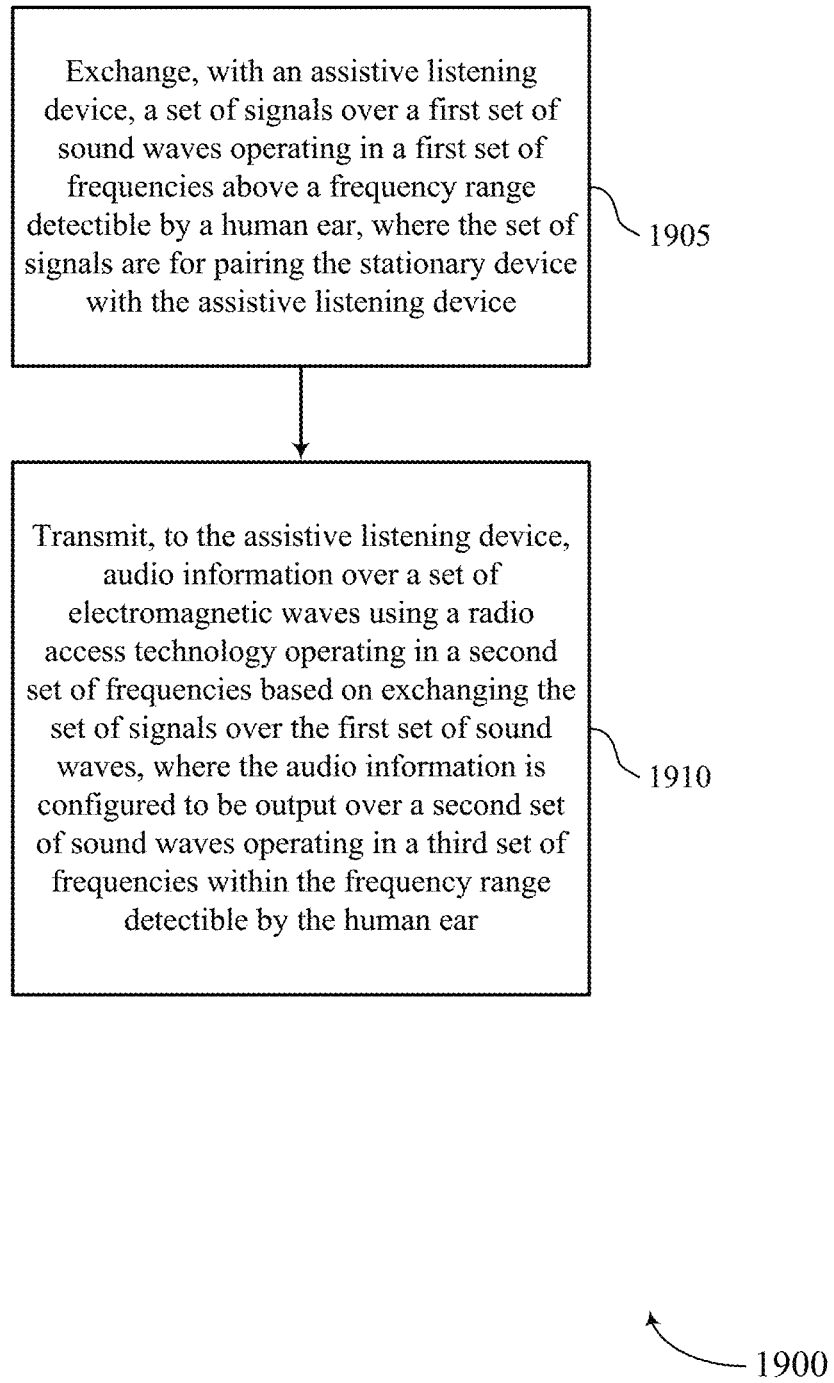

FIG. 19 shows a flowchart illustrating a method 1900 that supports communications between devices using sound waves and electromagnetic waves. The operations of method 1900 may be implemented by a stationary device or its components as described herein. For example, the operations of method 1900 may be performed by a communications manager as described with reference to FIG. 11. In some examples, a stationary device may execute a set of instructions to control the functional elements of the stationary device to perform the functions described below. Additionally or alternatively, a stationary device may perform aspects of the functions described below using special-purpose hardware.

At 1905, the stationary device may exchange, with an assistive listening device, a set of signals over a first set of sound waves operating in a first set of frequencies above a frequency range detectible by a human ear, where the set of signals are for pairing the stationary device with the assistive listening device. The operations of 1905 may be performed according to the methods described herein. In some examples, aspects of the operations of 1905 may be performed by an assistive listening manager as described with reference to FIG. 11.

At 1910, the stationary device may transmit, to the assistive listening device, audio information over a set of electromagnetic waves using a radio access technology operating in a second set of frequencies based on exchanging the set of signals over the first set of sound waves, where the audio information is configured to be output over a second set of sound waves operating in a third set of frequencies within the frequency range detectible by the human ear. The operations of 1910 may be performed according to the methods described herein. In some examples, aspects of the operations of 1910 may be performed by an assistive listening manager as described with reference to FIG. 11.

Figure 20:
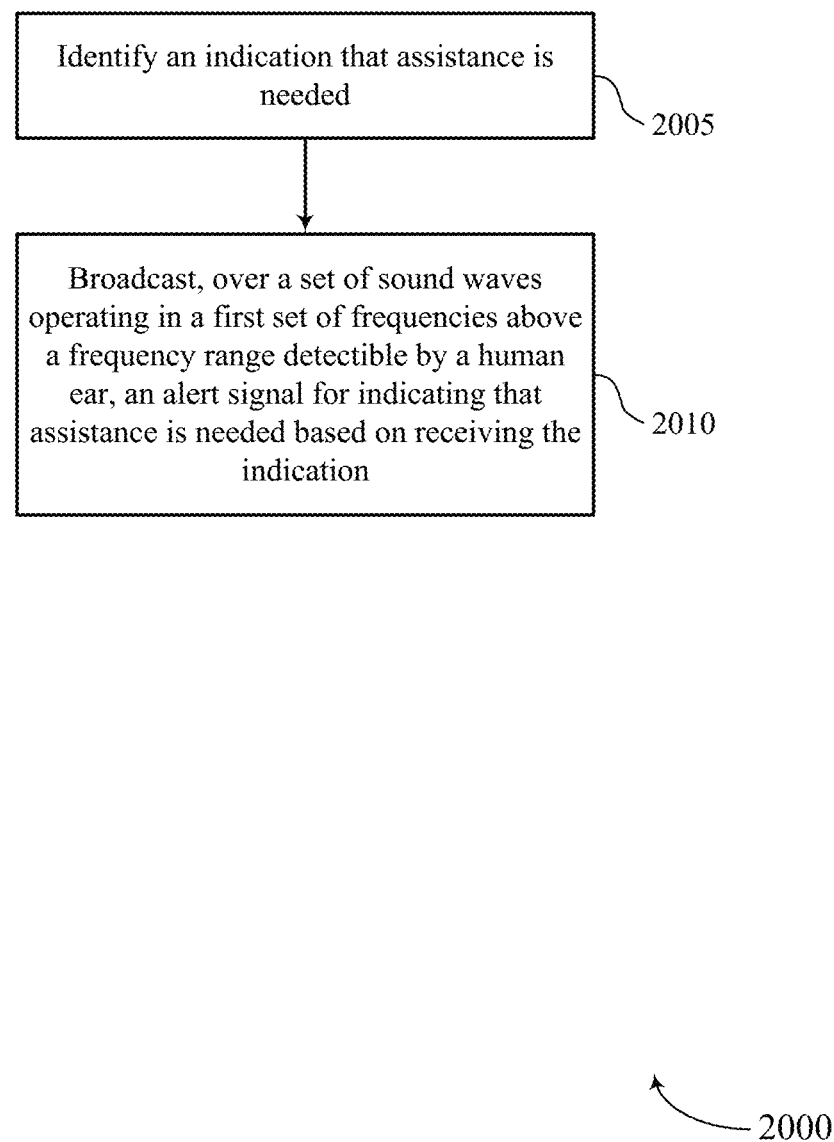

FIG. 20 shows a flowchart illustrating a method 2000 that supports communications between devices using sound waves and electromagnetic waves. The operations of method 2000 may be implemented by a mobile device or its components as described herein. For example, the operations of method 2000 may be performed by a communications manager as described with reference to FIG. 14. In some examples, a mobile device may execute a set of instructions to control the functional elements of the mobile device to perform the functions described below. Additionally or alternatively, a mobile device may perform aspects of the functions described below using special-purpose hardware.

At 2005, the mobile device may identify an indication that assistance is needed. The operations of 2005 may be performed according to the methods described herein. In some examples, aspects of the operations of 2005 may be performed by an alert signal manager as described with reference to FIG. 14.

At 2010, the mobile device may broadcast, over a set of sound waves operating in a first set of frequencies above a frequency range detectible by a human ear, an alert signal for indicating that assistance is needed based on receiving the indication. The operations of 2010 may be performed according to the methods described herein. In some examples, aspects of the operations of 2010 may be performed by an alert signal manager as described with reference to FIG. 14.

Figure 21:
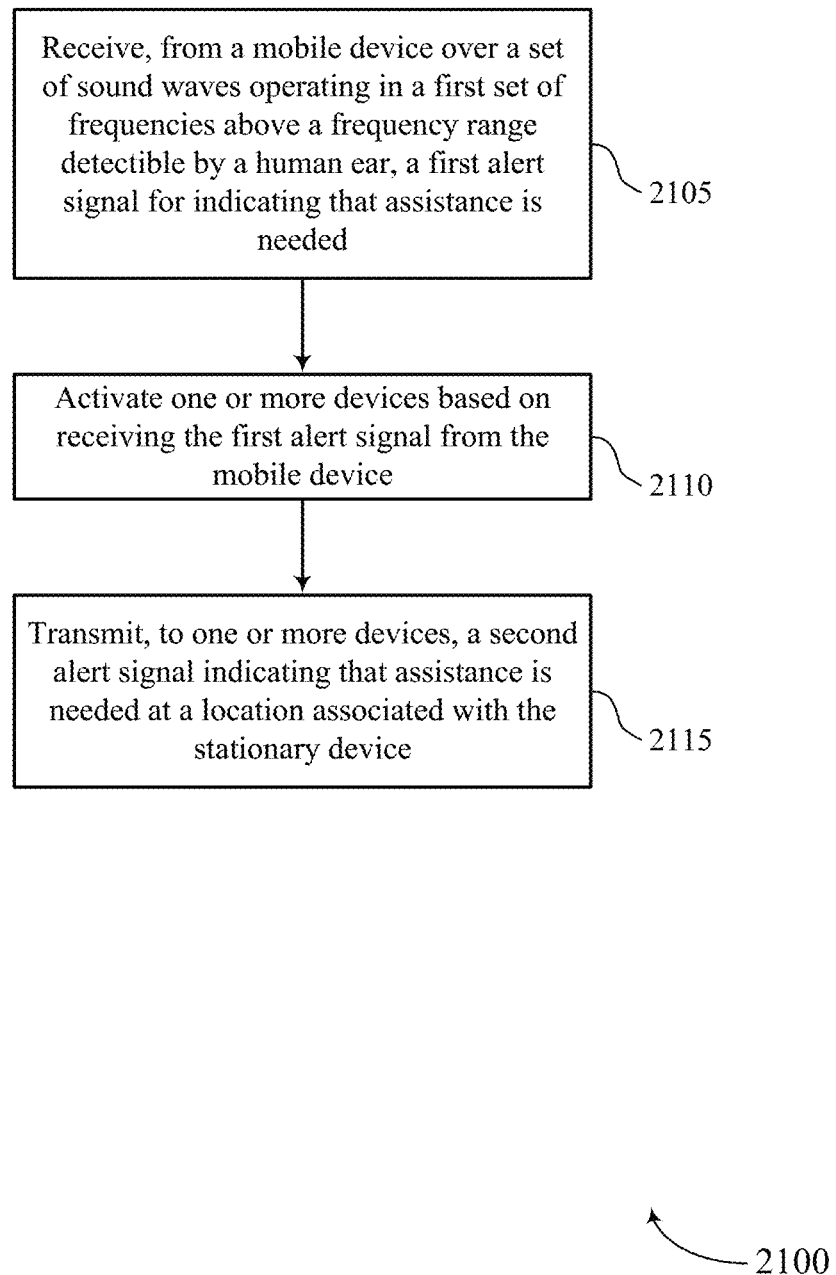

FIG. 21 shows a flowchart illustrating a method 2100 that supports communications between devices using sound waves and electromagnetic waves. The operations of method 2100 may be implemented by a stationary device or its components as described herein. For example, the operations of method 2100 may be performed by a communications manager as described with reference to FIG. 11. In some examples, a stationary device may execute a set of instructions to control the functional elements of the stationary device to perform the functions described below. Additionally or alternatively, a stationary device may perform aspects of the functions described below using special-purpose hardware.

At 2105, the stationary device may receive, from a mobile device over a set of sound waves operating in a first set of frequencies above a frequency range detectible by a human ear, a first alert signal for indicating that assistance is needed. The operations of 2105 may be performed according to the methods described herein. In some examples, aspects of the operations of 2105 may be performed by an alert signal manager as described with reference to FIG. 11.

At 2110, the stationary device may activate one or more devices based on receiving the first alert signal from the mobile device. The operations of 2110 may be performed according to the methods described herein. In some examples, aspects of the operations of 2110 may be performed by an alert signal manager as described with reference to FIG. 11.

At 2115, the stationary device may transmit, to one or more devices, a second alert signal indicating that assistance is needed at a location associated with the stationary device. The operations of 2115 may be performed according to the methods described herein. In some examples, aspects of the operations of 2115 may be performed by an alert signal manager as described with reference to FIG. 11.

It should be noted that the methods described herein describe possible implementations, and that the operations and the steps may be rearranged or otherwise modified and that other implementations are possible. Further, aspects from two or more of the methods may be combined.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), CD ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at an assistive listening device, comprising:
    during a pairing initiation procedure, exchanging, with a stationary device, a plurality of signals over a first plurality of sound waves operating in a first set of frequencies above a frequency range detectible by a human ear, a first signal of the plurality of signals being a request transmitted by the assistive listening device to establish a communication link with the stationary device using a radio access technology, wherein the plurality of signals are for pairing the assistive listening device with the stationary device wherein said exchanging comprises:

receiving, over one or more sound waves of the first plurality of sound waves, a reference signal configured for measuring a signal strength from the stationary device based at least in part on transmitting the first signal; and transmitting, over one or more sound waves of the first plurality of sound waves, a second signal to the stationary device based at least in part on receiving the reference signal, wherein receiving the audio information is based at least in part on the first signal, the reference signal, and the second signal;

exchanging, with the stationary device, one or more radio frequency signals over electromagnetic waves as part of a pairing procedure for the radio access technology after exchanging the plurality of signals over the first plurality of sound waves;

receiving, from the stationary device, audio information over a plurality of electromagnetic waves using the radio access technology operating in a second set of frequencies based at least in part on exchanging the one or more radio frequency signals over the electromagnetic waves; and outputting the audio information over a second plurality of sound waves operating in a third set of frequencies within the frequency range detectible by the human ear.

2. The method of claim 1, further comprising:
receiving, from the stationary device, a second set of audio information associated with a public announcement system over a second plurality of electromagnetic waves using the radio access technology operating in the second set of frequencies;
interrupting an output of the audio information based at least in part on receiving the second set of audio information associated with the public announcement system; and
outputting, by the assistive listening device, the second set of audio information over the second plurality of sound waves based at least in part on interrupting the output of the audio information.

3. The method of claim 1, further comprising:
pairing the assistive listening device with the stationary device using the radio access technology based at least in part on exchanging the one or more radio frequency signals over the electromagnetic waves wherein receiving the audio information is based at least in part on pairing the assistive listening device with the stationary device.

4. The method of claim 1, further comprising:
transmitting, over one or more sound waves of the first plurality of sound waves, a first signal to maintain a pairing between the assistive listening device and the stationary device; and
receiving, over one or more sound waves of the first plurality of sound waves, a second signal to maintain the pairing between the assistive listening device and the stationary device based at least in part on transmitting the first signal, the second signal being received from the stationary device, wherein receiving the audio information is based at least in part on receiving the second signal.

5. The method of claim 1, wherein the audio information includes audio from a public announcement system, a microphone, a television, a computer, a tablet, a smart phone, a speaker, or other multimedia device, or a combination thereof.

6. The method of claim 1, wherein the assistive listening device is positioned in a classroom and outputting the audio information using the second plurality of sound waves occurs concurrently with a speaker outputting the audio information into the classroom.

7. The method of claim 1, wherein the assistive listening device comprises headphones configured to be worn by a user.

8. The method of claim 1, wherein the assistive listening device comprises a speaker configured to provide localized sound to a portion of a classroom.

9. The method of claim 1, wherein the radio access technology comprises Digital Enhanced Cordless Telecommunications (DECT).

10. The method of claim 1, further comprising:
measuring one or more characteristics of the reference signal; and
selecting the stationary device with which to pair using the radio access technology based at least in part on measuring the one or more characteristics, wherein transmitting the second signal is based at least in part on selecting the stationary device.

11. A method for wireless communication at a stationary device, comprising:
during a pairing initiation procedure, exchanging, with an assistive listening device, a plurality of signals over a first plurality of sound waves operating in a first set of frequencies above a frequency range detectible by a human ear, a first signal of the plurality of signals being a request transmitted by the assistive listening device to establish a communication link with the stationary device using a radio access technology, wherein the plurality of signals are for pairing the stationary device with the assistive listening device, wherein said exchanging comprises:

receiving, over one or more sound waves of the first plurality of sound waves, the first signal to request establishment of a communication link, with the assistive listening device, using the radio access technology;

transmitting, over one or more sound waves of the first plurality of sound waves, a reference signal configured for measuring a signal strength to the assistive listening device based at least in part on the receiving the first signal; and receiving over one or more sound waves of the first plurality of sound waves, a second signal from the assistive listening device based at least in part on transmitting the reference signal, wherein transmitting the audio information is based at least in part on the first signal, the reference signal, and the second signal;

exchanging, with the assistive listening device, one or more radio frequency signals over electromagnetic waves as part of a pairing procedure for the radio access technology after exchanging the plurality of signals over the first plurality of sound waves; and transmitting, to the assistive listening device, audio information over a plurality of electromagnetic waves using the radio access technology operating in a second set of frequencies based at least in part on exchanging the one or more radio frequency signals over the electromagnetic waves, wherein the audio information is configured to be output over a second plurality of sound waves operating in a third set of frequencies within the frequency range detectible by the human ear.

12. The method of claim 11, further comprising:
receiving a first portion of the audio information from a multimedia source;
receiving a second portion of the audio information from a microphone; and
merging the first portion and the second portion to form the audio information using one or more low-latency audio merging techniques, wherein transmitting the audio information is based at least in part on merging the first portion and the second portion.

13. The method of claim 11, further comprising:
receiving, from a public announcement system, a second set of audio information;
determining that the second set of audio information has a higher priority than the audio information; and
transmitting, to the assistive listening device, the second set of audio information associated with the public announcement system over a second plurality of electromagnetic waves using the radio access technology operating in the second set of frequencies based at least in part on determining that the second set of audio information has the higher priority than the audio information.

14. The method of claim 11, further comprising:
receiving the audio information from a source positioned within a classroom, wherein the source comprises a public announcement system, a microphone, a television, a computer, a tablet, a smart phone, speakers, or other multimedia device, or a combination thereof, wherein transmitting the audio information is based at least in part on receiving the audio information from the multimedia source.

15. The method of claim 11, further comprising:
identifying the assistive listening device from a set of assistive listening devices paired with the stationary device, wherein transmitting the audio information further comprises transmitting the audio information to the identified assistive listening device without transmitting the audio information to other assistive listening devices of the set of assistive listening devices paired with the stationary device.

16. The method of claim 11, further comprising:
pairing the stationary device with the assistive listening device using the radio access technology based at least in part on exchanging the one or more radio frequency signals over the electromagnetic waves wherein transmitting the audio information is based at least in part on pairing the assistive listening device with the stationary device.

17. The method of claim 11, wherein the radio access technology comprises Digital Enhanced Cordless Telecommunications (DECT).

18. A system, comprising:
a stationary device positioned in a classroom and coupled with one or more devices configured to input or output multimedia content into the classroom, the stationary device configured to:
during a pairing initiation procedure, exchange, with an assistive listening device, a plurality of signals over a first plurality of sound waves operating in a first set of frequencies above a frequency range detectible by a human ear, a first signal of the plurality of signals being a request transmitted by the assistive listening device to establish a communication link with the stationary device, wherein said exchange comprises:
receiving, over one or more sound waves of the first plurality of sound waves, a reference signal configured for measuring a signal strength from the stationary device based at least in part on transmitting the first signal, and
transmitting, over one or more sound waves of the first plurality of sound waves, a second signal to the stationary device based at least in part on receiving the reference signal, wherein receiving the audio information is based at least in part on the first signal, the reference signal, and the second signal;
exchange, with the assistive listening device, one or more radio frequency signals over electromagnetic waves as part of a pairing procedure for a radio access technology after exchanging the plurality of signals over the first plurality of sound waves; and
the assistive listening device positioned in the classroom and configured as an audio output device for a user, the assistive listening device configured to:
exchange, with the stationary device, the plurality of signals over the first plurality of sound waves;
exchange, with the stationary device, the one or more radio frequency signals over the electromagnetic waves as part of the pairing procedure for the radio access technology after exchanging the plurality of signals over the first plurality of sound waves; and
output, to the user, audio information over a second plurality of sound waves operating in a second set of frequencies within the frequency range detectible by the human ear based at least in part on exchanging the one or more radio frequency signals over the electromagnetic waves.

* * * * *